US012747631B2

(12) United States Patent
Shivell

(10) Patent No.: US 12,747,631 B2
(45) Date of Patent: Sep. 29, 2026

(54) BATTERY-POWERED MOTORIZED WINDOW TREATMENT

(71) Applicant: Lutron Technology Company LLC, Coopersburg, PA (US)

(72) Inventor: William Taylor Shivell, Breinigsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 312 days.

(21) Appl. No.: 18/230,432

(22) Filed: Aug. 4, 2023

(65) Prior Publication Data

US 2024/0044204 A1 Feb. 8, 2024

Related U.S. Application Data

(60) Provisional application No. 63/395,504, filed on Aug. 5, 2022.

(51) Int. Cl.

| | |
|---|---|
| ***E06B 9/42*** | (2006.01) |
| ***E06B 9/68*** | (2006.01) |
| ***E06B 9/72*** | (2006.01) |

(52) U.S. Cl.

CPC .................. *E06B 9/72* (2013.01); *E06B 9/42* (2013.01); *E06B 9/68* (2013.01); *E06B 2009/689* (2013.01)

(58) Field of Classification Search

CPC ..... E06B 9/68; E06B 9/72; E06B 9/42; E06B 9/44; E06B 2009/689; E06B 2009/6809; H01H 13/52; H01H 2013/525; H01H 15/005

See application file for complete search history.

(56) References Cited

U.S. PATENT DOCUMENTS

| | | | | |
|---|---|---|---|---|
| 2,203,372 | A | 6/1940 | Trammell | |
| 2,301,863 | A | 11/1942 | Forse | |
| 3,950,461 | A | 4/1976 | Levens | |
| 4,531,562 | A | 7/1985 | Swanson | |
| 6,100,659 | A * | 8/2000 | Will | E06B 9/68 160/310 |
| 7,389,806 | B2 | 6/2008 | Kates | |
| 8,299,734 | B2 | 10/2012 | Mullet et al. | |
| 8,368,328 | B2 | 2/2013 | Mullet et al. | |
| 8,371,358 | B1 | 2/2013 | Mullet et al. | |

(Continued)

FOREIGN PATENT DOCUMENTS

EP 2631411 B1 9/2014

*Primary Examiner* — Abe Massad

(74) *Attorney, Agent, or Firm* — Flaster Greenberg P.C.

(57) ABSTRACT

A motorized window treatment may include a roller tube, a flexible material, a motor drive unit, and mounting brackets. The roller tube may be configured to rotate about a longitudinal axis that defines a longitudinal direction to operate the flexible material between a raised position and a lowered position. The motor drive unit may include a housing that defines a cavity that receives a motor and one or more batteries for powering the motor drive unit. The motor drive unit may include a printed circuit board to which a control circuit is mounted. The control circuit may comprise a switch. The motor drive unit may comprise an actuation member configured to transfer a first force applied in a first direction at an end portion of the motor drive unit to a second force in a second direction within the cavity of the housing to actuate the switch.

30 Claims, 31 Drawing Sheets

(56) References Cited

U.S. PATENT DOCUMENTS

| | | | | |
|---|---|---|---|---|
| 8,540,005 | B2 | 9/2013 | Baugh et al. | |
| 8,659,246 | B2 | 2/2014 | Mullet et al. | |
| 8,723,454 | B2 * | 5/2014 | Skinner | E06B 9/72 318/16 |
| 8,791,658 | B2 | 7/2014 | Mullet et al. | |
| 8,851,141 | B2 | 10/2014 | Blair et al. | |
| 8,919,419 | B2 | 12/2014 | Mullet et al. | |
| 9,045,939 | B2 | 6/2015 | Blair et al. | |
| 9,115,537 | B2 | 8/2015 | Blair | |
| 9,488,000 | B2 | 11/2016 | Kirby et al. | |
| 9,810,020 | B2 | 11/2017 | Adams et al. | |
| 10,094,169 | B2 | 10/2018 | Kirby | |
| 10,655,386 | B2 | 5/2020 | Adams et al. | |
| 10,676,989 | B2 * | 6/2020 | Buccola, Jr. | E06B 9/72 |
| 11,002,071 | B2 | 5/2021 | Campagna et al. | |
| 11,015,387 | B2 | 5/2021 | Blair et al. | |
| 11,421,473 | B2 | 8/2022 | Campagna et al. | |
| 11,486,197 | B2 * | 11/2022 | Kasai | H02K 7/102 |
| 11,585,152 | B2 * | 2/2023 | Buccola, Jr. | E06B 9/72 |
| 11,655,674 | B2 * | 5/2023 | Holt | E06B 9/50 361/752 |
| 11,680,445 | B2 | 6/2023 | Blair et al. | |
| 11,788,348 | B2 | 10/2023 | Blair et al. | |
| 12,237,800 | B2 * | 2/2025 | Nien | H02P 6/30 |
| 2007/0284053 | A1 | 12/2007 | Mullet et al. | |
| 2008/0236763 | A1 | 10/2008 | Kates | |
| 2010/0269988 | A1 | 10/2010 | Mullet et al. | |
| 2010/0294438 | A1 | 11/2010 | Kirby et al. | |
| 2011/0203748 | A1 | 8/2011 | Mullet et al. | |
| 2011/0203754 | A1 | 8/2011 | Mullet et al. | |
| 2012/0090797 | A1 | 4/2012 | Mullet et al. | |
| 2012/0225340 | A1 | 9/2012 | Mullet et al. | |
| 2013/0098561 | A1 | 4/2013 | Mullet et al. | |
| 2013/0233496 | A1 | 9/2013 | Ogden et al. | |
| 2013/0269887 | A1 * | 10/2013 | Skinner | H02P 5/74 160/331 |
| 2014/0305601 | A1 | 10/2014 | Mullet et al. | |
| 2014/0305602 | A1 | 10/2014 | Kirby et al. | |
| 2015/0240560 | A1 | 8/2015 | Blair et al. | |
| 2015/0247362 | A1 | 9/2015 | Kirby | |
| 2016/0273269 | A1 | 9/2016 | Mullet et al. | |
| 2018/0202225 | A1 | 7/2018 | Lagarde | |
| 2018/0266176 | A1 | 9/2018 | Hall et al. | |
| 2018/0310745 | A1 | 11/2018 | Giri et al. | |
| 2020/0332595 | A1 * | 10/2020 | Anthony | E06B 9/72 |
| 2021/0367542 | A1 | 11/2021 | Adams et al. | |
| 2023/0074389 | A1 * | 3/2023 | Fisher, II | E06B 9/50 |
| 2024/0044204 | A1 | 2/2024 | Shivell | |

* cited by examiner

BATTERY-POWERED MOTORIZED WINDOW TREATMENT

CROSS-REFERENCE TO RELATED APPLICATIONS

This application claims the benefit of Provisional U.S. Patent Application No. 63/395,504, filed Aug. 5, 2022, the entire disclosure of which is hereby incorporated by reference herein in its entirety.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows over which the roller shade is mounted.

A typical window treatment can be mounted to a structure surrounding a window, such as a window frame. Such a window treatment may include brackets at opposed ends thereof. The brackets may be configured to operably support the roller tube, such that the flexible material may be raised and lowered. For example, the brackets may be configured to support respective ends of the roller tube. The brackets may be attached to the structure, such as a wall, ceiling, window frame, or other structure.

Such a window treatment may be motorized. A motorized window treatment may include a roller tube, a motor, brackets, and electrical wiring. The components of the motorized window treatment, such as the brackets, the roller tube, electrical wiring, etc. may be concealed by a fascia or installed in a pocket out of view. However, it may be desirable to install a window treatment without a fascia and/or outside of a pocket. In such a motorized window treatment, one or more components may be exposed such that they are visible. It may be desirable to configure the motorized window treatment such that the exposed components are otherwise hidden, for example, without the use of a fascia. It may also be desirable to configure the exposed components to be functional and aesthetically pleasing.

SUMMARY

As described herein, a motorized window treatment may include a roller tube, a flexible material, a motor drive unit (e.g., drive assembly), and mounting brackets. The roller tube may be configured to rotate about a longitudinal axis that defines a longitudinal direction. The flexible material may be attached to the roller tube. The flexible material may be operable between a raised position and a lowered position via rotation of the roller tube. The motor drive unit may be located within the roller tube. The motor drive unit may comprise a housing that defines a cavity that receives a motor and one or more batteries for powering the motor drive unit. The motor drive unit may be configured to rotate the roller tube to adjust the flexible material between a raised position and a lowered position.

The motor drive unit may comprise a printed circuit board to which a control circuit is mounted. The control circuit may comprise a switch. The motor drive unit may comprise an actuation member configured to transfer a first force applied in a first direction at an end portion of the motor drive unit to a second force in a second direction within the cavity of the housing. The first direction may be a longitudinal direction and the second direction may be a transverse direction. The transverse direction may be orthogonal to the longitudinal direction. The second force may be configured to actuate the switch. The actuation member may comprise an elongated portion, a flexible member, and/or a plurality of feet. The flexible member may define an actuation nub that is configured to actuate the switch. The actuation nub may be configured to move in the transverse direction as the elongated portion moves in the longitudinal direction. The flexible member may be configured to press against an inner surface of the cavity, for example, to bias the actuation nub toward the switch. The flexible member may define an axle that is configured to be retained by tabs on the inner surface. The axle may be configured to rotate such that the actuation nub is able to move in the transverse direction. The flexible member may be v-shaped with a first portion that defines the axle and a second portion that extends from the elongated portion.

The elongated portion may comprise a light pipe portion that is configured to extend proximate to a light source mounted to the printed circuit board. The light pipe portion may be curved to transfer the light emitted by a light source on the printed circuit board to the end portion of the motor drive unit. The elongated portion may be translucent. The plurality of feet may extend from the elongated portion. The plurality of feet may be configured to secure the actuation member within the cavity. The housing may comprise a plurality of recesses defining one or more apertures that extend from the cavity to an exterior surface of the housing. Each of the apertures may be configured to receive a respective one of the plurality of feet. The plurality of recesses may be configured to enable each of the plurality of feet to translate within a respective recess of the plurality of recesses in the longitudinal direction. Each of the plurality of recesses may define a length that limits how far the elongated portion can translate within the cavity in the longitudinal direction.

A motorized window treatment, as described herein, may comprise a roller tube, a flexible material, a motor drive unit, and a mounting bracket. The roller tube may be configured to rotate about a longitudinal axis that defines a longitudinal direction. The flexible material may be attached to the roller tube. The flexible material may be operable between a raised position and a lowered position via rotation of the roller tube. The motor drive unit may be located within the roller tube. The motor drive unit may comprise a housing that houses a motor and one or more batteries for powering the motor drive unit. The motor drive unit may be configured to rotate the roller tube to adjust the flexible material between a raised position and a lowered position.

The housing may comprise a snap extending from a snap arm in the longitudinal direction. The snap may comprise a first sloped surface and a first vertical surface. The mounting bracket may be configured to rotatably support an end of the roller tube and mount the motorized window treatment to a structure surrounding a window. The mounting bracket may comprise a stationary portion and a movable portion. The stationary portion may be configured to be attached to the structure surrounding the window. The movable portion may be configured to receive an end portion of the housing. The movable portion may comprise a catch that is configured to engage with the snap, for example, to prevent the motor drive unit from disengaging from the first mounting bracket. The catch may comprise a second sloped surface and a second vertical surface. The catch may comprise a second sloped surface and a second vertical surface. The first sloped surface of the snap may abut the second sloped surface of the catch as the motor drive unit is translated toward the first mounting bracket. As the motor drive unit is further translated in the longitudinal direction, the catch may apply a force on the snap in a transverse direction that is orthogonal to the longitudinal direction, for example, such that the snap arm flexes in the transverse direction to enable the snap to move into a cavity defined by the housing of the motor drive unit. As the motor drive unit is further translated in the longitudinal direction, the first sloped surface of the snap may extend beyond the second sloped surface of the catch such that the first slope surface does not abut the second sloped surface. When the first sloped surface of the snap extends beyond the second sloped surface of the catch, the snap may be configured to return to its original position relative to the housing. The first vertical surface of the snap may be configured to abut the second vertical surface of the catch, for example, to prevent the motor drive unit from disengaging from the first mounting bracket. The first vertical surface of the snap may be configured to abut the second vertical surface of the catch when the motor drive unit moves in the longitudinal direction toward a second mounting bracket.

The movable portion may be configured to operate the motorized window treatment between the operating position and the extended position. A portion of the motor drive unit may be accessible when the motorized window treatment is in the extended position. The motorized window treatment may comprise a battery holder that is configured to retain the one or more batteries. The battery holder may be configured to be received within the cavity of the housing. The snap arm may be configured to flex into the cavity when the battery holder is removed from the motor drive unit. The cavity may be configured to receive the battery holder when the snap returns to its original position relative to the housing. The motorized window treatment may comprise a second mounting bracket configured to rotatably support an opposed end of the roller tube. The second mounting bracket may be configured to be attached to the structure surrounding the window.

DETAILED DESCRIPTION

Figure 1:
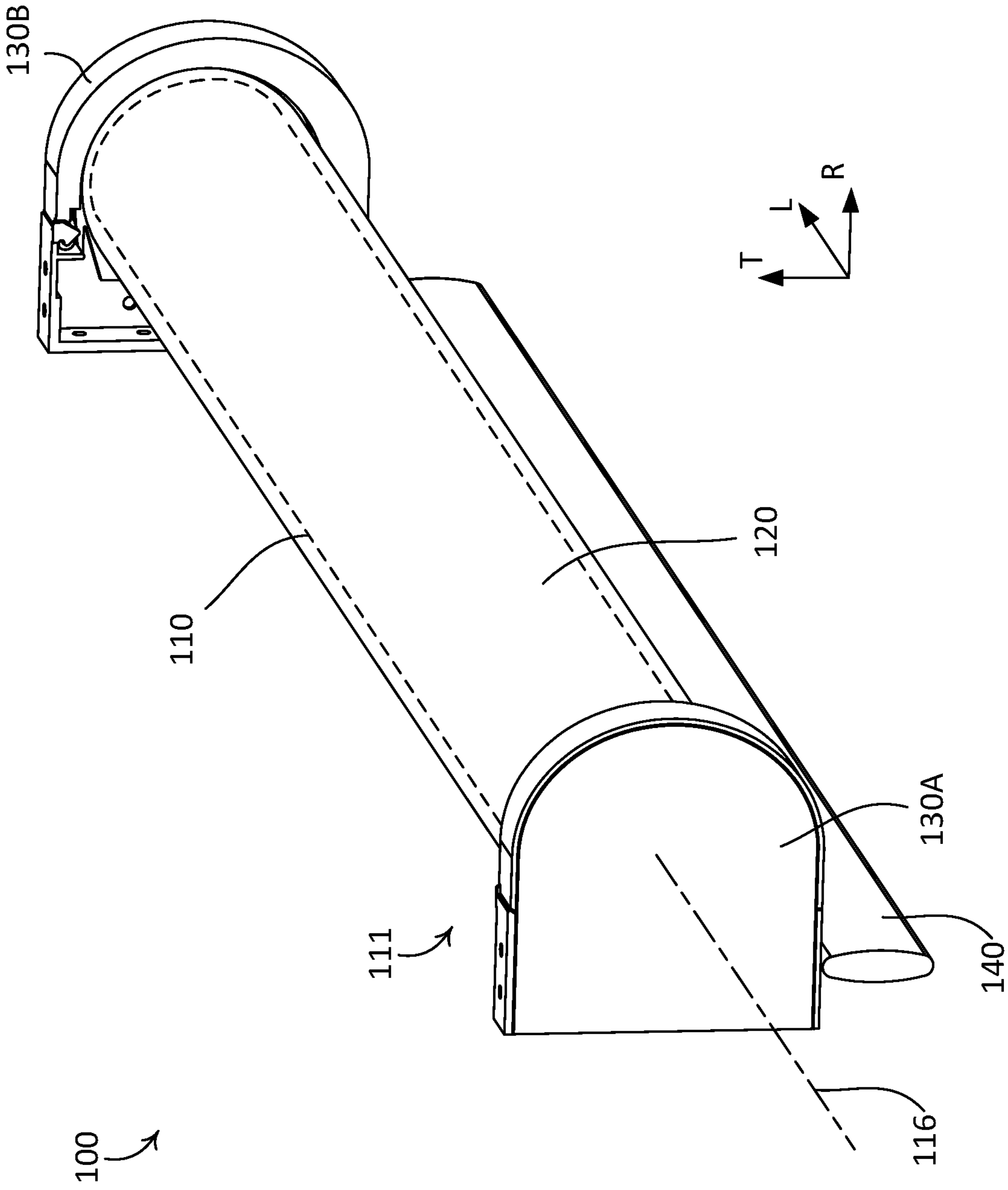
FIG. 1 is a perspective view of an example motorized window treatment with a roller tube in an operating position.

FIGS. 1-6 depict an example motorized window treatment 100 (e.g., a battery-powered motorized window treatment system) that includes a roller tube 110 and a flexible material 120 (e.g., a covering material) windingly attached to the roller tube 110. The motorized window treatment 100 may be a window treatment assembly that includes a window treatment assembly 111 and one or more mounting brackets 130A, 130B. The window treatment assembly 111 may include a roller tube 110, a flexible material 120, a motor drive unit 190 at a first end 112 of the window treatment assembly 111, and an idler end portion 114 at a second end 113 of the window treatment assembly 111. For example, the motorized window treatment 100 may be in an operating position (e.g., a non-extended position) in FIGS. 1-4. The roller tube 110 may comprise a first end 112 and a second end 113. The motorized window treatment 100 may include first and second mounting brackets 130A, 130B configured to be coupled to or otherwise mounted to a structure surrounding a window. The mounting brackets 130A, 130B may comprise respective plates 136A, 136B with first flanges 132A, 132B extending from the tops of the plates 136A, 136B and second flanges 134A, 134B extending from the sides of the plates 136A, 136B. For example, each of the mounting brackets 130A, 130B may be configured to be mounted to (e.g., attached to) a window frame, a wall, or other structure, such that the motorized window treatment 100 is mounted proximate to an opening (e.g., over the opening or in the opening), such as the window for example. The mounting brackets 130A, 130B may be configured to be mounted to a vertical structure (e.g., wall-mounted to a wall as shown in FIG. 1) and/or mounted to a horizontal structure (e.g., ceiling-mounted to a ceiling).

Figure 3:
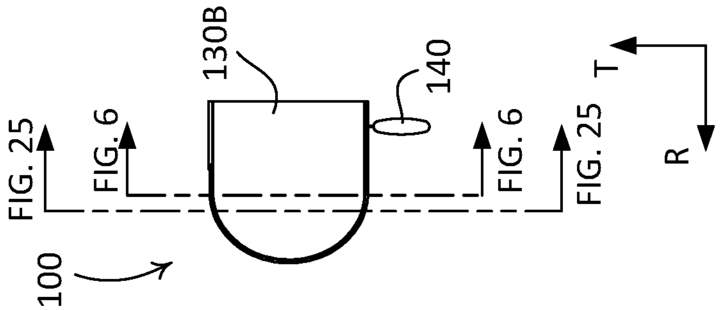
FIG. 3 is a side view of the example motorized window treatment shown in FIG. 1.
Figure 2:
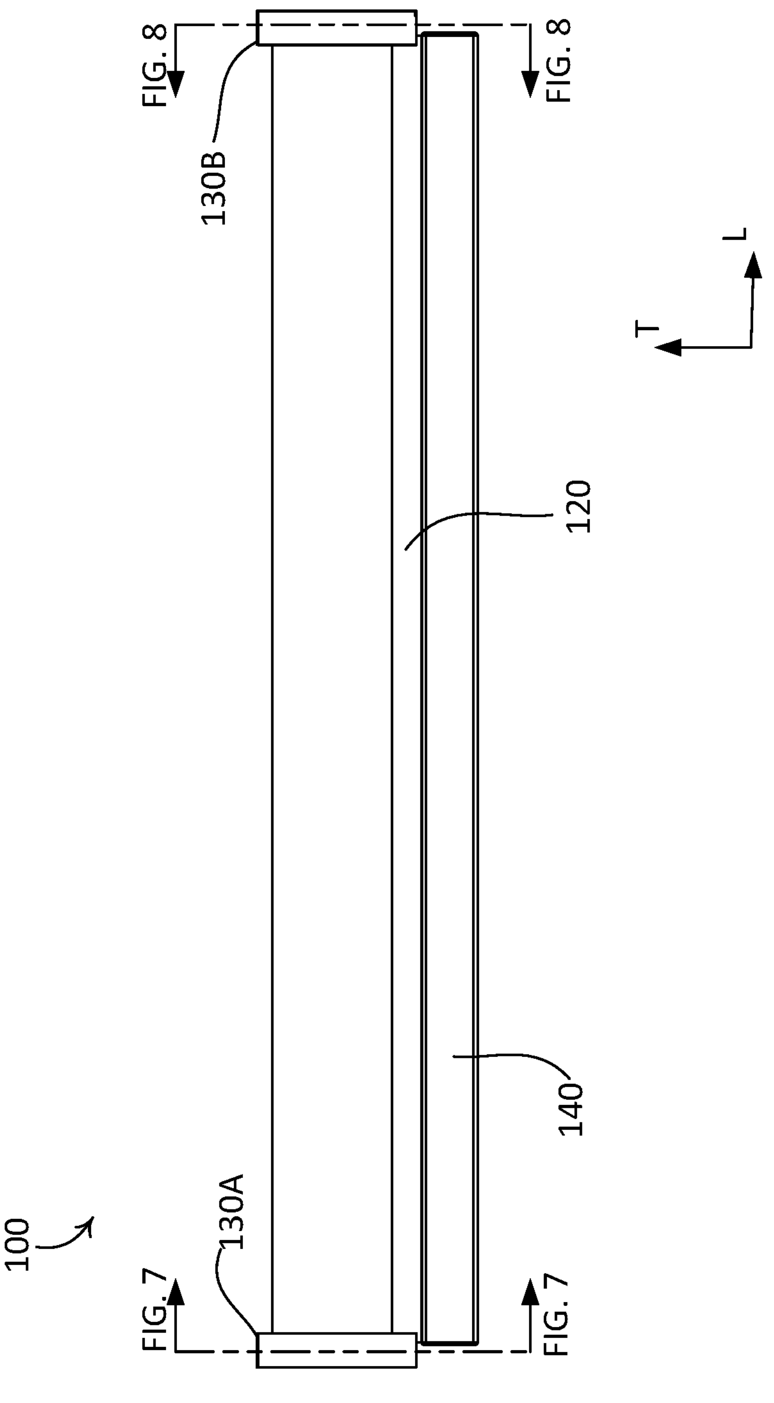
FIG. 2 is a front view of the example motorized window treatment shown in FIG. 1.

The roller tube 110 may operate as a rotational element of the motorized window treatment 100. The roller tube 110 may be elongate along a longitudinal direction L and rotatably mounted (e.g., rotatably supported) by the mounting brackets 130A, 130B. For example, the window treatment assembly 111 may be rotatably supported by the mounting brackets 130A, 130B. The roller tube 110 may define a longitudinal axis 116. The longitudinal axis 116 may extend along the longitudinal direction L. The mounting brackets 130A, 130B may extend from the structure in a radial direction R. The radial direction R may be defined as a direction perpendicular to the structure and the longitudinal axis 116. The flexible material 120 may be windingly attached to the roller tube 110, such that rotation of the roller tube 110 causes the flexible material 120 to wind around or unwind from the roller tube 110 along a transverse direction T that extends perpendicular to the longitudinal direction L. For example, rotation of the roller tube 110 may cause the flexible material 120 to move between a raised position (e.g., a fully-raised position or a fully-open position as shown in FIG. 3) and a lowered position (e.g., a fully-lowered position or a fully-closed position as shown in FIG. 1) along the transverse direction T.

The flexible material 120 may include a first end (e.g., a top or upper end) that is coupled to the roller tube 110 and a second end (e.g., a bottom or lower end) that is coupled to a hembar 140. The hembar 140 may be configured, for example weighted, to cause the flexible material 120 to hang vertically. Rotation of the roller tube 110 may cause the hembar 140 to move toward or away from the roller tube 110 between the raised and lowered positions.

The flexible material 120 may be any suitable material, or form any combination of materials. For example, the flexible material 120 may be "scrim," woven cloth, non-woven material, light-control film, screen, and/or mesh. The motorized window treatment 100 may be any type of window treatment. For example, the motorized window treatment 100 may be a roller shade as illustrated, a soft sheer shade, a drapery, a cellular shade, a Roman shade, or a Venetian blind. As shown, the flexible material 120 may be a material suitable for use as a shade fabric, and may be alternatively referred to as a flexible material. The flexible material 120 is not limited to shade fabric. For example, in accordance with an alternative implementation of the motorized window treatment 100 as a retractable projection screen, the flexible material 120 may be a material suitable for displaying images projected onto the flexible material.

Figure 4:
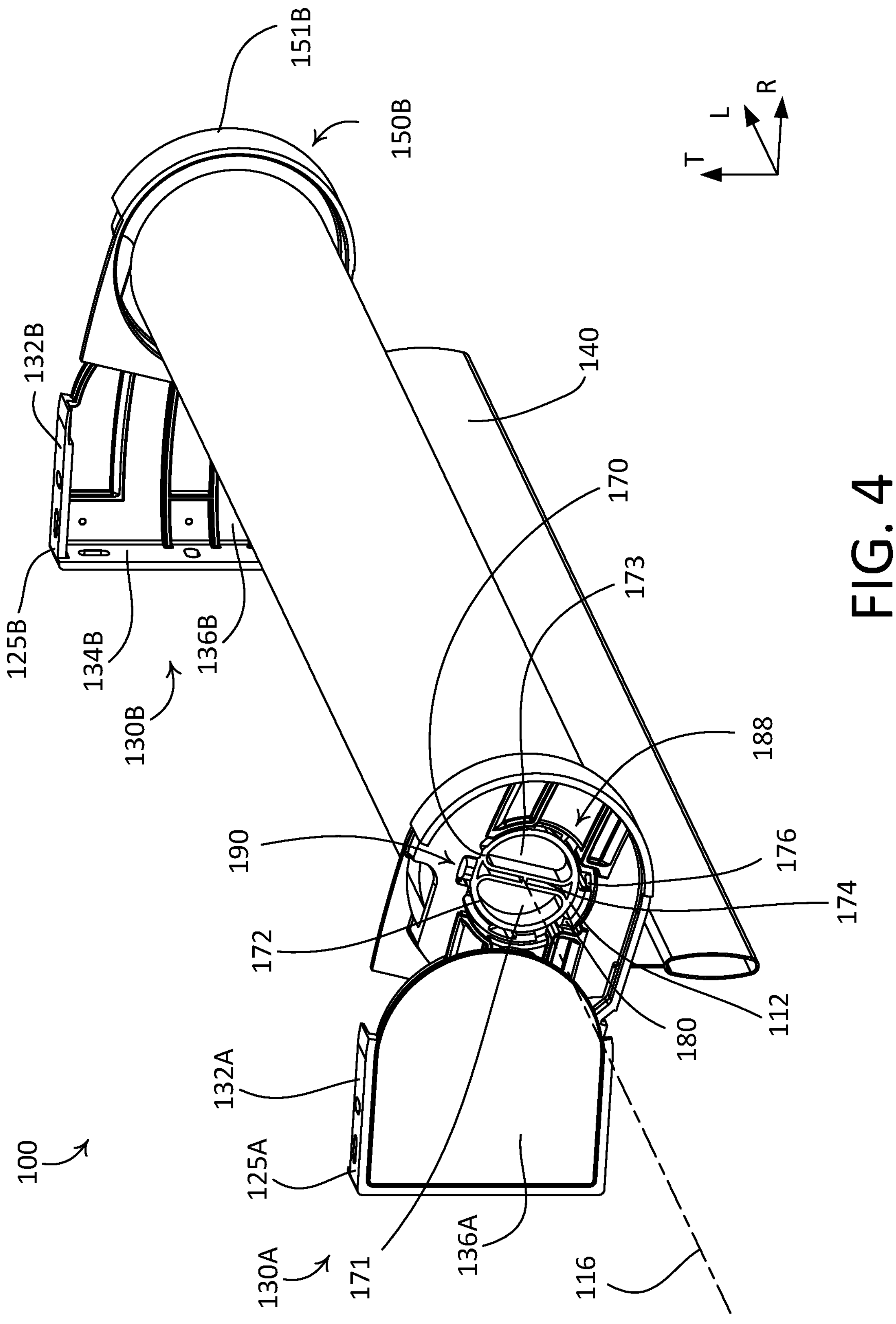
FIG. 4 is a perspective view of the example motorized window treatment shown in FIG. 1 with the roller tube in an extended position.
Figure 5:
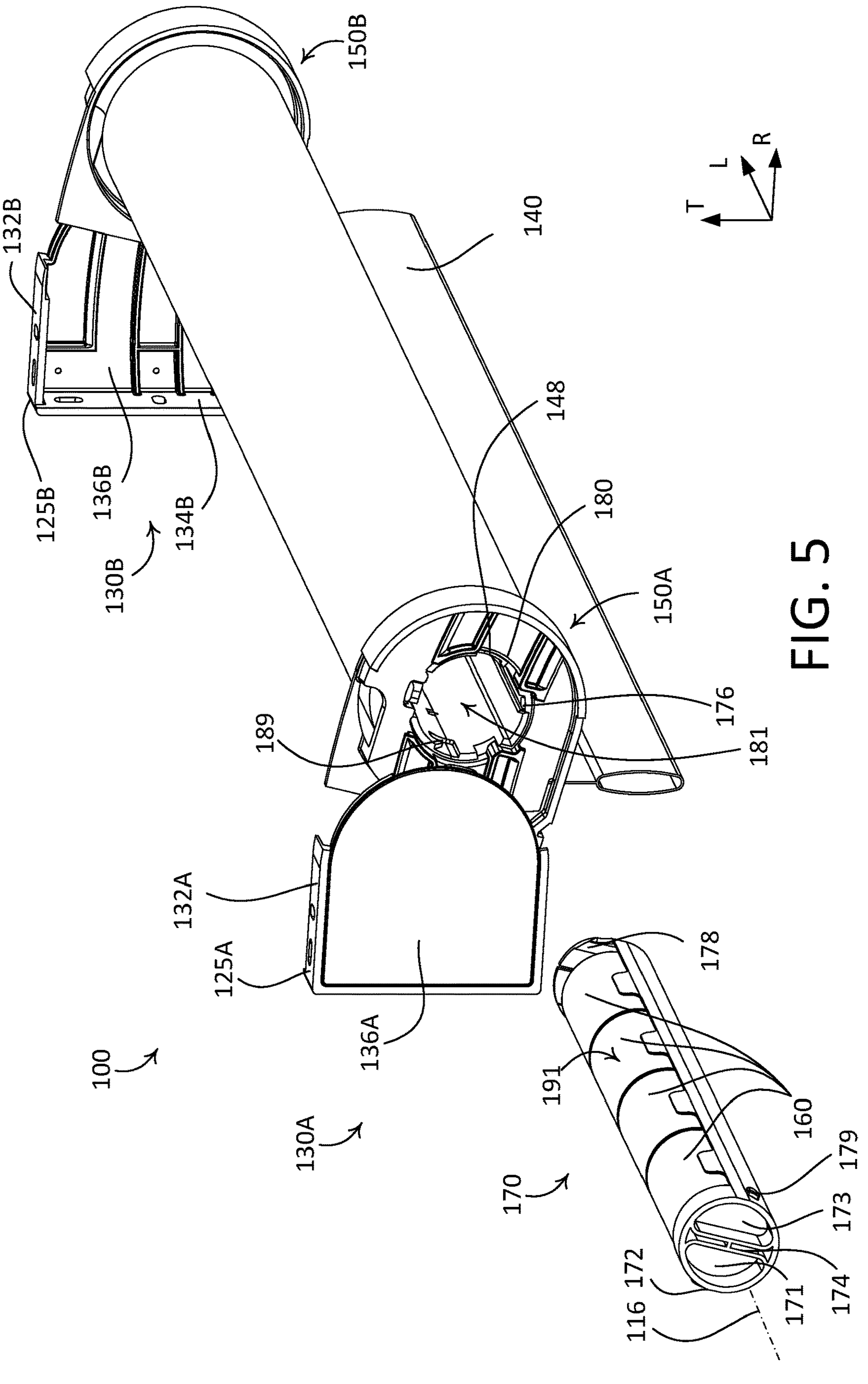
FIG. 5 is a partially exploded view of the example motorized window treatment shown in FIG. 1 with a battery holder removed from a housing of a motor drive unit of the motorized window treatment.
Figure 6:
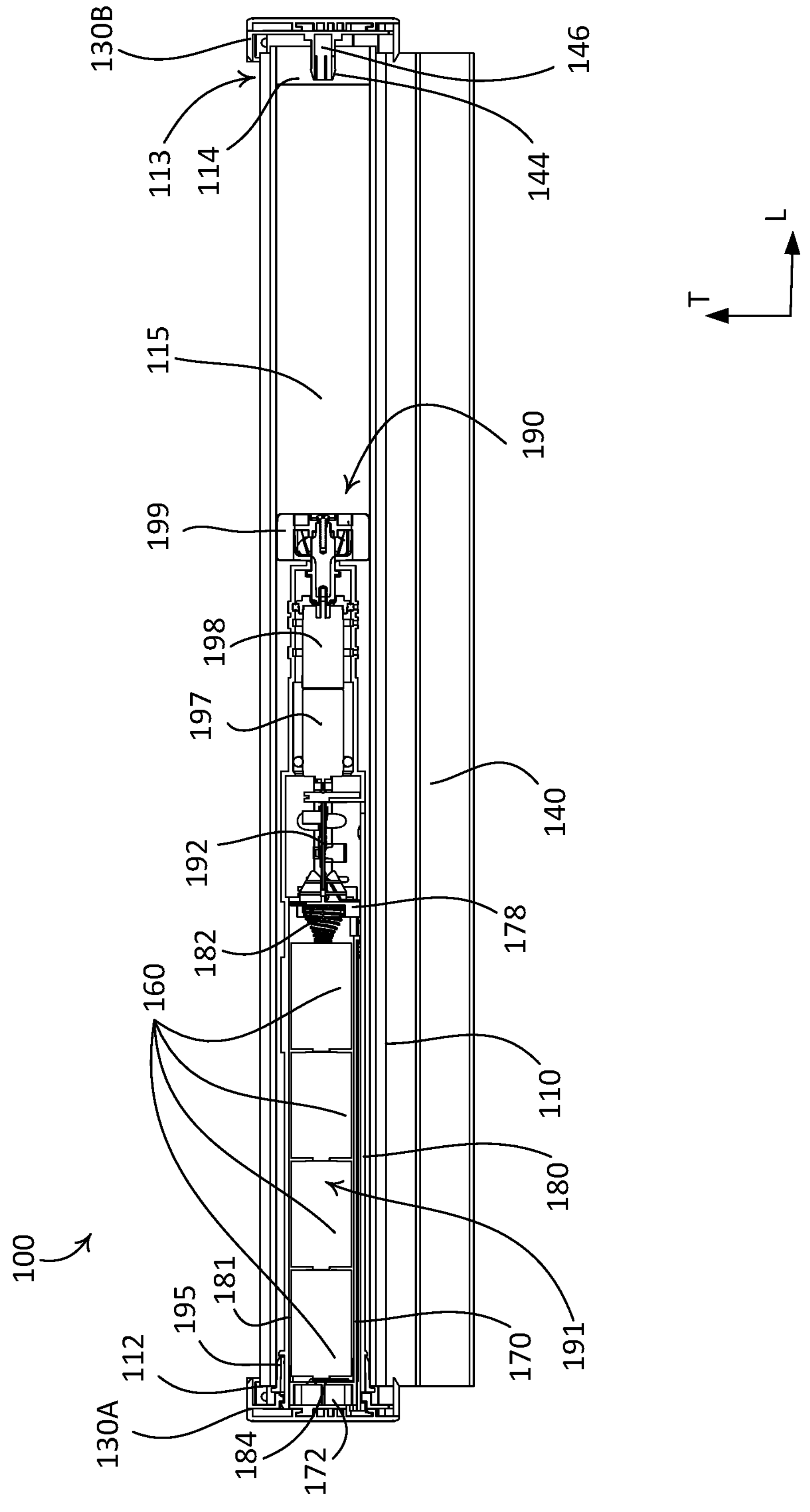
FIG. 6 is a front cross-section view of the example motorized window treatment shown in FIG. 1 with the roller tube in the operating position.

FIGS. 4 and 5 are perspective views of the example motorized window treatment 100 in an extended position. FIG. 4 depicts the example motorized window treatment 100 with a battery holder 170 within a housing 180 of the motor drive unit 190 of the motorized window treatment 100. FIG. 5 depicts the example motorized window treatment 100 with the battery holder 170 removed from the housing 180. FIG. 6 is a front cross-section view of the example motorized window treatment 100.

The motorized window treatment 100 may include a drive assembly, e.g., such as the motor drive unit 190 (e.g., shown in FIG. 6). The motor drive unit 190 may at least partially be disposed within the roller tube 110 (e.g., in the first end 112 of the roller tube 110). For example, the motor drive unit 190 may include a control circuit that may include a microprocessor and may be mounted to a printed circuit board 192 (e.g., shown in FIG. 6). The motor drive unit 190 may be operably coupled to the roller tube 110 such that when the motor drive unit 190 is operated, the roller tube 110 rotates. The motor drive unit 190 may be configured to rotate the roller tube 110 of the example motorized window treatment 100 such that the flexible material 120 is operable between the raised position and the lowered position. The motor drive unit 190 may further comprise a communication circuit, such as a wireless communication circuit, that may be mounted to the printed circuit board 192 and may be configured to transmit and receive signals (e.g., wireless signals, such as radio-frequency (RF) signals). The motor drive unit 190 may be configured to rotate the roller tube 110 to control the flexible material 120 between the raised position and the lowered position in response to signals received from a remote control device via the communication circuit. During a configuration procedure (e.g., an association procedure) of the motorized window treatment 100, the motor drive unit 190 may be associated with the remote control device, such that the motor drive unit 190 may be responsive to the wireless signals transmitted by the remote control device.

As shown in FIG. 6, the motor drive unit 190 may comprise a motor 197 that is coupled to a drive coupler 199 via a gear assembly 198. The motor drive unit 190 (e.g., the motor 197) may be operatively coupled to the roller tube 110, for example, via the drive coupler 199. The drive coupler 199 may be an output gear that is driven by the motor 197 and transfers rotation of the motor 197 to the roller tube 110. For example, the drive coupler 199 may define a plurality of grooves about its periphery. An inner surface of the roller tube 110 may be splined (e.g., may define a plurality of splines). The grooves of the drive coupler 199 may be configured to engage respective splines of the roller tube 110 such that rotation of the motor 197 is transferred to the roller tube 110, for example, via the drive coupler 199. The motor drive unit 190 may also comprise a bearing assembly 195, which may support the roller tube 110 and may be rotatably coupled to the roller tube 100. The motorized window treatment 100 may also comprise the idler end portion 114 disposed within the second end 113 of the roller tube 110 (e.g., as shown in FIG. 6).

The motorized window treatment 100 may be configured to enable access to one or more ends of the roller tube 110 and/or the motor drive unit 190 while remaining secured to the mounting brackets 130A, 130B. For example, the motorized window treatment 100 may be adjusted (e.g., pivoted or slid) between an operating position (e.g., as shown in FIG. 1) to an extended position (e.g., as shown in FIGS. 4 and 5) while the window treatment assembly 111 is secured to the mounting brackets 130A, 130B. The operating position may be defined as a position in which the roller tube 110 is supported by and aligned with both mounting brackets 130A, 130B. The extended position may be defined as a position in which one or more ends of the roller tube 110 and/or the motor drive unit 190 are accessible while still attached to the mounting brackets 130A, 130B.

When in the motorized window treatment 100 is in the extended position, the one or more ends (e.g., end portions) of the motor drive unit 190 and/or roller tube 110 may be accessed, for example, to replace batteries, adjust one or more settings, make an electrical connection, repair one or more components, and/or the like. One or more of the mounting brackets 130A, 130B may enable an end portion 188 of the motor drive unit 190 to be accessed when the motorized window treatment 100 is in the extended position. Each of the mounting brackets 130A, 130B may include a respective stationary portion 125A, 125B configured to be mounted to the structure and a respective pivoting portion 150A, 150B configured to pivot or rotate away from the structure. For example, the pivoting portion 150A of the first mounting bracket 130A may be configured to pivot or rotate away from the structure to enable the end portion 188 of the motor drive unit 190 to be accessible. For example, a first portion (e.g., the pivoting portion 150A, 150B) of one or more of the mounting brackets 130A, 130B may pivot or rotate away from a second portion (e.g., the stationary portion 125A, 125B). For example, the pivoting portions 150A, 150B of the mounting brackets 130A, 130B may be adjusted with respect to the stationary portions 125A, 125B, for example, to expose the end portion 188 of the motor drive unit 190 and/or the idler end portion 114 disposed in the roller tube 110.

The motorized window treatment 100 may be configured to pivot between the operating position and the extended position. For example, the motorized window treatment 100 may pivot about a fulcrum 165 that is located below the motorized window treatment 100 (e.g., the mounting brackets 130A, 130B) in the transverse direction T. Both of the mounting brackets 130A, 130B may be pivoted when the motorized window treatment is in the extended position. For example, the pivoting portions 150A, 150B of both of the mounting brackets 130A, 130B may be configured to slide away from the stationary portions 125A, 125B. In this configuration, both ends of the roller tube 110 may be further from the window and/or the structure when the motorized window treatment 100 is in the extended position than when the motorized window treatment 100 is in the operating position. Stated differently, the motorized window treatment 100 may slide between the operating position and the extended position. When the motorized window treatment 100 is in the extended position, the end portion 188 of the motor drive unit 190 may be exposed (e.g., accessible). The end portion 188 of the motor drive unit 190 may be located proximate to the first end 112 of the roller tube 110. The motor drive unit 190 may be received within a cavity 115 of the roller tube 110.

The battery holder 170 may be received in the motorized window treatment 100 (e.g., in the motor drive unit 190). The battery holder 170 may be configured to retain the batteries 160. For example, the battery holder 170 may define a battery compartment 191 that is configured to receive the batteries 160. The battery holder 170 (e.g., the battery compartment 191) may be configured to keep the batteries 160 fixed in place securely while the batteries 160 are providing power to the motor drive unit 190. The battery holder 170 may be configured to clamp the batteries 160 together (e.g., as shown in FIG. 5) such that the batteries 160 can be removed from the battery-powered motorized window treatment 100 at the same time (e.g., together). The battery holder 170 may include a first collar 172 and a second collar 178 at opposed ends of the battery holder 170. The first collar 172 and the second collar 178 may be configured to keep the batteries 160 fixed in place (e.g., prevent longitudinal movement of the batteries 160). The first collar 172 may define a first cavity 171 and a second cavity 173 that are separated by an arm 174 that extends across the inner diameter of the first collar 172. The battery holder 170 may be configured to create a spring tension to hold the batteries 160 together. The battery holder 170 may include an internal spring 182 that is configured to maintain contact between the batteries 160 and an electrical contact 184 (e.g., a positive contact) within the battery holder 170. The internal spring 182 may extend within the battery compartment 191. For example, the internal spring 182 may define a negative contact within the battery compartment 191. Stated differently, the internal spring 182 may be configured to abut a negative side of one of the batteries 160 within the battery compartment 191. The internal spring 182 may be configured to be compressed in the longitudinal direction L, for example, toward the second collar 178 when the batteries 160 are received within the battery compartment 191. The electrical contact 184 may be located on the first collar 172 within the battery compartment 191. The battery holder 170 (e.g., the internal spring 182 and the electrical contact 184) may be configured to be electrically connected to the printed circuit board 192 of the motor drive unit 190, for example, when the battery holder 170 is installed within the motor drive unit 190.

The battery holder 170 may be configured to be received within the cavity 181 of the housing 180. The second collar 178 may be positioned proximate to a far end of the cavity 181 and the battery holder 170 may be inserted into the housing 180 of the motor drive unit 190 (e.g., the cavity 181). The arm 174, the first cavity 171, and the second cavity 173 may be configured to enable the battery holder 170 to be rotated within the housing 180. For example, a force (e.g., a rotational force) may be applied to the arm 174 to rotate the battery holder 170 within the housing 180.

The battery holder 170 may be configured to be removed (e.g., completely removed as shown in FIG. 5) from the housing 180 of the motor drive unit 190 (e.g., the cavity 181). When the battery holder 170 is removed from the housing 180, the batteries 160 may be removed from the battery holder 170. Replacement batteries may be installed in the battery holder 170 and the battery holder 170 may be installed within the cavity 181 of the housing 180.

The battery holder 170 may be configured to be secured within the housing 180 of the motor drive unit 190 (e.g., the cavity 181) of the motor drive unit 190. When the battery holder 170 is installed within the housing 180 (e.g., the cavity 181), the battery holder 170 (e.g., the first collar 172) may be rotated to secure the battery holder 170 within the cavity 181 (e.g., to the housing 180). For example, the battery holder 170 (e.g., the first collar 172) may define one or more tabs (e.g., such as tabs 179 shown in FIG. 5) that are configured to secure the battery holder 170 to/within the housing 180. The tabs 179 may be located about a perimeter of the first collar 172. The housing 180 may define slots 189 that are configured to receive (e.g., captively receive) the tabs 179. Each of the slots 189 may extend partially about the perimeter of the housing 180 such that the tabs 179 can translate (e.g., angularly) therein as the battery holder 170 is rotated. The battery holder 170 (e.g., the first collar 172) may include two tabs 179 that are located approximately 180 degrees from one another and the housing 180 may define two slots 189 that are aligned with the tabs 179. The number of slots 189 in the housing 180 may be equal to the number of tabs 179 on the battery holder 170. For example, the battery holder 170 may be rotated between an unlocked position and a locked position in a circumferential direction (e.g., an angular direction). When in the unlocked position, the tabs 179 may be aligned with openings of the slots 189 such that the battery holder 170 can be removed from the housing 180 (e.g., the cavity 181). Although the battery holder 170 is shown having two tabs 179 and the housing 180 is shown with two slots 189, it should be appreciated that the battery holder 170 may include any number of tabs 179 (e.g., one, two, more than two) and the housing 180 may define any number of slots 189 (e.g., one, two, more than two).

The motor drive unit 190 may include an actuation portion 176. The actuation portion 176 may comprise a button. For example, the actuation portion 176 may be configured to move in the longitudinal direction L in response to a force applied to the actuation portion 176. The button 176 may be accessible when the motorized window treatment 100 is in the extended position. For example, the actuation portion 176 may be accessible when the motorized window treatment 100 is in the extended position. The actuation portion 176 may be covered by the stationary portion 125A of the first mounting bracket 130A when the motorized window treatment 100 is in the operating position. The actuation portion 176 may be configured to rotate the roller tube 110, enable a mode change, and/or enter an association mode for the motor drive unit 190. For example, the control circuit (e.g., such as control circuit 420 shown in FIG. 34) may be configured to enter a configuration mode (e.g., an association mode) in response to an actuation of the actuation portion 176. For example, during the configuration procedure of the motorized window treatment 100, the motor drive unit 190 may be associated with a remote control device, such that the control circuit of the motor drive unit 190 may be responsive to the wireless signals transmitted by the remote control device. In addition, the motor drive unit 190 may be configured with one or more operational settings (e.g., preset positions between the raised position and the lowered position) during the configuration procedure.

The mounting brackets 130A, 130B may be configured to operate the motorized window treatment 100 between the operating position and the extended position. For example, pivoting portions 150A, 150B may be configured to operate the motorized window treatment 100 between the operating position and the extended position. The pivoting portions 150A, 150B may be referred to as sliding portions, rotating portions, and/or movable portions. A portion (e.g., the first collar 172 of the battery holder 170) of the motor drive unit 190 may be accessible when the motorized window treatment 100 is in the extended position. The pivoting portion 150A, 150B may be aligned with the stationary portion 125A, 125B when the motorized window treatment 100 is in the operating position such that the end portion of the motor drive unit 190 is covered by the stationary portion 125A.

Figure 7:
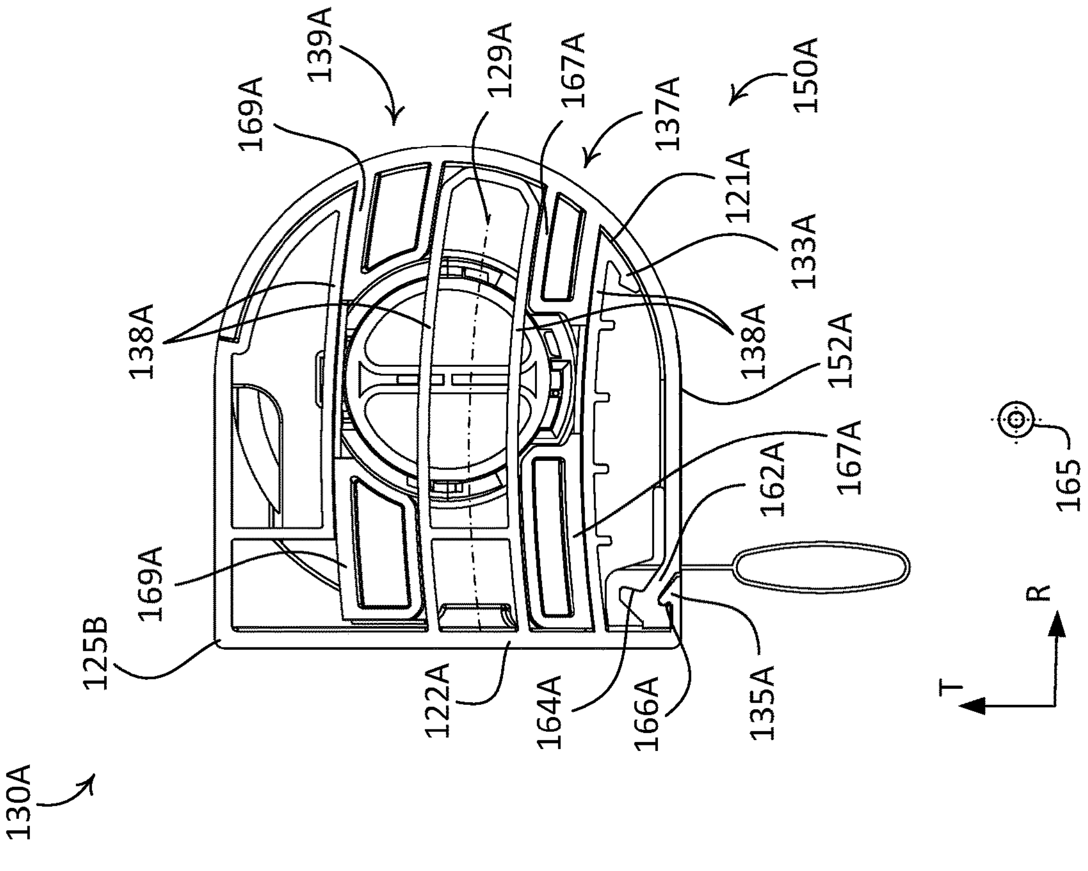
FIG. 7 is a left-side cross-section view of the example motorized window treatment shown in FIG. 1 with the roller tube in the operating position.
Figure 8:
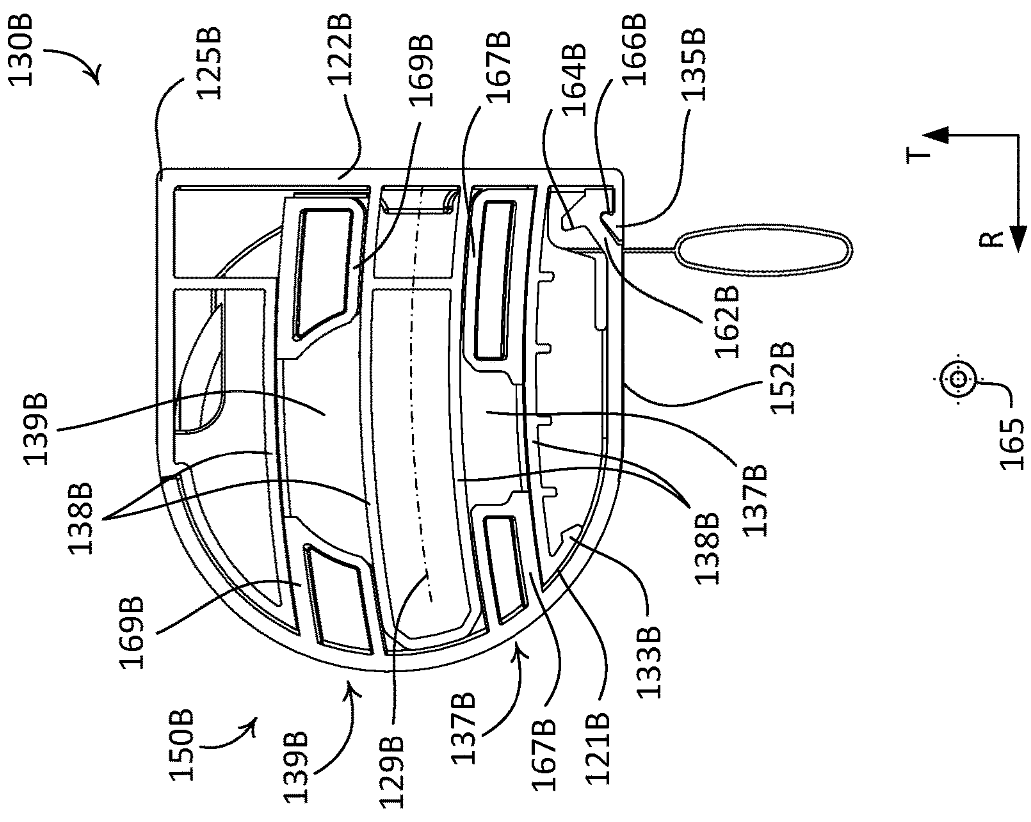
FIG. 8 is right-side cross-section view of the example motorized window treatment shown in FIG. 1 with the roller tube in the operating position.
Figure 10:
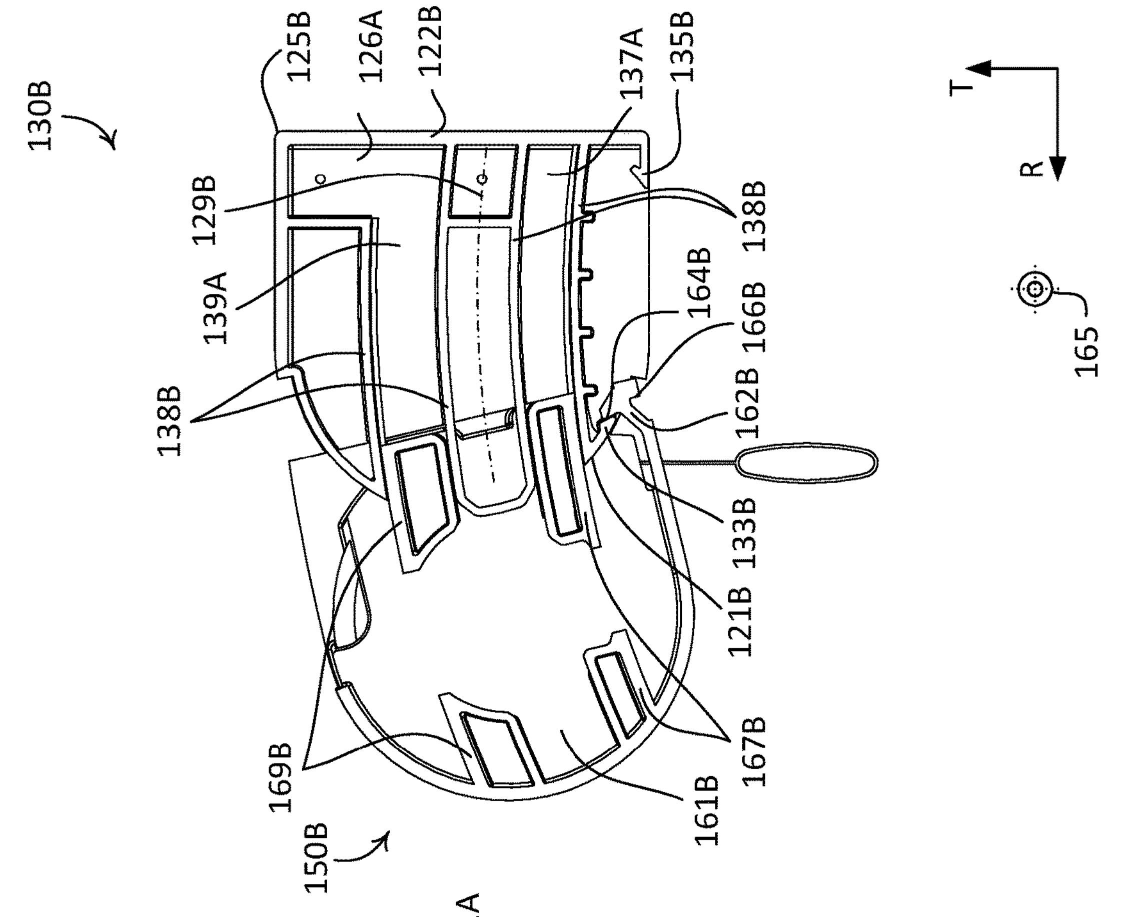
FIG. 10 is another right-side cross-section view of the example motorized window treatment shown in FIG. 1 with the roller tube in the extended position.
Figure 9:
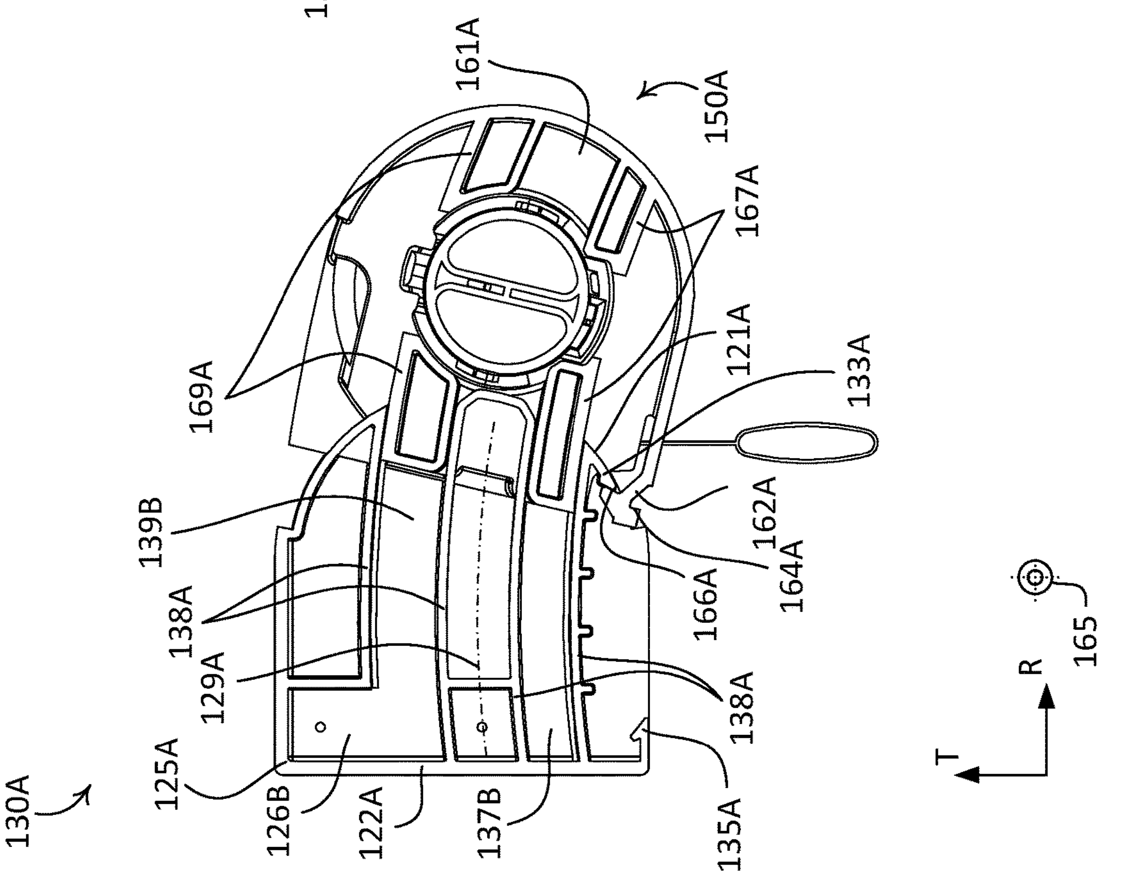
FIG. 9 is another left-side cross-section view of the example motorized window treatment shown in FIG. 1 with the roller tube in the extended position.
Figure 11:
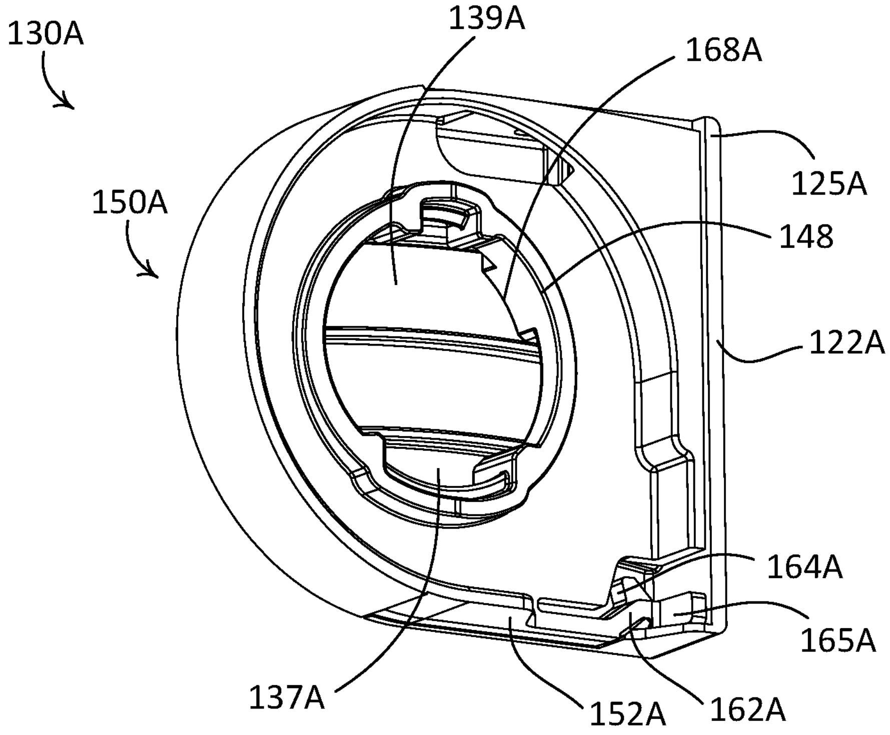
FIG. 11 is a perspective view of an example mounting bracket with a pivoting portion aligned with a stationary portion.
Figure 12:
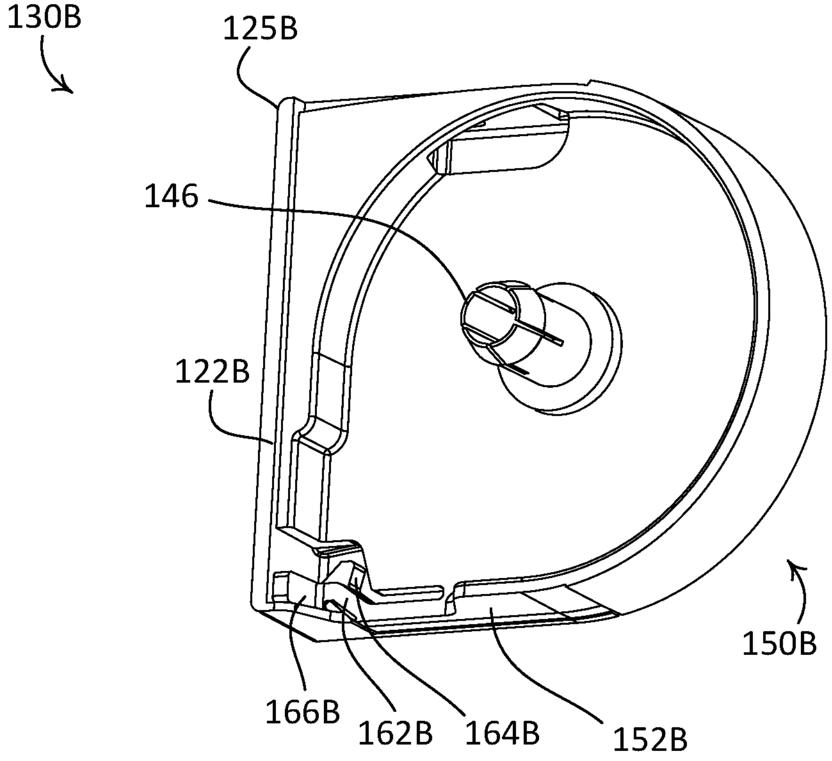
FIG. 12 is a perspective view of another example mounting bracket with the pivoting portion aligned with the stationary portion.
Figure 13:
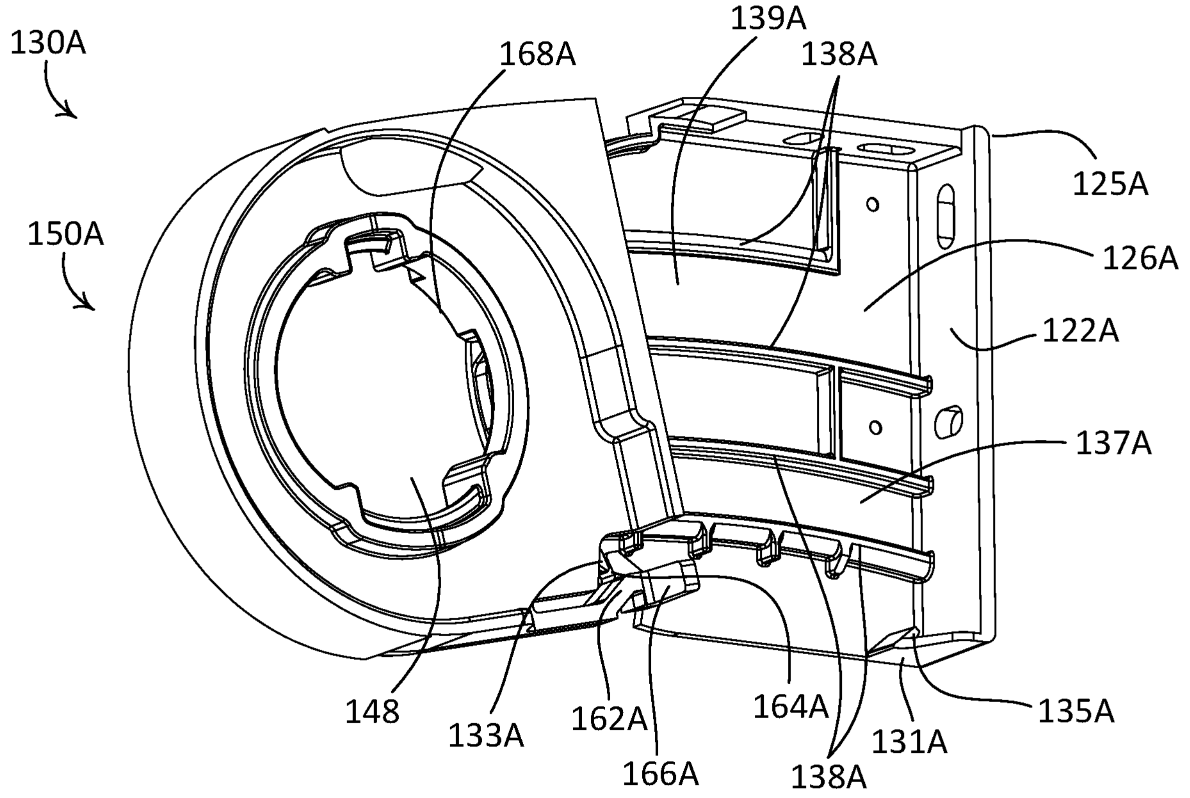
FIG. 13 is a perspective view of the example mounting bracket shown in FIG. 11 with the pivoting portion pivoted away from the stationary portion.
Figure 14:
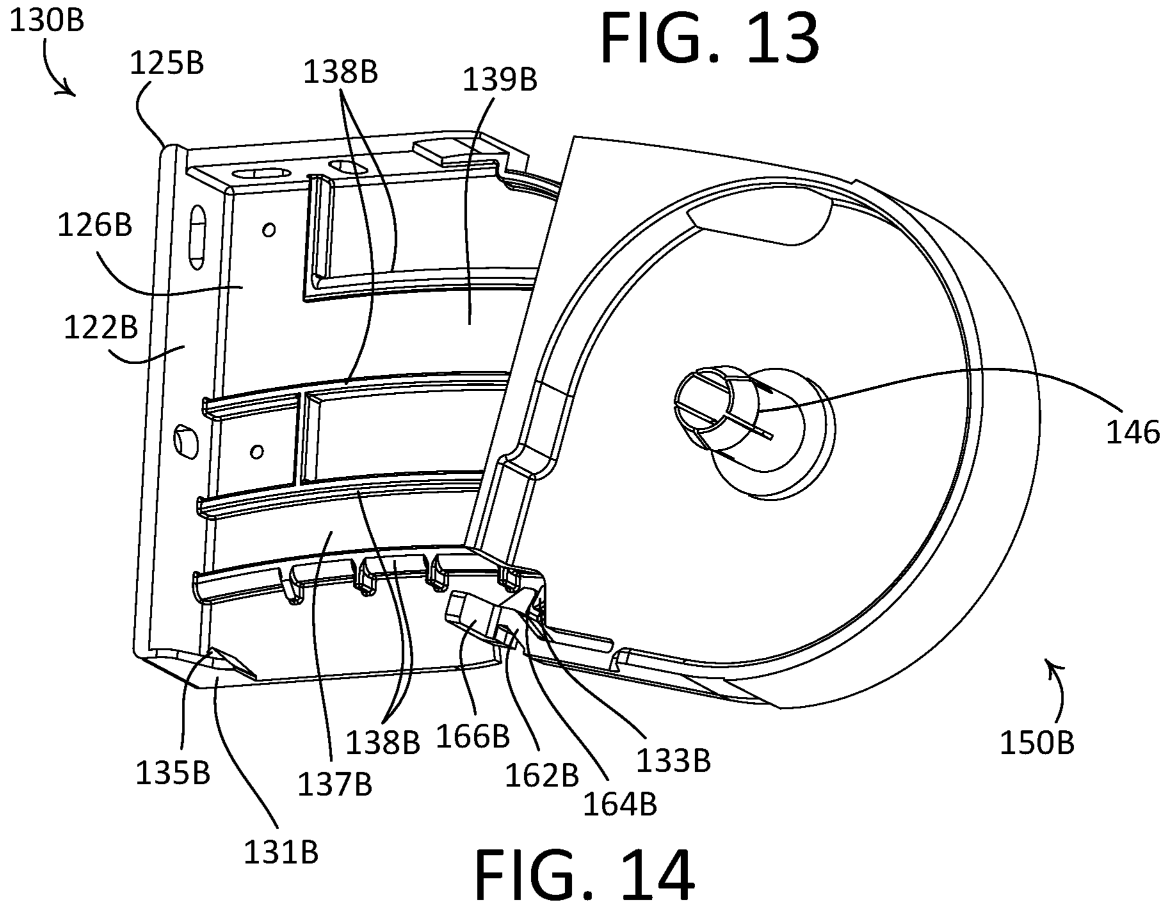
FIG. 14 is a perspective view of the example mounting bracket shown in FIG. 12 with the pivoting portion pivoted away from the stationary potion.

FIGS. 7 and 8 are side cross-section views of the example motorized window treatment 100 in the operating position. FIG. 7 is a left-side cross-section taken through the mounting bracket 130A looking toward the mounting bracket 130B. FIG. 8 is a right-side cross-section taken through the mounting bracket 130B looking toward the mounting bracket 130A. FIGS. 9 and 10 are side cross-section views of the example motorized window treatment 100 in the extended position. FIG. 9 is a left-side cross-section taken through the mounting bracket 130A looking toward the mounting bracket 130B. FIG. 10 is a right-side cross-section taken through the mounting bracket 130B looking toward the mounting bracket 130A. FIGS. 11 and 12 are perspective views of the respective mounting brackets 130A, 130B when the motorized window treatment 100 is in the operating position. FIGS. 13 and 14 are perspective views of the respective mounting brackets 130A, 130B when the motorized window treatment 100 is in the extended position.

The mounting brackets 130A, 130B may be configured to enable access to one or more ends of the roller tube 110 and/or the motor drive unit 190 while the window treatment assembly 111 remains secured to the mounting brackets 130A, 130B. For example, the motorized window treatment 100 may be adjusted (e.g., rotated, pivoted, and/or slid) between an operating position (e.g., as shown in FIG. 1) to an extended position (e.g., as shown in FIGS. 4 and 5) while the window treatment assembly 111 is secured to the mounting brackets 130A, 130B. The operating position may be defined as a position in which the roller tube 110 of the window treatment assembly 111 is supported by and aligned with both mounting brackets 130A, 130B. The extended position may be defined as a position in which one or more ends of the roller tube 110 and/or the motor drive unit 190 are accessible while still attached to the mounting brackets 130A, 130B.

When in the motorized window treatment 100 is in the extended position, the one or more ends (e.g., end portions) of the motor drive unit 190 and/or roller tube 110 may be accessed, for example, to replace batteries, adjust one or more settings, make an electrical connection, repair one or more components, and/or the like. One or more of the mounting brackets 130A, 130B may enable an end portion of the motor drive unit 190, such as the end portion 188 of the motor drive unit 190, to be accessed when the motorized window treatment 100 is in the extended position. Each of the mounting brackets 130A, 130B may include a respective stationary portion 125A, 125B configured to be mounted to the structure and a respective movable portion 150A, 150B configured to move (e.g., slide, pivot, or rotate) away from the structure. For example, the movable portions 150A, 150B may be sliding portions, pivoting portions, and/or rotating portions. The movable portions 150A, 150B may be referred to as pivoting portions, sliding portions, and/or rotating portions. For example, the movable portion 150A of the first mounting bracket 130A may be configured to move (e.g., slide, pivot, or rotate) away from the structure to enable the end portion 188 of the motor drive unit 190 to be accessible. For example, a first portion (e.g., the movable portion 150A, 150B) of one or more of the mounting brackets 130A, 130B may pivot or rotate away from a second portion (e.g., the stationary portion 125A, 125B). For example, the movable portions 150A, 150B of the mounting brackets 130A, 130B may be adjusted with respect to the stationary portions 125A, 125B, for example, to expose the end portion 188 of the motor drive unit 190 and/or the idler end portion 114 disposed in the roller tube 110.

The window treatment assembly 111 of the motorized window treatment 100 may be configured to move (e.g., slide, pivot, or rotate) between the operating position and the extended position along a circular path 129A, 129B. For example, the window treatment assembly 111 may move about a fulcrum 165 that is located below the window treatment assembly 111 (e.g., the mounting brackets 130A, 130B) in the transverse direction T. For example, the fulcrum 165 may be located below a respective lower wall 131A, 131B of the stationary portion 125A, 125B of the mounting brackets 130A, 130B (e.g., outside of an area defined by each of the mounting brackets 130A, 130B). Stated differently, the fulcrum 165 may be located outside of a footprint (e.g., projection) of the mounting brackets 130A, 130B in a plane defined by the transverse direction T and the radial direction R. The fulcrum 165 may be the center of a circle defined by the circular path 129A, 129B. Both of the mounting brackets 130A, 130B may be moved when the motorized window treatment 100 is in the extended position. For example, the movable portions 150A, 150B of both of the mounting brackets 130A, 130B may be configured to slide away from the stationary portions 125A, 125B, for example, along the circular path 129A, 129B. In this configuration, both ends of the roller tube 110 may be further from the window and/or the structure when the motorized window treatment 100 is in the extended position than when the motorized window treatment 100 is in the operating position. Stated differently, the window treatment assembly 111 of the motorized window treatment 100 may slide between the operating position and the extended position, for example, along the circular path 129A, 129B.

The mounting brackets 130A, 130B may be configured to operate the motorized window treatment 100 between the operating position and the extended position. A portion (e.g., such as the first collar 172 of the battery holder 170 shown in FIG. 6) of the motor drive unit 190 may be accessible when the motorized window treatment 100 is in the extended position. The movable portion 150A, 150B may be aligned with the stationary portion 125A, 125B when the motorized window treatment 100 is in the operating position such that the end portion of the motor drive unit 190 is covered by the stationary portion 125A.

The mounting brackets 130A, 130B may be configured to secure the motorized window treatment 100 in the extended position and/or the operating position. The mounting brackets 130A, 130B may include respective stopping mechanisms, e.g., such as stopping arms 162A, 162B, that are configured to prevent the motorized window treatment 100 from extending beyond the extended position. Each stopping arm 162A, 162B may be made of a stiff material, for example, such as metal, plastic, or a composite material. The stopping arms 162A, 162B may extend from a lower wall 152A, 152B of the movable portions 150A, 150B. The stopping arms 162A, 162B may be configured to engage respective tabs 133A, 133B extending from the stationary portions 125A, 125B, for example, when the motorized window treatment 100 is in the extended position. Each tab 133A, 133B may extend from a front edge 121A, 121B of the stationary portions 125A, 125B. The front edge 121A, 121B may be curved. The tabs 133A, 133B may be configured to prevent the motorized window treatment 100 from extending beyond the extended position. The stopping arms 162A, 162B may each define an upper surface 164A, 164B that is configured to abut the tab 133A, 133B when the motorized window treatment 100 is in the extended position.

The stopping arms 162A, 162B may be configured to secure the motorized window treatment 100 in the operating position. Each stopping arm 162A, 162B may be configured to engage a respective catch 135A, 135B extending from the stationary portion 125A, 125B. For example, each catch 135A, 135B may extend from the lower wall 131A, 131B of the respective stationary portion 125A, 125B. Each catch 135A, 135B may be configured to engage the respective stopping arm 162A, 162B when the motorized window treatment is in the operating position. The stopping arms 160A, 160B may define a lower surface 166A, 166B that is configured to abut the catch 135A, 135B when the motorized window treatment is in the extended position. The catch 135A, 135B may be configured to resist a pre-defined threshold force applied to the roller tube in a direction away from the window (e.g., the radial direction R). For example, the stopping arms 162A, 162B may be configured to disengage from the catches 135A, 135B when a force greater than the pre-defined threshold force is applied to the roller tube in the direction away from the window.

Each of the mounting brackets 130A, 130B (e.g., the stationary portion 125A, 125B) may define one or more channels (e.g., such as channels 137A, 139A on mounting bracket 130A and channels 137B, 139B on mounting bracket 130B). Each of the channels 137A, 139A may be defined by a respective pair of ribs 138A. Each of the channels 137B, 139B may be defined by a respective pair of ribs 138B. The ribs 138A, 138B may extend from a side plate 126A, 126B of the mounting brackets 130A, 130B. The channels 137A, 139A, 137B, 139B may be curved. A curvature of the channels 137A, 139A, 137B, 139B may define the circular-shaped path 129A, 129B. The curvature of the channels 137A, 139A, 137B, 139B may be configured to enable the end portion of the motor drive unit and/or roller tube may be accessed, for example, to replace batteries, adjust one or more settings, make an electrical connection, repair one or more components, and/or the like.

Each of the mounting brackets 130A, 130B (e.g., the stationary portion 125A, 125B) may define one or more slide guides 167A, 167B, 169A, 169B. The slide guides 167A, 167B, 169A, 169B may protrude (e.g., in the longitudinal direction L) from an outer surface 161A, 161B of the movable portion 150A, 150B. The slide guides 167A, 167B, 169A, 169B may be configured to be received within respective channels 137A, 139A, 137B, 139B. The slide guides 167A, 167B, 169A, 169B and the channels 137A, 139A, 137B, 139B may be configured to support the window treatment assembly (e.g., in the transverse direction T). The slide guides 167A, 167B, 169A, 169B and the channels 137A, 139A, 137B, 139B may be configured to enable the movable portion 150A, 150B to slide with respect to the stationary portion 125A, 125B. The channels 137A, 139A, 137B, 139B (e.g., and the slide guides 167A, 167B, 169A, 169B) may define the circular path 110A, 110B. For example, the channels 137A, 139A, 137B, 139B (e.g., and the slide guides 167A, 167B, 169A, 169B) may define a curvature that matches the circular path 129A, 129B. One or more of the slide guides 167A, 167B, 169A, 169B may remain within the channels 137A, 139A, 137B, 139B when the motorized window treatment is in the extended position. One or more of the slide guides 167A, 167B, 169A, 169B may leave the channels 137A, 139A, 137B, 139B when the motorized window treatment is in the extended position. One or more of the slide guides 167A, 167B, 169A, 169B may abut (e.g., and slide along) one or more of the channels 137A, 139A, 137B, 139B as the motorized window treatment is operated between the operating position and the extended position.

The mounting bracket 130A may be configured to receive and support the end portion of the motor drive unit 190. For example, the movable portion 150A of the mounting bracket 130A may define an opening 148 that is configured to receive the end portion of the motor drive unit 190. The mounting bracket 130B may be configured to support the idler end portion 114 of the motorized window treatment 100. The idler end portion 114 may be received in the cavity 115 of the roller tube 110. For example, the movable portion 150B of the mounting bracket 100B may define an idler pin 146. The idler pin 146 may be configured to be received within an opening 144 (e.g., as shown in FIG. 6) in the idler end portion 114 of the motorized window treatment 100, for example, to support the idler end portion 114 in the second end 113 of the roller tube 110. The idler end portion 114 of the motorized window treatment 100 may be configured to rotate about the idler pin 146 of the mounting bracket 130B.

Figure 15:
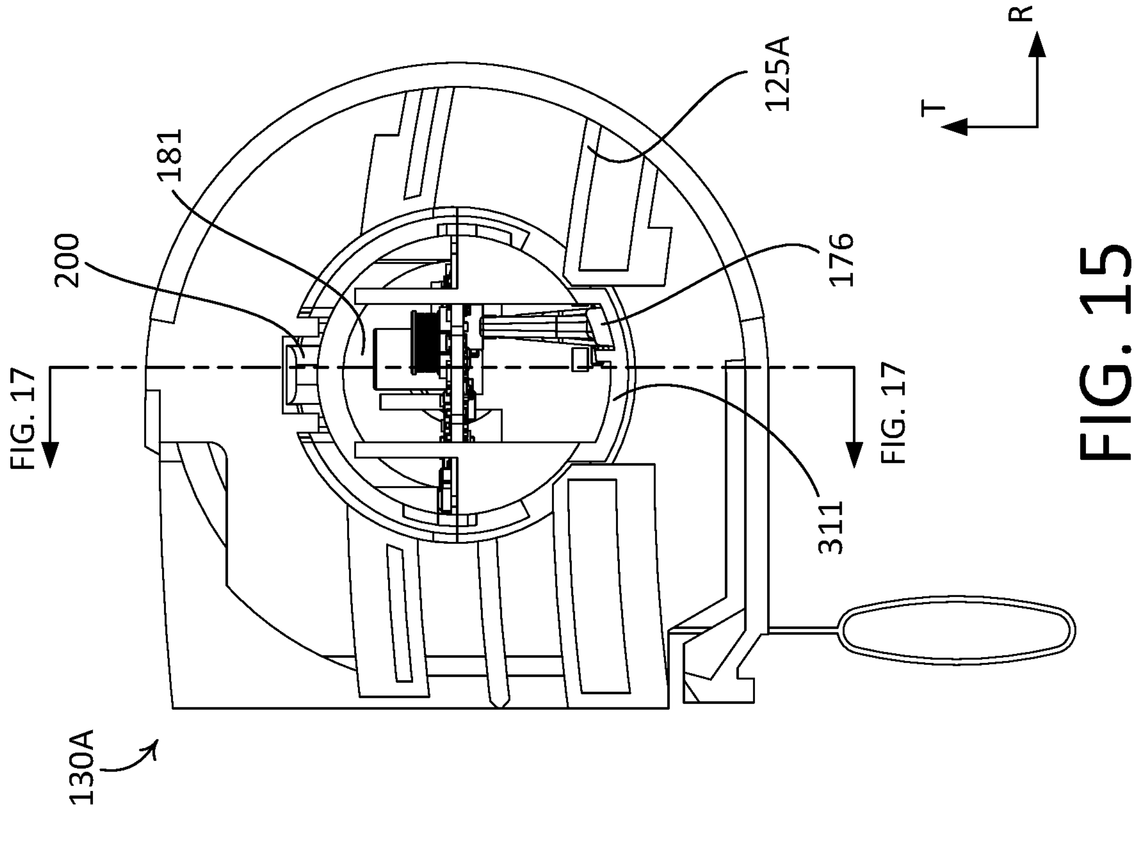
FIGS. 15 and 16 are left-side views of the motorized window treatment shown in FIG. 1 with the movable portions detached from the stationary portions of the mounting brackets.
Figure 16:
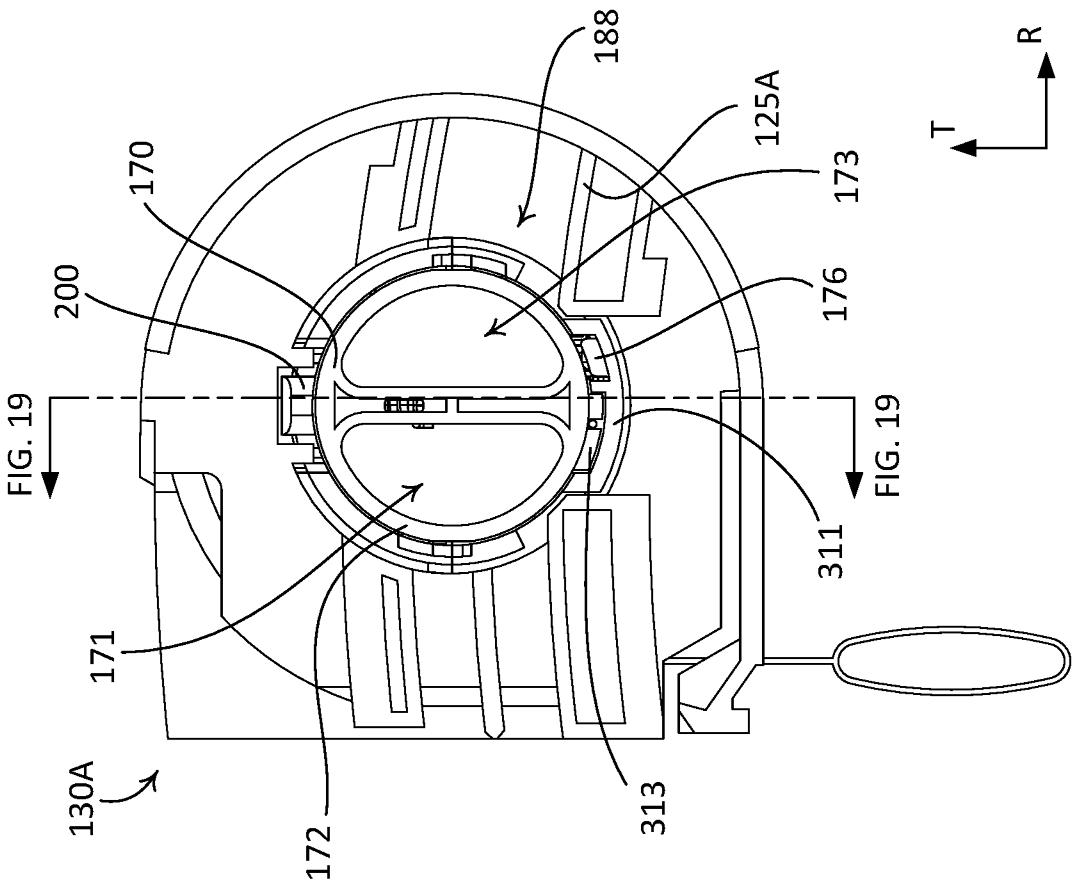
Figure 18:
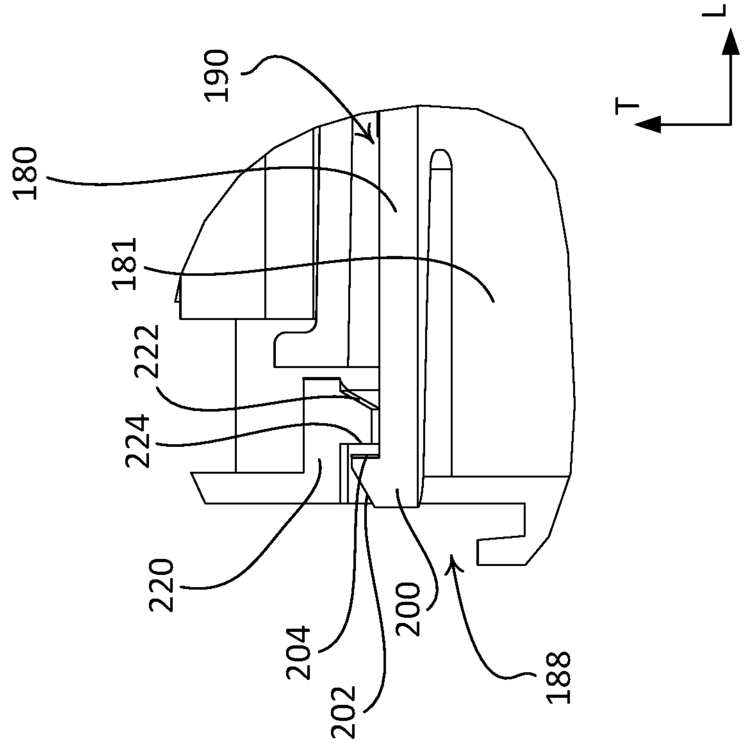
FIGS. 17-20 are partial front cross-sectional views of the motorized window treatment taken through the center of the roller tube.
Figure 17:
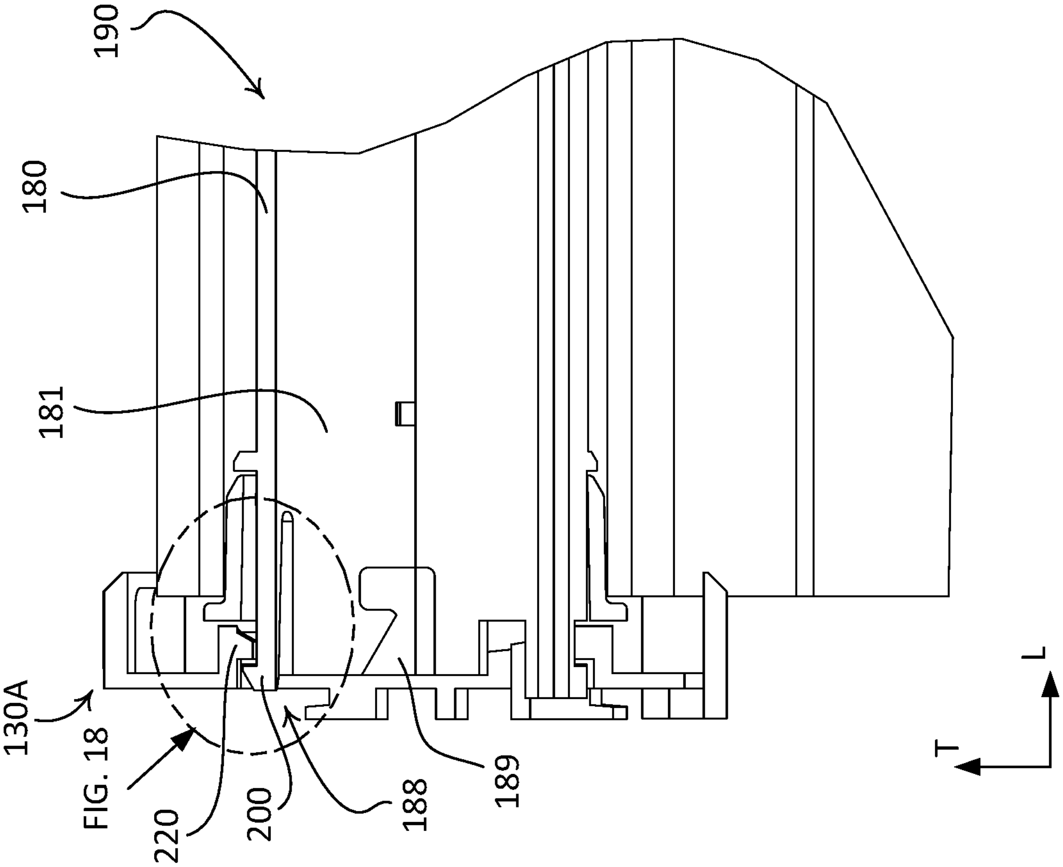
Figure 20:
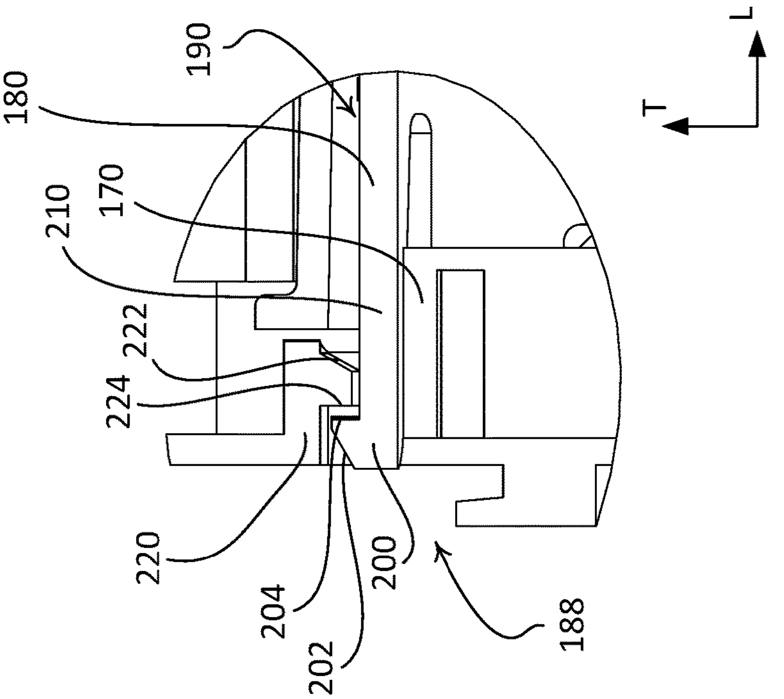
Figure 19:
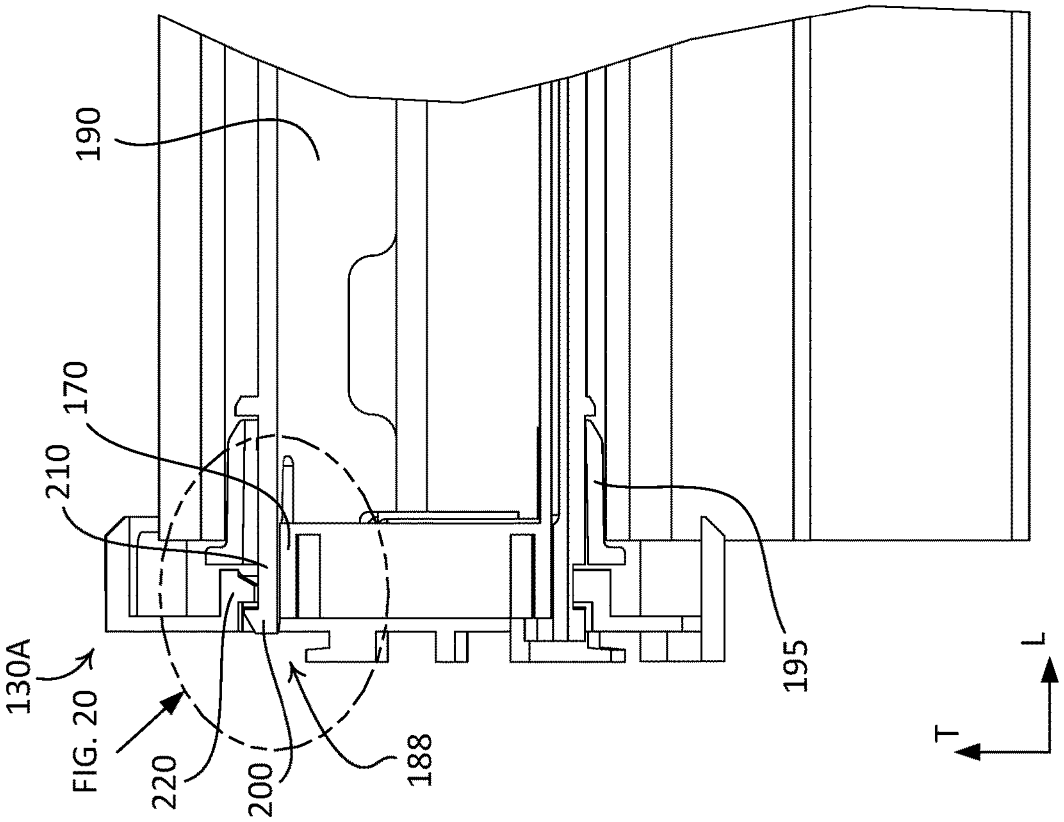
Figure 21:
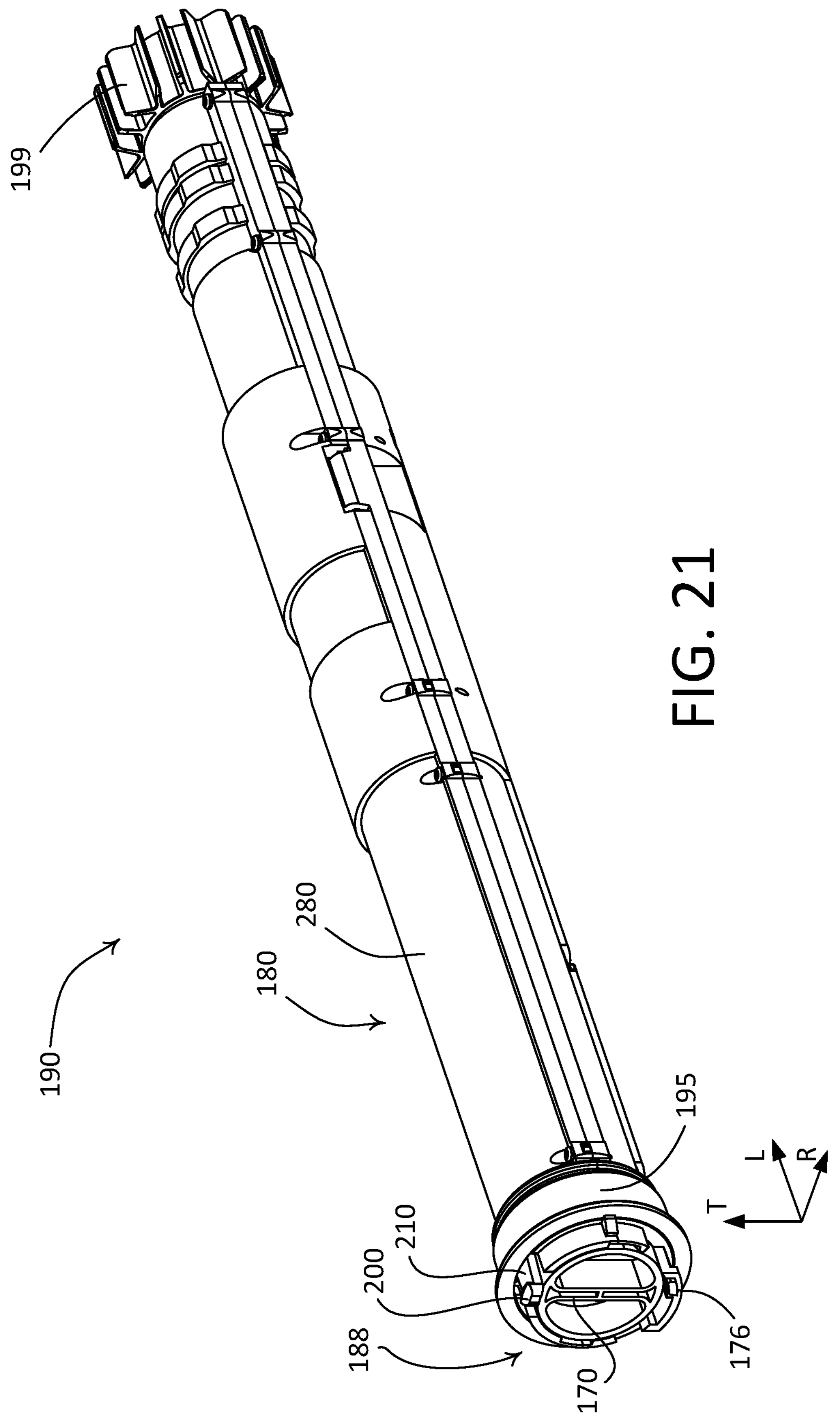
FIG. 21 is a top perspective view of a motor drive unit of the motorized window treatment of FIG. 1.
Figure 22:
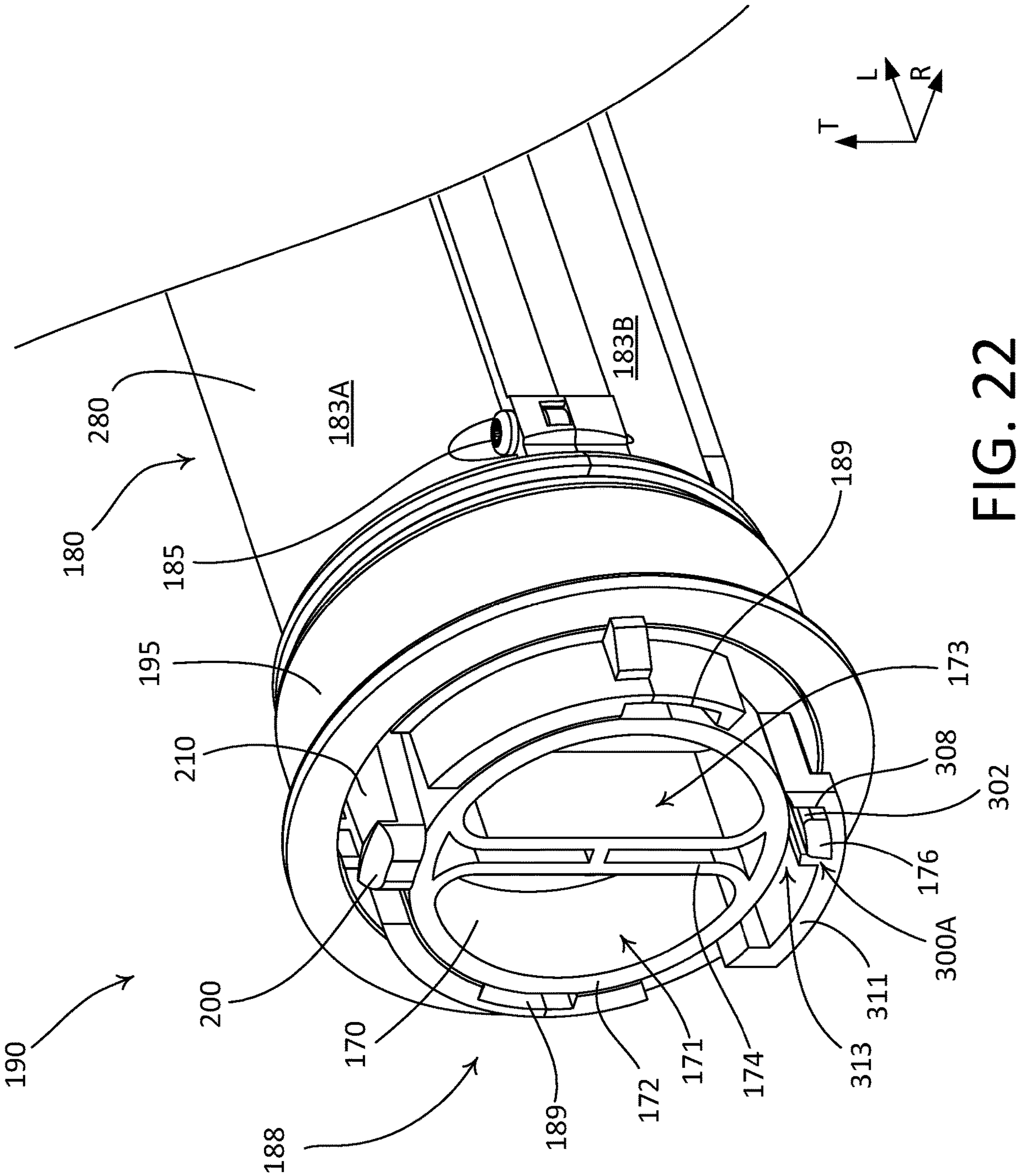
FIG. 22 is an enlarged perspective view of an end portion of the motor drive unit of FIG. 21.

FIGS. 15 and 16 are left-side views of the motorized window treatment 100 with the movable portions 150A, 150B detached from the stationary portions 125A, 125B of the mounting brackets 130A, 130A, respectively. FIG. 15 shows the battery holder 170 removed from the cavity 181 of the housing 180 of the motor drive unit 190, and FIG. 16 shows the battery holder 170 installed in the cavity 181 of the housing 180 of the motor drive unit 190. FIG. 17 is a partial front cross-sectional view of the motorized window treatment 100 (e.g., taken through the center of the roller tube 110) with the batteries 160 (e.g., the battery holder 170) removed from the cavity 181 of the housing 180 of the motor drive unit 190. FIG. 18 is an enlarged partial view of the front cross-sectional view of FIG. 17. FIG. 19 is a partial front cross-sectional view of the motorized window treatment 100 (e.g., taken through the center of the roller tube 110) with the battery holder 170 installed in the cavity 181 of the housing 180 of the motor drive unit 190. FIG. 20 is an enlarged partial view of the front cross-sectional view of FIG. 19. FIG. 21 is a top perspective view of the motor drive unit 190 of the motorized window treatment 100. FIG. 22 is an enlarged perspective view of the end portion 188 of the motor drive unit 190.

The motorized window treatment 100 may be configured to be secured to one or more of the mounting brackets (e.g., such as the mounting bracket 130A). For example, the end portion 188 of the motor drive unit 190 may be configured to be secured to the mounting bracket 130A. The motor drive unit 190 (e.g., the end portion 188 of the motor drive unit 190) may define a snap 200. For example, the housing 180 may comprise the snap 200 such that the snap 200 extends from the housing 180 (e.g., the end portion 188 of the motor drive unit 190). The snap 200 may be configured to secure the motor drive unit 190 to the mounting bracket 130A. The motor drive unit 190 may define a snap arm 210. The snap 200 may extend from the snap arm 210. The snap 200 may be located on a distal end of the snap arm 210. For example, the snap arm 210 may be configured such that the snap 200 extends beyond the end portion 188 of the motor drive unit 190. The snap arm 210 may be configured to flex such that the snap 200 moves in the transverse direction T. For example, the snap arm 210 may enable the snap 200 to move in the transverse direction T when a force is applied to the snap 200.

As the window treatment assembly 111 is mounted to the mounting bracket 130A, the snap 200 may be configured to move into a space occupied by the battery holder 170. For example, the snap 200 may move into the cavity 181 when a force is applied thereto. The battery holder 170 may be removed from the cavity 181, for example, to enable the snap 200 to translate into the cavity 181.

The snap 200 may be configured to engage with a corresponding feature on the mounting bracket 130A. For example, the mounting bracket 130A (e.g., the pivoting portion 150A) may define a catch 220 that is configured to engage with the snap 200. The snap 200 and the catch 220 may be configured to prevent the motor drive unit 190 from disengaging from the mounting bracket 130A. The snap 200 may define a sloped surface 202 and a vertical surface 204. For example, the sloped surface 202 may be angularly offset from the vertical surface 204. The vertical surface 204 may extend along a plane defined by the transverse direction T and the radial direction R. The catch 220 may define a sloped surface 222 and a vertical surface 224. For example, the sloped surface 222 may be angularly offset from the vertical surface 224. The vertical surface 224 may extend along the plane defined by the transverse direction T and the radial direction R. The sloped surface 202 of the snap 200 may abut the sloped surface 222 of the catch 220, for example, as the motor drive unit 190 is translated toward the mounting bracket 130A. After the sloped surface 202 of the snap 200 abuts the sloped surface 220 of the catch 220, further translation of the motor drive unit 190 in the longitudinal direction toward the mounting bracket 130A may flex the snap arm 210 such that the snap moves into the cavity 181. For example, the catch 220 (e.g., the sloped surface 222) may apply a force on the snap 200 (e.g., the sloped surface 202) in the transverse direction T.

As the motor drive unit 190 is further translated toward the mounting bracket 130A, the sloped surface 202 of the snap 200 may extend beyond the sloped surface 222 of the catch 220 such that the sloped surfaces 202, 222 do not abut one another. When the sloped surface 202 of the snap 200 extends beyond the sloped surface 222 of the catch 220, the snap 200 (e.g., the snap arm 210) may return to its original position relative to the housing 180 (e.g., not flexed in the transverse direction T). The vertical surface 204 of the snap 200 may be configured to abut the vertical surface 224 of the catch 220 to resist disengagement of the motor drive unit 190 from the mounting bracket 130A. For example, the vertical surface 204 of the snap 200 may abut the vertical surface 224 of the catch 220 when the motor drive unit 190 moves in the longitudinal direction L (e.g., toward the other mounting bracket 130B). When the snap arm 210 returns to its original position relative to the housing 180, the battery holder 170 may be installed within the cavity 181. The snap 200 may be configured to be locked in place (e.g., proximate to the catch 220) when the battery holder 170 is installed within the cavity 181. When the battery holder 170 is installed within the cavity 181, the motor drive unit 190 may be secured to the mounting bracket 130A. For example, the snap arm 210 may be unable to flex into the cavity 181 when the battery holder 170 is installed within the cavity 181. Stated differently, the battery holder 170 may prevent the snap arm 210 from flexing into the cavity 181.

The snap 200 and the catch 220 may be configured to provide positive feedback as the motor drive unit 190 is installed to the mounting bracket 130A. For example, the snap 200 and the catch 220 may be configured to ensure that the motor drive unit 190 is installed properly to the mounting bracket 130A. For example, the battery holder 170 cannot be installed if the motor drive unit 190 is not mounted correctly to the mounting bracket 130A. The motor drive unit 190 cannot be operated unless the battery holder 170 is installed. Thus, the motor drive unit 190 cannot be operated if the motor drive unit 190 is not mounted correctly to the mounting bracket 130A.

Figure 23:
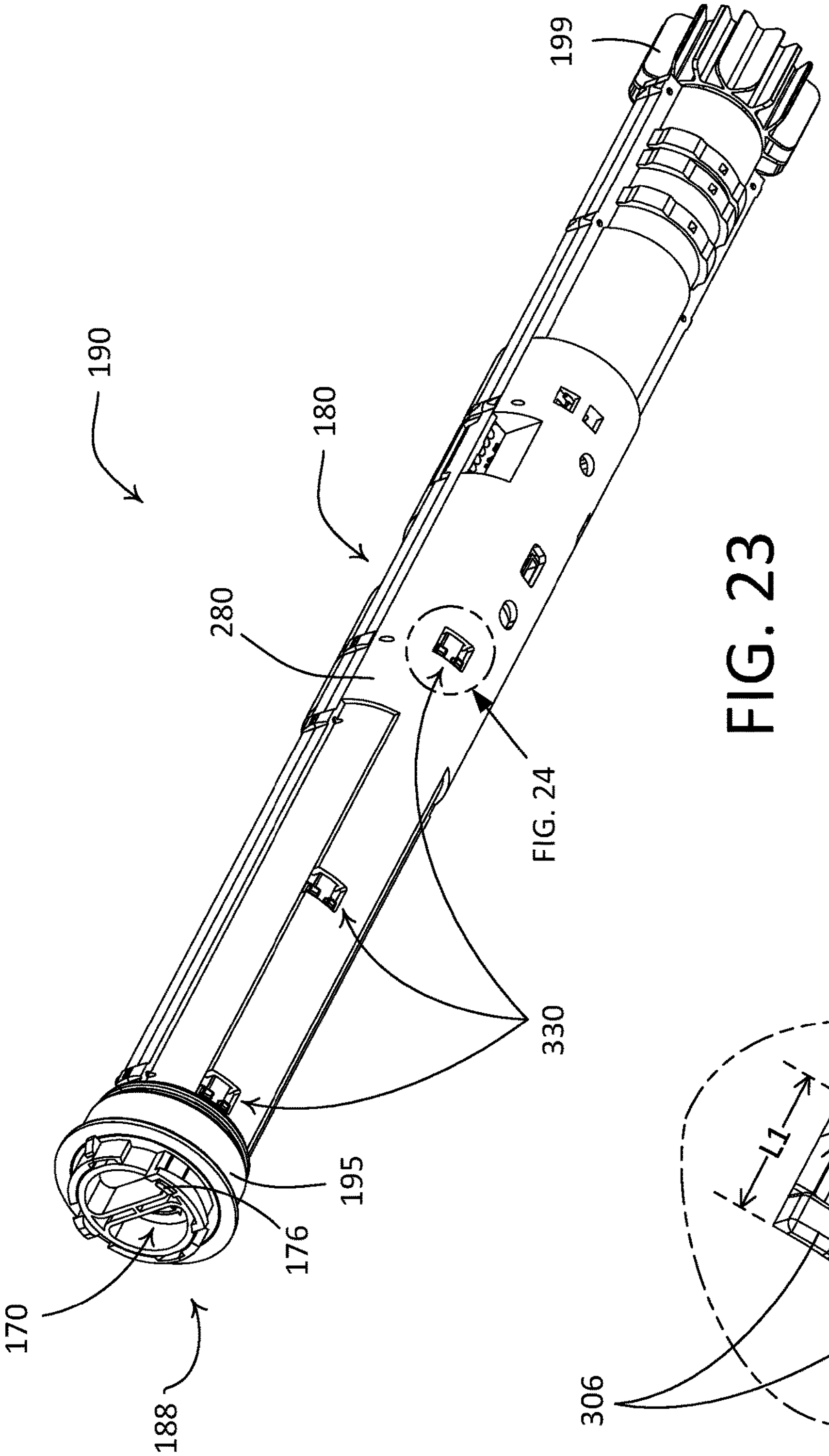
FIG. 23 is a bottom perspective view of the motor drive unit of FIG. 21.
Figure 24:
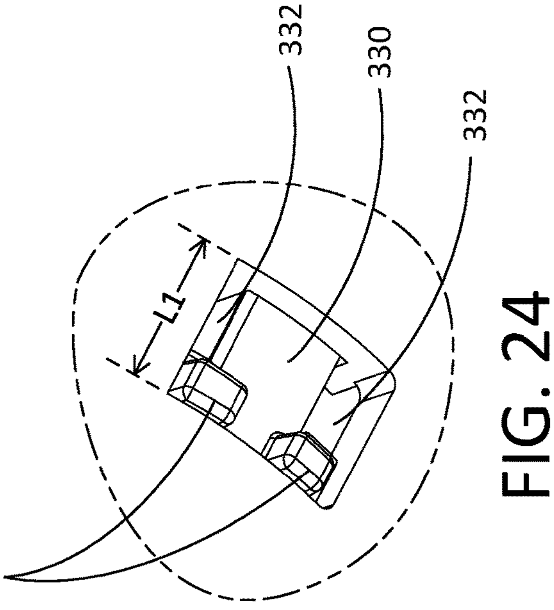
FIG. 24 is an enlarged partial view of the perspective view of FIG. 23.
Figure 25A:
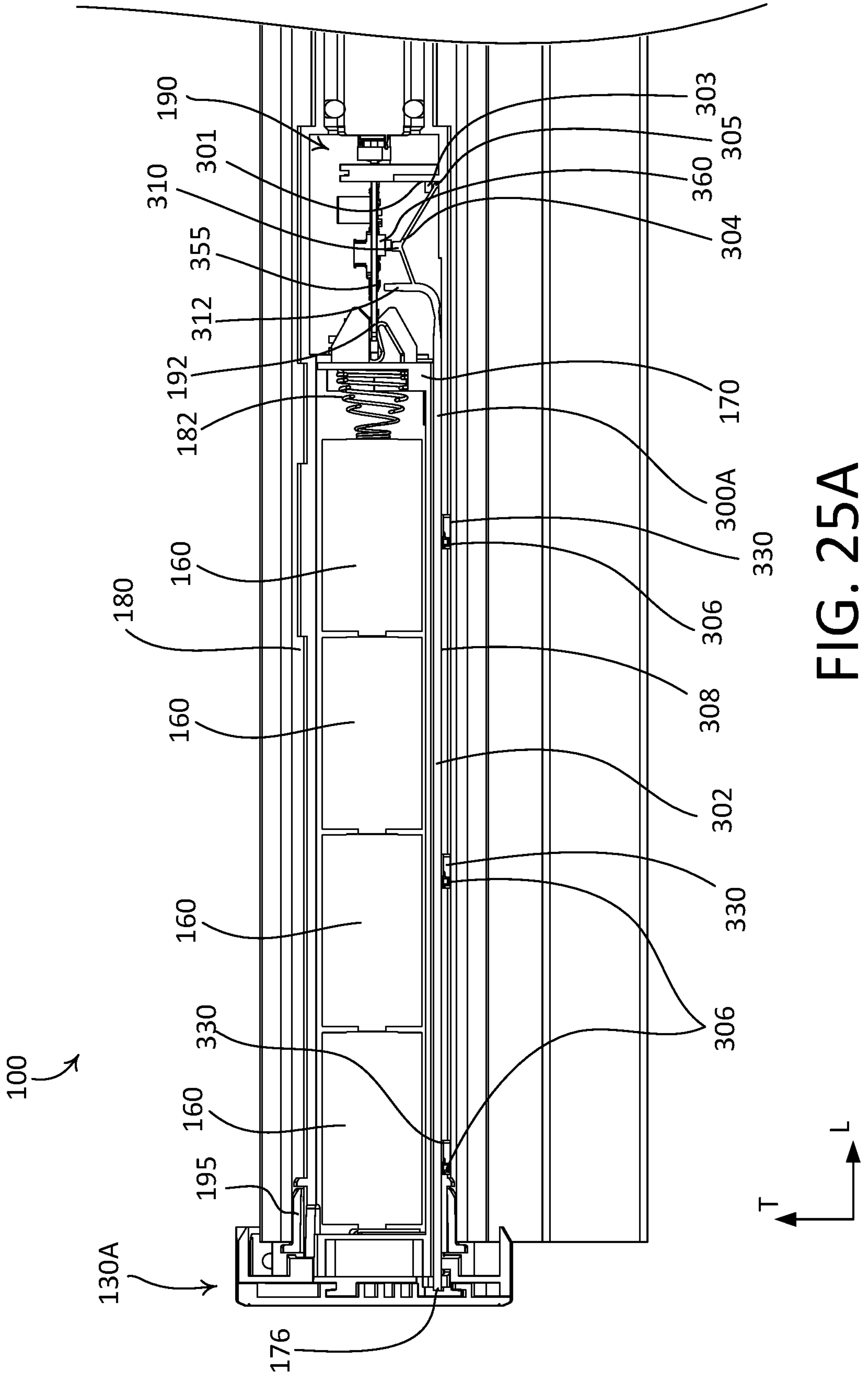
FIG. 25A is a partial front cross-sectional view of the motorized window treatment of FIG. 1 taken through the center of an example actuation member of the motor drive unit.
Figure 25B:
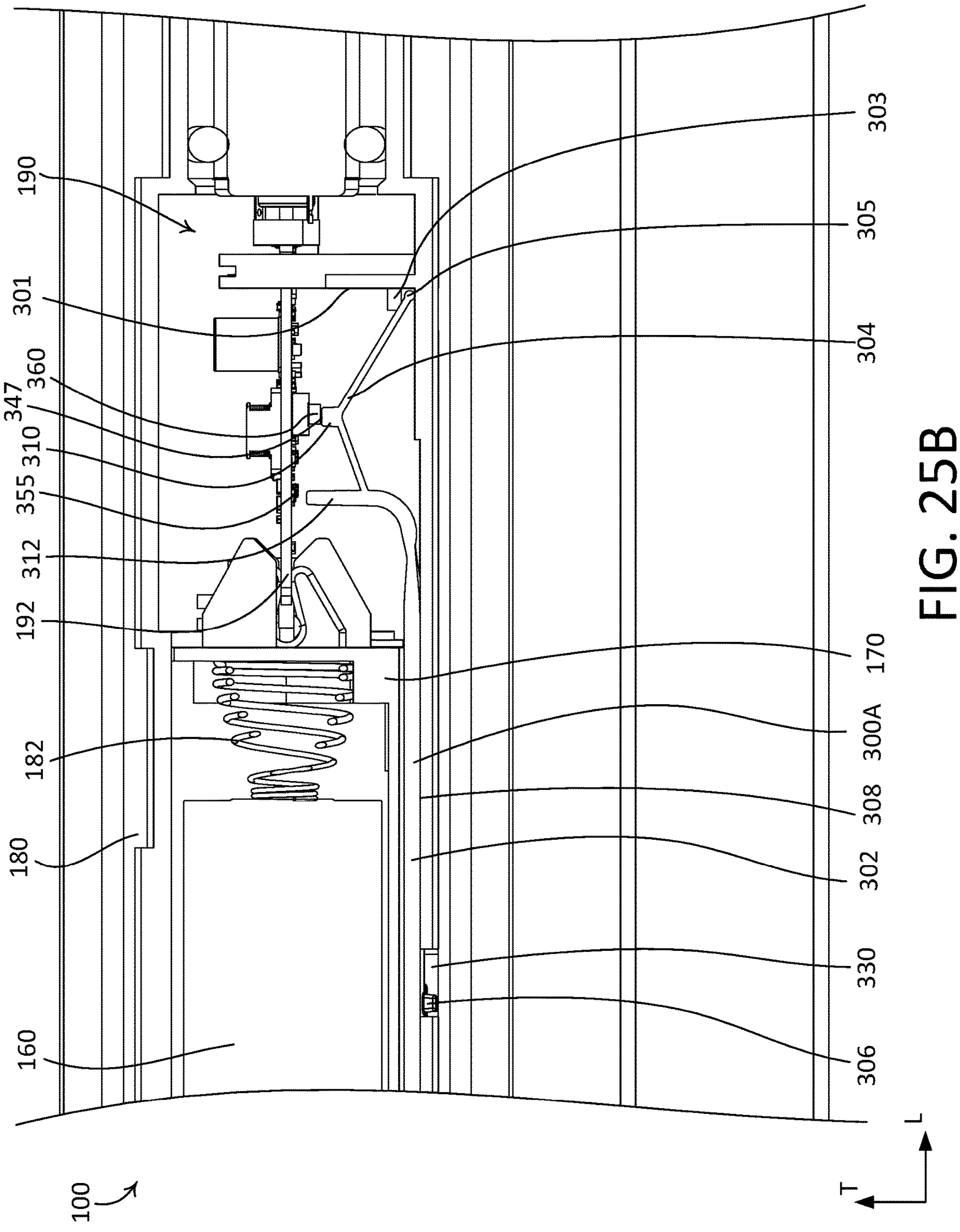
FIG. 25B is an enlarged view of the partial front cross-sectional view of FIG. 25A.
Figure 26:
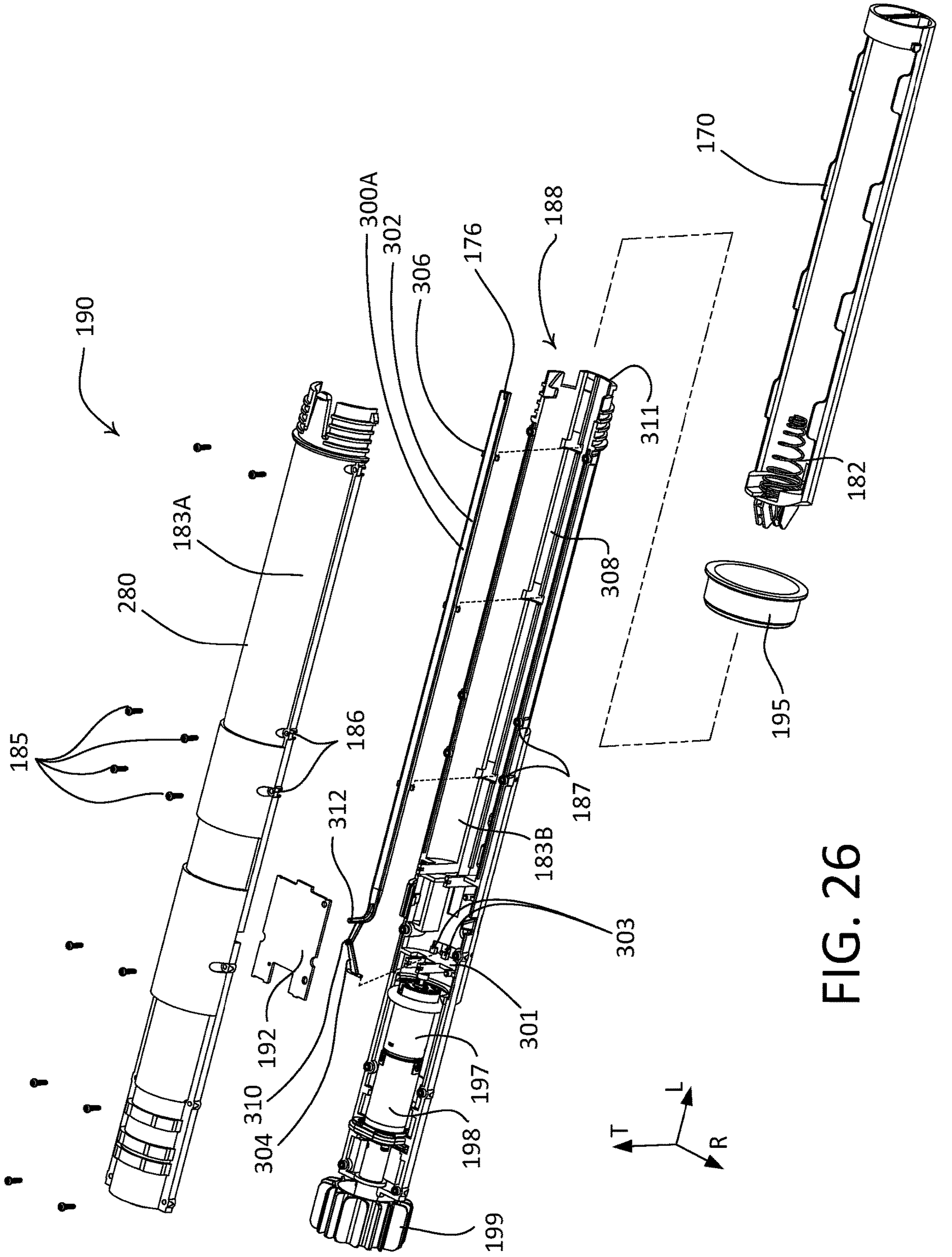
FIG. 26 is an exploded view of the motor drive unit of FIG. 21.
Figure 27:
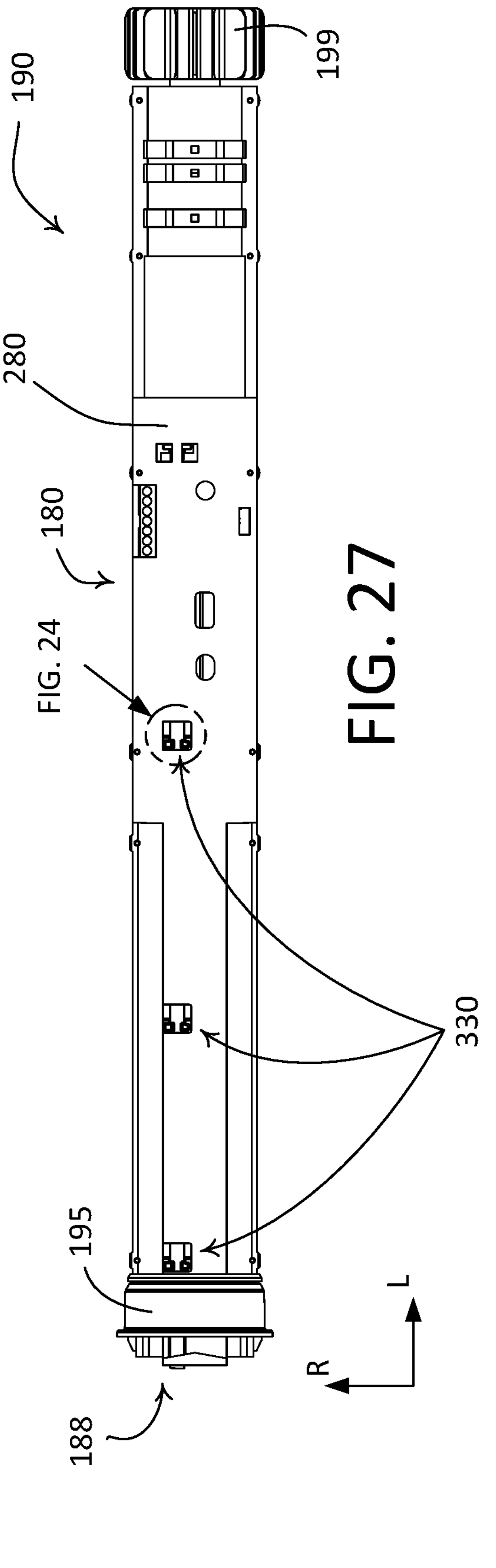
FIG. 27 is a top view of the motor drive unit of FIG. 21.
Figure 28:
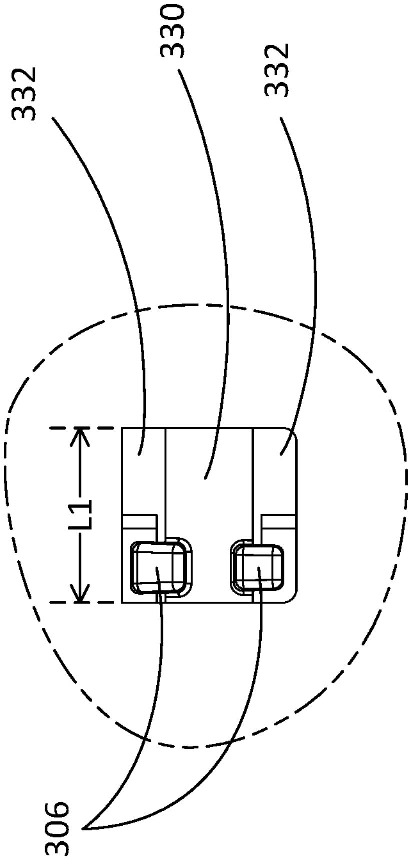
FIG. 28 is an enlarged partial view of the top view of FIG. 27.
Figures 29, 30, 31, 32, 33:
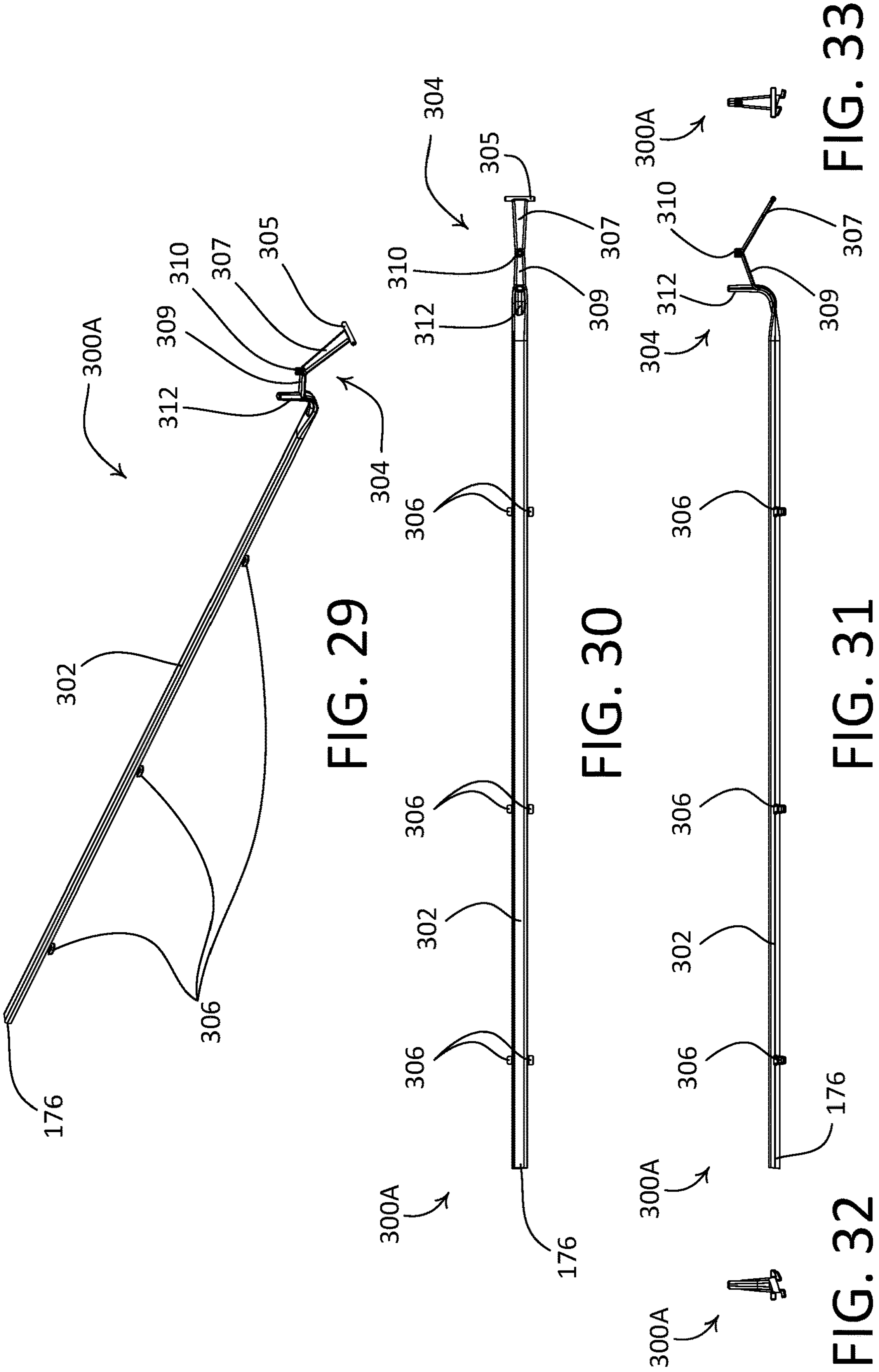
FIG. 29 is a perspective view of the actuation member of the motor drive unit of FIG. 26.
FIG. 30 is a top view of the actuation member of the motor drive unit of FIG. 26.
FIG. 31 is a front view of the actuation member of the motor drive unit of FIG. 26.
FIG. 32 is a left-side view of the actuation member of the motor drive unit of FIG. 26.
FIG. 33 is a right-side view of the actuation member of the motor drive unit of FIG. 26.

FIG. 23 is a bottom perspective view of the motor drive unit 190. FIG. 24 is an enlarged partial view of the perspective view of FIG. 23. FIG. 25 is a partial front cross-sectional view of the motorized window treatment 100 taken through the center of an actuation member 300A of the motor drive unit 190. FIG. 26 is an exploded view of the motor drive unit 190. FIG. 27 is a top view of the motor drive unit 190. FIG. 28 is an enlarged partial view of the top view of FIG. 27. FIG. 27 is a perspective view, FIG. 28 is a top view, FIG. 29 is a front view, FIG. 30 is a left-side view, and FIG. 31 is a right-side view of the actuation member 300A of the motor drive unit 190. As shown in FIG. 26, the housing 180 may comprise a first portion 183A and a second portion 183B. The first and second portions 183A, 183B of the housing 180 may be connected together via a plurality of fasteners 185 (e.g., screws) received through respective openings 186 in the first portion 183A and respective openings 187 (e.g., threaded openings) in the second portion 183B. The printed circuit board 192 may be captured between the first portion 183A and the second portion 183B of the housing 180.

The actuation member 300A may be configured to actuate a switch 360 mounted to the printed circuit board 192 within the housing 180 of the motor drive unit 190. For example, the switch 360 may be a mechanical tactile switch. The actuation member 300A may be configured to transfer a first force applied in the longitudinal direction L at the end portion 188 of the motor drive unit 190 into a second force in a transverse direction T within the cavity 181 of the housing 180. The transverse direction T may be orthogonal to the longitudinal direction L. The second force may be configured to actuate the switch 360 (e.g., via the actuation member 300A abutting and pressing the switch 360). The first force may be a horizontal force and the second force may be a vertical force. It should be appreciated that the forces are not limited to one horizontal force and one vertical force, instead the forces may be in other directions that are orthogonal to one another. It should also be appreciated that the first force may not be orthogonal to the second force. For example, the first force may be angularly offset from the second force at an angle that is less than or greater than 90 degrees. For example, the actuation member 300A may be configured to bend around an obstacle within the cavity 181.

The actuation member 300A may comprise an elongated portion 302, a flexible member 304, and a plurality of feet 306. The elongated portion 302 may comprise the actuation portion 176 that is accessible from the end portion 188 of the motor drive unit 190. The elongated portion 302 may extend from the end portion 188 into the cavity 181, for example, proximate to the printed circuit board 192. For example, the elongated portion 302 may extend through a channel 308 (FIG. 26) in the second portion 183B of the housing. 180 from the end portion 188 to the printed circuit board 192. When the battery holder 170 is installed in the cavity 181 of the housing 180, the elongated portion 302 may be captured in the channel 308 between the battery holder 170 and the second portion 183B of the housing 180. The channel 308 (e.g., and the battery holder 170) may be configured to prevent buckling of the actuation member 300A, for example, when the actuation member 300A is actuated. As shown in FIG. 22, the second portion 183B of the housing 180 may define a lip 311. The elongated portion 302 of the actuation member 300A may extend from the channel 308 through a gap 313 provided between the battery holder 170 and the lip 311 of the housing 180, such that the actuation portion 176 is provided at the end portion 188 of the motor drive unit 190.

The flexible member 304 may be configured to flex, for example, to actuate the switch 360. The flexible member 304 may define an actuation nub 310 that is configured to actuate the switch 360. The actuation nub 310 may be configured to move in the transverse direction T as the elongated portion 302 moves in the longitudinal direction L. For example, the flexible member 304 may be configured to transfer longitudinal motion to transverse motion such that the actuation nub 310 can move in the transverse direction T.

The flexible member 304 may be configured to press against an inner surface 301 of the cavity 181 to bias the actuation nub 310 toward the switch 360, for example, in response to the first force applied to the actuation portion 176. The motor drive unit 190 may comprise tabs 303 that are configured to retain the flexible member 304. The tabs 303 may extend into the cavity 181 from the inner surface 301. The flexible member 304 may define an axle 305 that is configured to be retained by the tabs 303. For example, the tabs 303 may be configured to captively receive the axle 305. The axle 305 may be configured to rotate such that the actuation nub 310 is able to move in the transverse direction T. The flexible member 304 may return to its original position upon removal of the first force from the actuation portion 176.

The flexible member 304 may be v-shaped with a first portion 307 that defines the axle 305 and a second portion 309 that extends from the elongated portion 302. For example, the flexible member 304 may comprise a living hinge. The first portion 307 and the second portion 309 may be joined proximate to the actuation nub 310. The first portion 307 and the second portion 309 may be angularly offset in a plane defined by the longitudinal direction L and the transverse direction T. It should be appreciated that the flexible member 304 is not limited to having the first portion 307 and the second portion 309 angularly offset in a plane defined by the longitudinal direction L and the transverse direction T. For example, the first portion 307 and the second portion 309 of the flexible member 304 may be angularly offset in a plane defined by the longitudinal direction L and the radial direction R. The actuation nub 310 may be located at the intersection of the first portion 307 and the second portion 309. The elongated portion 302 may extend from the channel 308 in the second portion 183B of the housing 180 by a distance that is long enough to allow the actuation portion 176 to be appropriately pressed in the longitudinal direction L, such that the flexible member 304 is able to flex and the actuation nub 310 is able to actuate the switch 360. The flexible member 304 may be shaped such that the actuation nub 310 is aligned with the switch 360. For example, an actuation surface 347 of the actuation nub 310 may be configured to be substantially parallel to the switch 360 (e.g., in a plane defined by the longitudinal direction L and the radial direction R).

The elongated portion 302 may comprise a light pipe portion 312 that is configured to extend proximate to a light source 355 mounted to the printed circuit board 192. The light source 355 may comprise one or more light emitting diodes (LEDs). The light source 355 may be configured to provide feedback to the user of the motorized window treatment 100. For example, the light source 355 may be configured to blink, flash, change colors, etc. to indicate the feedback. Additionally or alternatively, the light source 355 may be configured to indicate one or more modes of the motorized window treatment 100 (e.g., the motor drive unit 190). The actuation member 300A may be configured to transfer the light emitted by the light source 355 to the end portion 188 of the motor drive unit 190 (e.g., the actuation portion 176). The light pipe portion 312 may be curved to transfer the light emitted by the light source 355 on the printed circuit board 192 to the end portion 188 of the motor drive unit 190 (e.g., the actuation portion 176). The light pipe portion 312 and/or the entire elongated portion 302 may be translucent, for example, to direct the light emitted by the light source 355 to the end portion 188. The flexible member 304 may be opaque such that the light emitted by the light source 355 is not transmissible through the flexible member 304. In some examples, the actuation member 300A may not be configured to transfer the light emitted by the light source 355 and the light pipe portion 312 may be omitted. For example, the second portion 309 of the flexible member 304 may extend from the actuation nub 310 to the elongated portion 302.

The plurality of feet 306 may extend from the elongated portion 302. The plurality of feet 306 may be configured to secure the actuation member 300A within the channel 308 in the second portion 183B of the housing 180, for example, before the battery holder 170 is installed therein. The housing 180 may comprise a plurality of recesses 330 defining one or more apertures 332 that extend from the cavity 181 to an exterior surface 280 of the housing 180. Each of the apertures 332 may be configured to receive a respective one of the plurality of feet 306.

Each of the plurality of recesses 330 may be configured to enable each of the plurality of feet 306 to translate within a respective recess of the plurality of recesses 330 in the longitudinal direction L. For example, each of the plurality of feet 306 may slide within a respective aperture of the plurality of apertures 332 as the actuation member 300A is actuated. Each of the plurality of recesses 330 may define a length L1 that limits how far the elongated portion 302 can translate within the cavity 181 in the longitudinal direction L. For example, the plurality of recesses 330 may prevent the actuation member 300A from translating more than the length L1 in the longitudinal direction L. The length L1 may also define how far the actuation nub 310 can translate in the transverse direction T. The spacing between the feet 306 (e.g., and between the recesses 330) in the longitudinal direction L may be configured to prevent the actuation member 300A (e.g., the elongated portion 302) from buckling.

Although the actuation member 300A is shown with the flexible member 304 that is v-shaped extending from the elongated portion 302, it should be appreciated the actuation member 300 may define alternate geometry to transfer a horizontal force applied to the actuation portion 176 into vertical motion that actuates the switch 360. Although the actuation member 300A is shown as a one-piece member with multiple portions, it should be appreciated that the actuation member may comprise two or more pieces that are linked together and/or engage one another. For example, one piece may be more rigid than the other piece(s) which could prevent buckling within the cavity 181 and still enable the same or greater vertical motion when the same horizontal force is applied to the actuation portion 176.

Figure 34A:
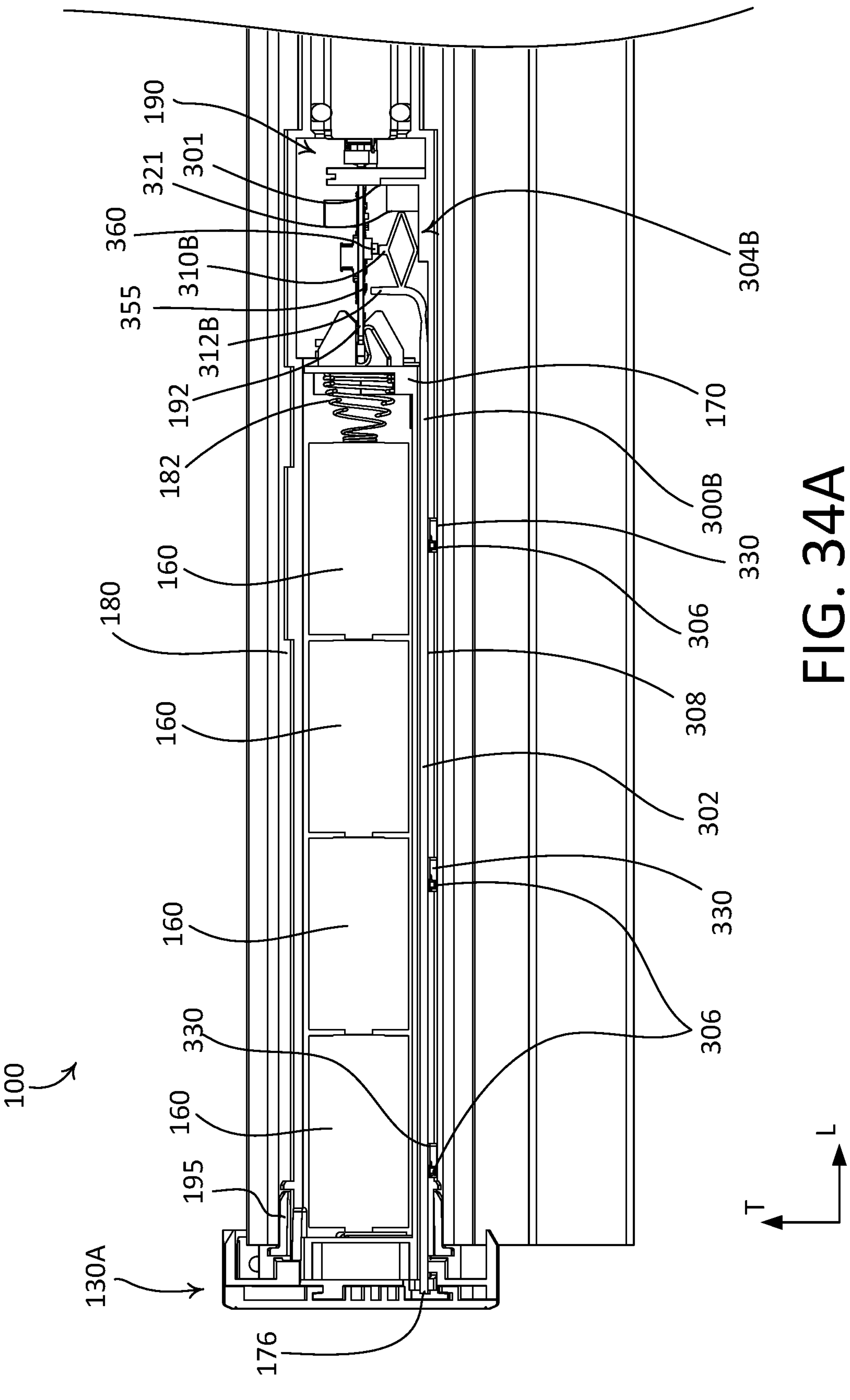
FIG. 34A is a partial front cross-sectional view of the motorized window treatment of FIG. 1 taken through the center of another example actuation member of the motor drive unit.
Figure 34B:
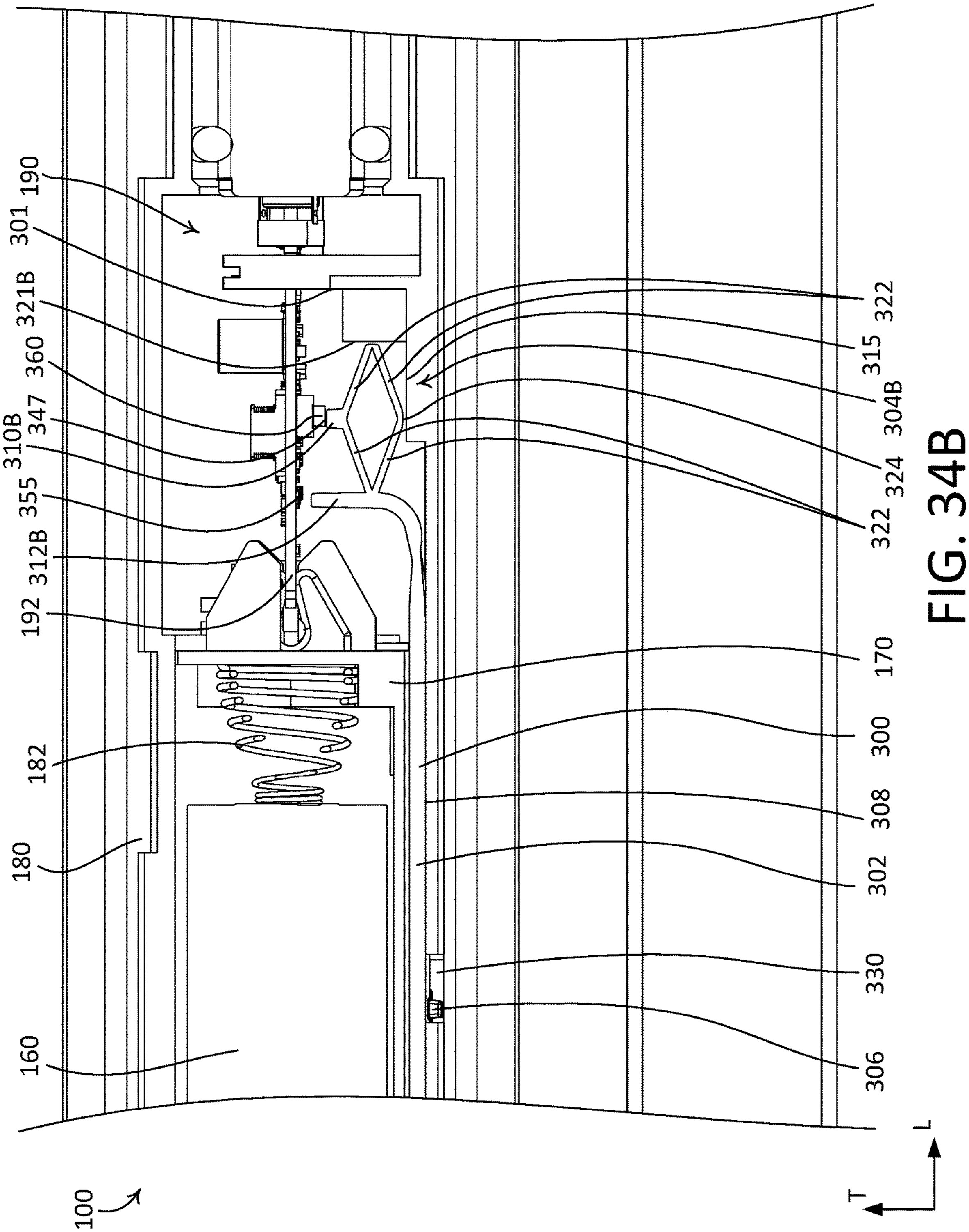
FIG. 34B is an enlarged view of the partial front cross-sectional view of FIG. 34A.

FIGS. 34A-38B depict the alternative actuation members 300B, 300C, 300D, 300E, 300F that can be used within a motorized window treatment (e.g., such as the motorized window treatment 100 shown in FIG. 1). FIG. 34A is a partial front cross-sectional view of a motorized window treatment (e.g., such as the motorized window treatment 100 shown in FIG. 1) taken through the center of another example actuation member 300B of the motor drive unit. FIG. 34B is an enlarged view of the partial front cross-sectional view of FIG. 34A.

The actuation member 300B may be configured to actuate the switch 360 mounted to the printed circuit board 192 within the housing 180 of the motor drive unit 190. The actuation member 300B may be configured to transfer a first force applied in the longitudinal direction L at the end portion 188 of the motor drive unit 190 into a second force in a transverse direction T within the cavity 181 of the housing 180. For example, the first force may be applied in the longitudinal direction L by pressing the actuation member 176 toward the inner surface 301 of the cavity 181. The transverse direction T may be orthogonal to the longitudinal direction L. The second force may be configured to actuate the switch 360 (e.g., via the actuation member 300B abutting and pressing the switch 360). The first force may be a horizontal force and the second force may be a vertical force. It should be appreciated that the forces are not limited to one horizontal force and one vertical force, instead the forces may be in other directions that are orthogonal to one another. It should also be appreciated that the first force may not be orthogonal to the second force. For example, the first force may be angularly offset from the second force at an angle that is less than or greater than 90 degrees. For example, the actuation member 300B may be configured to bend around an obstacle within the cavity 181.

The actuation member 300B may comprise the elongated portion 302, a flexible member 304B, and the plurality of feet 306. The flexible member 304B may be configured to flex, for example, to actuate the switch 360. The flexible member 304B may define an actuation nub 310B that is configured to actuate the switch 360. The actuation nub 310B may be configured to move in the transverse direction T as the elongated portion 302 moves in the longitudinal direction L. For example, the flexible member 304B may be configured to transfer longitudinal motion to transverse motion such that the actuation nub 310B can move in the transverse direction T.

The flexible member 304B may be configured to press against an inner surface 321 of the cavity 181 to bias the actuation nub 310B toward the switch 360, for example, in response to the first force applied to the actuation portion 176.

The flexible member 304B may be diamond-shaped with a plurality of arms 322 that are arranged in a diamond shape (e.g., a rhombus shape). For example, the arms 322 may be angularly offset such that the arms 322 can flex with respect to one another. The flexible member 304B may comprise one or more living hinges. For example, the flexible member 304B may be configured to flex at the intersection of adjacent arms 322 when the force is applied to the actuation portion 176. That is, the flexible member 304B may define a living hinge at one or more (e.g., each) intersections of adjacent arms 322. The actuation nub 310B may be located at the intersection of two (e.g., the two upper) of the arms 322. The flexible member 304B may define a lower surface 324 at the intersection of two (e.g., the two lower) of the arms 322. The lower surface 324 may be configured to abut a lower surface 315 of the cavity 181. For example, the lower surface 324 may abut the lower surface 315 as the first force is applied to the actuation portion 176 to bias the actuation nub 310B toward the switch 360. The flexible member 304B may be shaped such that the actuation nub 310B is aligned with the switch 360. For example, an actuation surface 347 of the actuation nub 310B may be configured to be substantially parallel to the switch 360 (e.g., in a plane defined by the longitudinal direction L and the radial direction R).

The elongated portion 302 may extend from the channel 308 in the second portion 183B of the housing 180 by a distance that is long enough to allow the actuation portion 176 to be appropriately pressed in the longitudinal direction L, such that the flexible member 304B is able to flex and the actuation nub 310B is able to actuate the switch 360. The flexible member 304B may return to its original position upon removal of the first force from the actuation portion 176.

The elongated portion 302 may comprise a light pipe portion 312B that is configured to extend proximate to a light source 355 mounted to the printed circuit board 192. The light source 355 may comprise one or more light emitting diodes (LEDs). The light source 355 may be configured to provide feedback to the user of the motorized window treatment 100. For example, the light source 355 may be configured to blink, flash, change colors, etc. to indicate the feedback. Additionally or alternatively, the light source 355 may be configured to indicate one or more modes of the motorized window treatment 100 (e.g., the motor drive unit 190). The actuation member 300B may be configured to transfer the light emitted by the light source 355 to the end portion 188 of the motor drive unit 190 (e.g., the actuation portion 176). The light pipe portion 312B may be curved to transfer the light emitted by the light source 355 on the printed circuit board 192 to the end portion 188 of the motor drive unit 190 (e.g., the actuation portion 176). The light pipe portion 312B and/or the entire elongated portion 302 may be translucent, for example, to direct the light emitted by the light source 355 to the end portion 188. The flexible member 304B may be opaque such that the light emitted by the light source 355 is not transmissible through the flexible member 304B. In some examples, the actuation member 300B may not be configured to transfer the light emitted by the light source 355 and the light pipe portion 312B may be omitted.

Figure 35A:
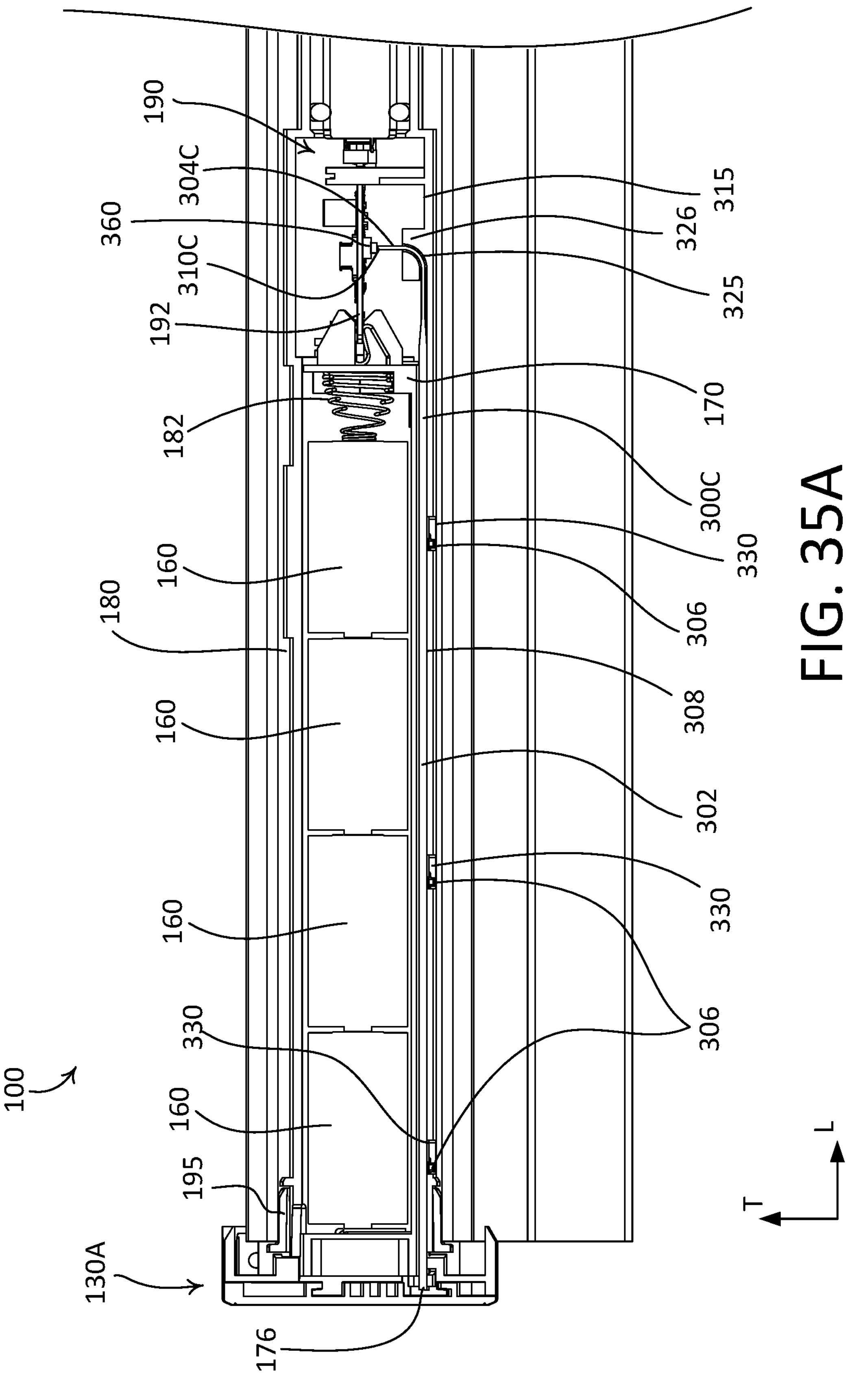
FIG. 35A is a partial front cross-sectional view of the motorized window treatment of FIG. 1 taken through the center of another example actuation member of the motor drive unit.
Figure 35B:
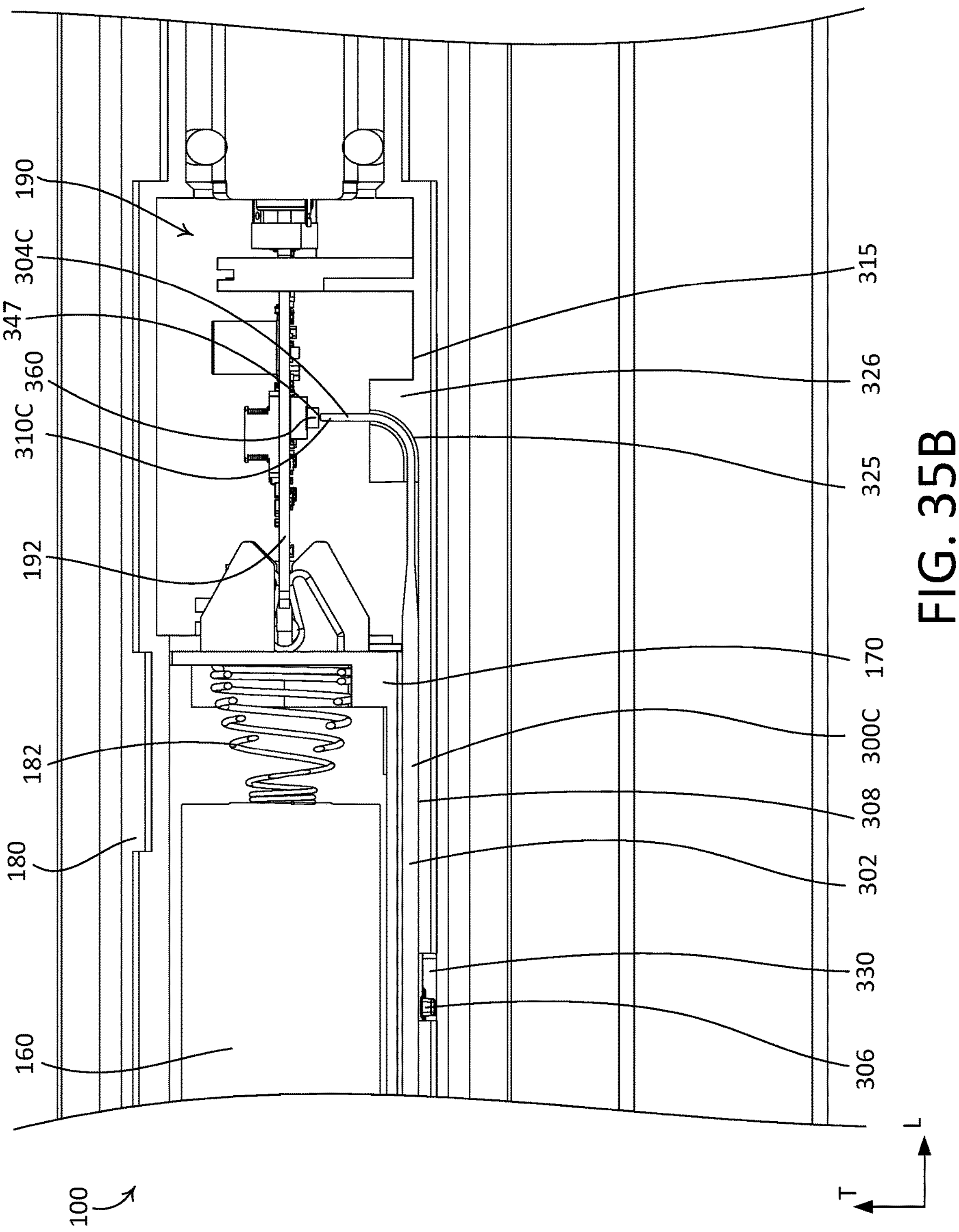
FIG. 35B is an enlarged view of the partial front cross-sectional view of FIG. 35A.

FIG. 35A is a partial front cross-sectional view of the motorized window treatment of FIG. 1 taken through the center of another example actuation member 300C of the motor drive unit. FIG. 35B is an enlarged view of the partial front cross-sectional view of FIG. 35A.

The actuation member 300C may be configured to actuate the switch 360 mounted to the printed circuit board 192 within the housing 180 of the motor drive unit 190. The actuation member 300C may be configured to transfer a first force applied in the longitudinal direction L at the end portion 188 of the motor drive unit 190 into a second force in a transverse direction T within the cavity 181 of the housing 180. For example, the first force may be applied in the longitudinal direction L by pressing the actuation member 176 toward the inner surface 301 of the cavity 181. The transverse direction T may be orthogonal to the longitudinal direction L. The second force may be configured to actuate the switch 360 (e.g., via the actuation member 300C abutting and pressing the switch 360). The first force may be a horizontal force and the second force may be a vertical force. It should be appreciated that the forces are not limited to one horizontal force and one vertical force, instead the forces may be in other directions that are orthogonal to one another. It should also be appreciated that the first force may not be orthogonal to the second force. For example, the first force may be angularly offset from the second force at an angle that is less than or greater than 90 degrees. For example, the actuation member 300C may be configured to bend around an obstacle within the cavity 181.

The actuation member 300C may comprise the elongated portion 302, a flexible member 304C, and the plurality of feet 306. The flexible member 304C may be configured to flex, for example, to actuate the switch 360. The flexible member 304C may be cable, a wire, or a similar flexible material. The flexible member 304C may be configured to bend and retain a stiffness level above a predetermined stiffness threshold. For example, the flexible member 304C may have a circular cross-section, a rectangular cross-section, and/or the like. For example, the flexible member could be a cylindrical cable, a ribbon cable, and/or the like. For example, the stiffness threshold may be configured such that the actuation nub 310C remains aligned with the switch 360. The flexible member 304C may define an actuation nub 310C that is configured to actuate the switch 360. The actuation nub 310C may be configured to move in the transverse direction T as the elongated portion 302 moves in the longitudinal direction L. For example, the flexible member 304C may be configured to transfer longitudinal motion to transverse motion such that the actuation nub 310C can move in the transverse direction T.

The flexible member 304C may be configured to be received within a channel 325 (e.g., a tunnel) of a guide element 326. The guide element 326 may be formed as part of the second portion 183B of the housing 180 and, in some examples, may extend from the lower surface 315 of the cavity 181. The channel 325 may be configured to guide (e.g., bias) the actuation nub 310C toward the switch 360 in response to a force applied to the actuation portion 176. For example, the channel 325 may define a cross-section that corresponds to the cross-sectional shape of the flexible member 304C. The channel 325 may be curved such that the flexible member 304C bends (e.g., is turned) approximately 90 degrees from the longitudinal direction L to the transverse direction T. The flexible member 304C may define a stiffness that enables the actuation nub 310C to actuate the switch 360 without buckling. For example, the flexible member 304C may define a stiffness within a predefined stiffness threshold.

The flexible member 304C and the guide element 326 may be shaped such that the actuation nub 310C is aligned with the switch 360. For example, an actuation surface 347 of the actuation nub 310C may be configured to be substantially parallel to the switch 360 (e.g., in a plane defined by the longitudinal direction L and the radial direction R). It should be appreciated that the guide element 326 is not limited to the geometry shown in the drawings. Rather, the guide element 326 could define alternate shapes than shown in the drawings for example, such as a trapezoid, a rhombus, a cylinder, etc. It should be appreciated that the guide element 326 is not limited to the relative dimensions shown in the figures. Rather, the guide element 326 may extend closer to or farther away from the switch 360 than shown in the drawings.

The elongated portion 302 may extend from the channel 308 in the guide element 326 of the second portion 183B of the housing 180 by a distance that is long enough to allow the actuation portion 176 to be appropriately pressed in the longitudinal direction L, such that the flexible member 304C is able to flex and the actuation nub 310C is able to actuate the switch 360. The flexible member 304C may return to its original position upon removal of the first force from the actuation portion 176. It should be appreciated that, the elongated portion 302 may comprise a light pipe portion (e.g., such as the light pipe portion 312 and/or the light pipe portion 312B) that is configured to extend proximate to the light source 355 mounted to the printed circuit board 192.

Figure 36A:
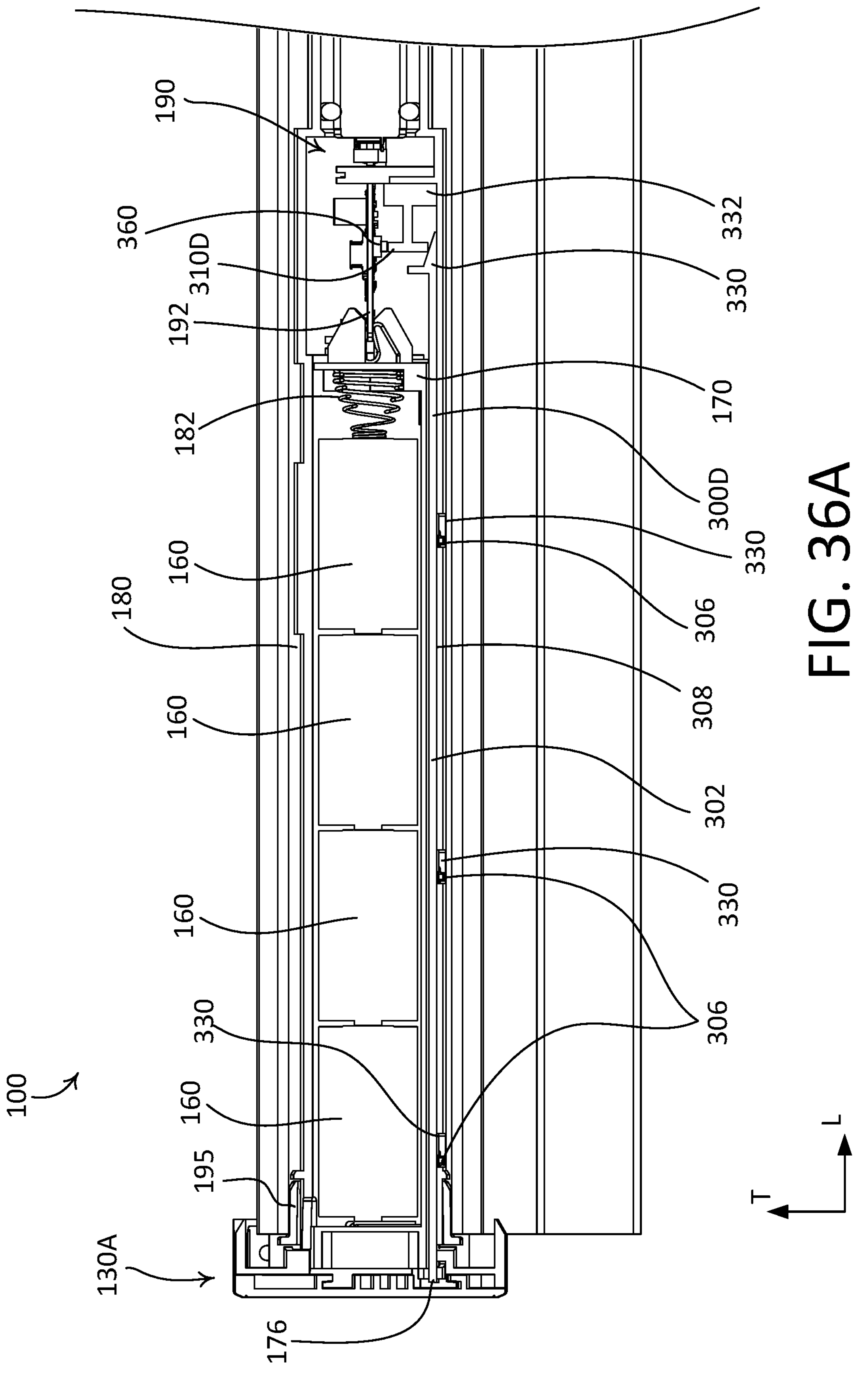
FIG. 36A is a partial front cross-sectional view of the motorized window treatment of FIG. 1 taken through the center of another example actuation member of the motor drive unit.
Figure 36B:
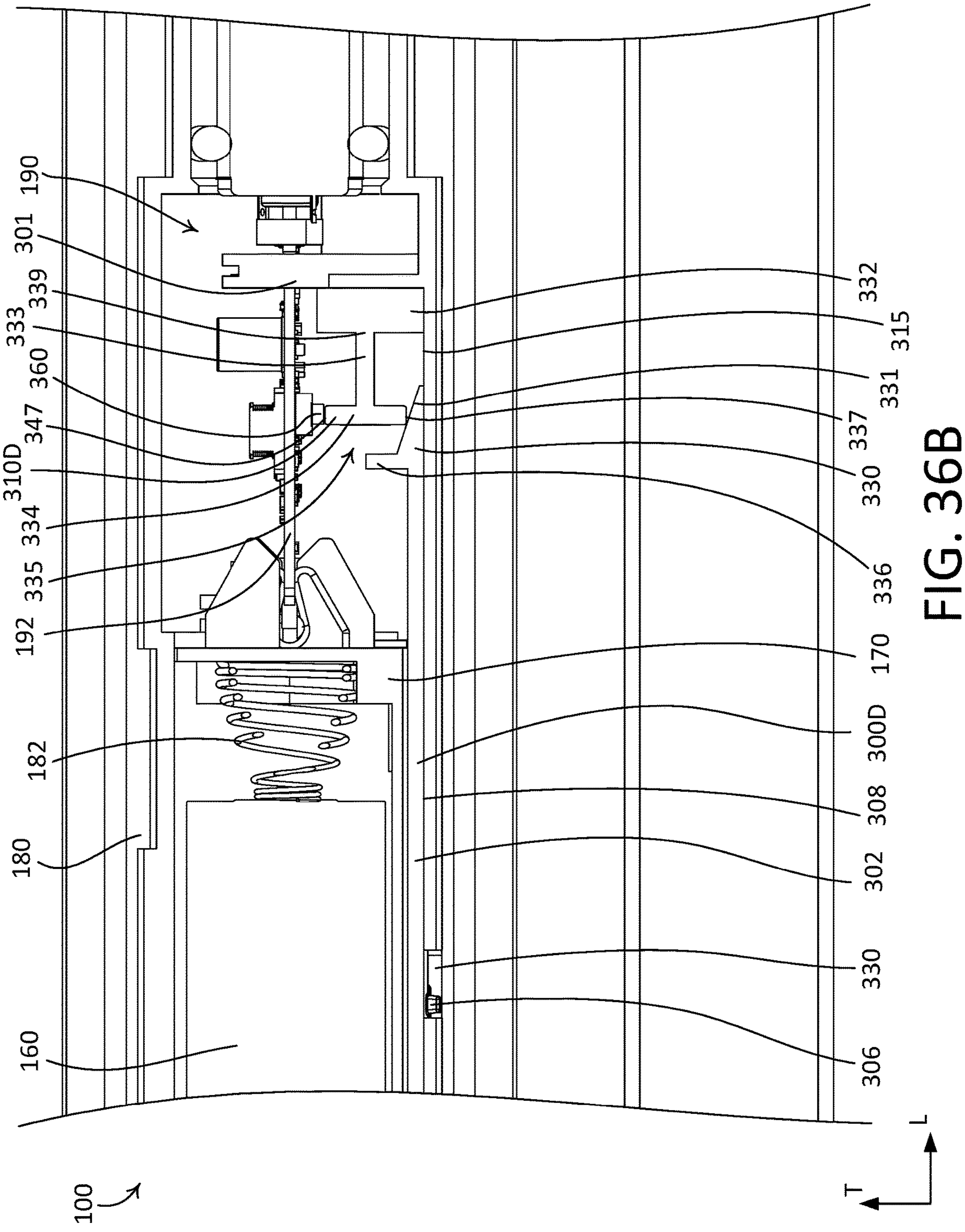
FIG. 36B is an enlarged view of the partial front cross-sectional view of FIG. 36A.

FIG. 36A is a partial front cross-sectional view of the motorized window treatment of FIG. 1 taken through the center of another example actuation member 300D of the motor drive unit. FIG. 36B is an enlarged view of the partial front cross-sectional view of FIG. 36A.

The actuation member 300D may be configured to actuate the switch 360 mounted to the printed circuit board 192 within the housing 180 of the motor drive unit 190. The actuation member 300D may be configured to transfer a first force applied in the longitudinal direction L at the end portion 188 of the motor drive unit 190 into a second force in a transverse direction T within the cavity 181 of the housing 180. For example, the first force may be applied in the longitudinal direction L by pressing the actuation member 176 toward the inner surface 301 of the cavity 181. The transverse direction T may be orthogonal to the longitudinal direction L. The second force may be configured to actuate the switch 360. The first force may be a horizontal force and the second force may be a vertical force. It should be appreciated that the forces are not limited to one horizontal force and one vertical force, instead the forces may be in other directions that are orthogonal to one another. It should also be appreciated that the first force may not be orthogonal to the second force. For example, the first force may be angularly offset from the second force at an angle that is less than or greater than 90 degrees. For example, the actuation member 300D may be configured to bend around an obstacle within the cavity 181.

The actuation member 300D may comprise the elongated portion 302, a wedge portion 330, and a flexible member 335. The wedge portion 330 may define an inclined surface 331 that is configured to abut the flexible member 335. The wedge portion 330 may be configured to bias the flexible member 335 in the transverse direction T in response to the first force in the longitudinal direction L. The flexible member 335 may define a base portion 332 and a head portion 334. For example, the flexible member 335 (e.g., the base portion 332) may be formed as part of the second portion 183B of the housing 180. The head portion 334 may be attached to the base portion 332 via a connecting portion 333. The base portion 332 may be configured to extend from the inner surface 301 of the cavity 181. The head portion 334 may define a lower surface 337 that is configured to slide along the inclined surface 331. The head portion 334 may define the actuation nub 310D.

The flexible member 335 may be configured to flex to actuate the switch 360. As the first force is applied to the actuation portion 176, the inclined surface 331 of the wedge portion 330 may contact the lower surface 337 of the head portion 334 causing the connecting portion 333 to flex (e.g., bend) and the actuation nub 310D to actuate the switch 360. The head portion 334 may be configured to pivot about a fulcrum 339 defined by the attachment of the connecting portion 333 to the base portion 332, for example, as the elongated portion 302 moves in the longitudinal direction L. The actuation nub 310D may be configured to move in the transverse direction T as the elongated portion 302 moves in the longitudinal direction L. For example, the wedge portion 330 of the actuation member 300D and the flexible member 335 may be configured to transfer longitudinal motion to transverse motion such that the actuation nub 310D can move in the transverse direction T. For example, as the wedge portion 330 moves in the longitudinal direction L toward the inner surface 301, the wedge portion 330 may apply the second force to the head portion 334 of the flexible member 335 to move the actuation nub 310D in the transverse direction T. The wedge portion 330 may define a stop 336 that is configured to prevent the actuation member 300D from moving too far in the longitudinal direction L and thus prevent the actuation nub 310D from moving too far in the transvers direction T.

The flexible member 335 may be shaped such that the actuation nub 310D is aligned with the switch 360. For example, an actuation surface 347 of the actuation nub 310D may be configured to be substantially parallel to the switch 360 (e.g., in a plane defined by the longitudinal direction L and the radial direction R).

The elongated portion 302 may extend from the channel 308 in the second portion 183B of the housing 180 by a distance that is long enough to allow the actuation portion 176 to be appropriately pressed in the longitudinal direction L, such that the wedge portion 330 and the flexible member 335 can bias the head portion 334 to cause the actuation nub 310D to actuate the switch 360. The wedge portion 330 and the block portion 335 may return to their original position upon removal of the first force from the actuation portion 176. It should be appreciated that, the elongated portion 302 may comprise a light pipe portion (e.g., such as the light pipe portion 312 and/or the light pipe portion 312B) that is configured to extend proximate to the light source 355 mounted to the printed circuit board 192.

Figure 37A:
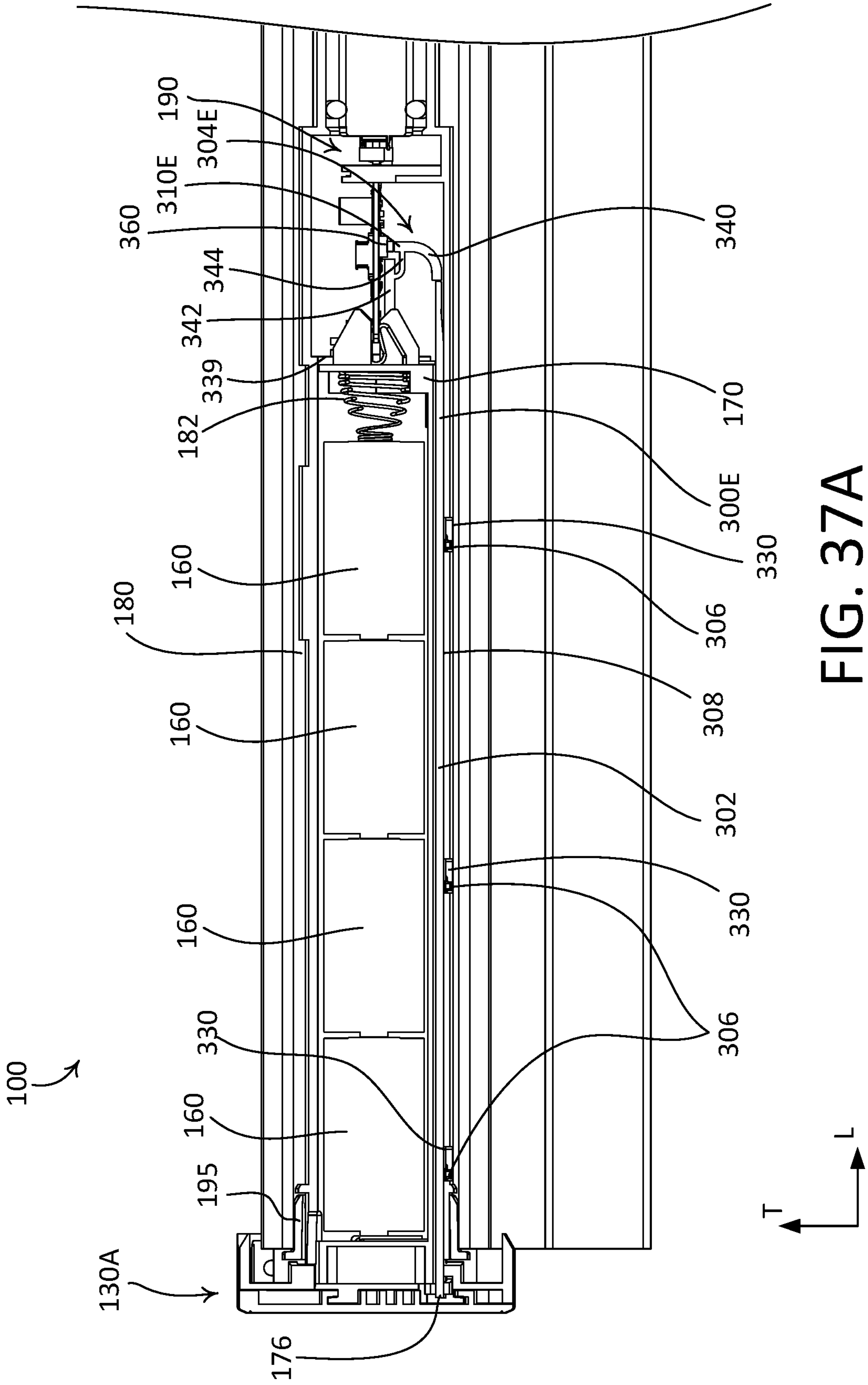
FIG. 37A is a partial front cross-sectional view of the motorized window treatment of FIG. 1 taken through the center of another example actuation member of the motor drive unit.
Figure 37B:
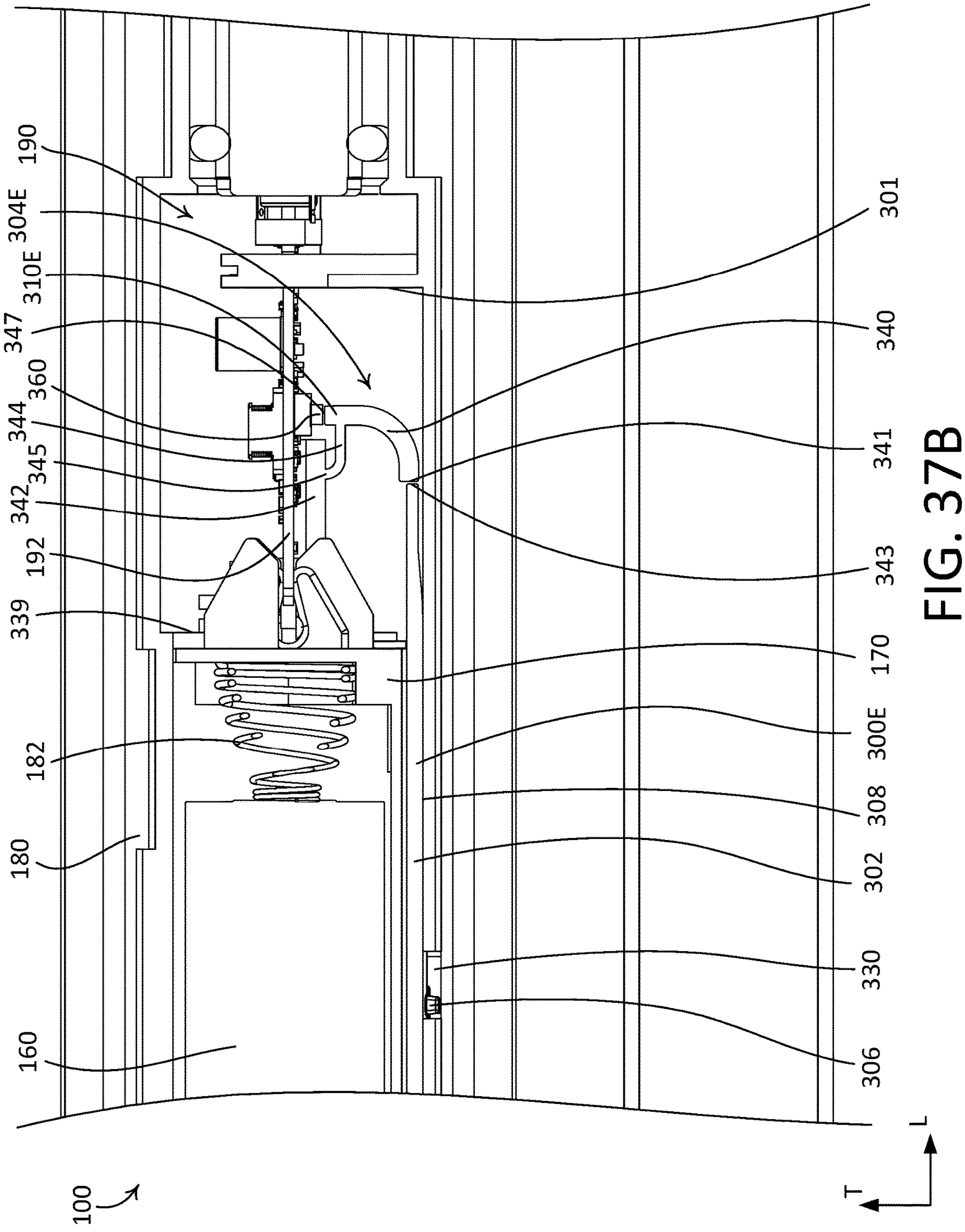
FIG. 37B is an enlarged view of the partial front cross-sectional view of FIG. 37A.

FIG. 37A is a partial front cross-sectional view of the motorized window treatment of FIG. 1 taken through the center of another example actuation member 300E of the motor drive unit. FIG. 37B is an enlarged view of the partial front cross-sectional view of FIG. 37A.

The actuation member 300E may be configured to actuate the switch 360 mounted to the printed circuit board 192 within the housing 180 of the motor drive unit 190. The actuation member 300E may be configured to transfer a first force applied in the longitudinal direction L at the end portion 188 of the motor drive unit 190 into a second force in a transverse direction T within the cavity 181 of the housing 180. For example, the first force may be applied in the longitudinal direction L by pressing the actuation member 176 toward the inner surface 301 of the cavity 181. The transverse direction T may be orthogonal to the longitudinal direction L. The second force may be configured to actuate the switch 360. The first force may be a horizontal force and the second force may be a vertical force. It should be appreciated that the forces are not limited to one horizontal force and one vertical force, instead the forces may be in other directions that are orthogonal to one another. It should also be appreciated that the first force may not be orthogonal to the second force. For example, the first force may be angularly offset from the second force at an angle that is less than or greater than 90 degrees. For example, the actuation member 300E may be configured to bend around an obstacle within the cavity 181.

The actuation member 300E may comprise the elongated portion 302 and a flexible member 304E. The flexible member 304E may comprise a curved portion 340, a base portion 342, and a connecting portion 344. The curved portion 340 may be attached to the base portion 342 via the connecting portion 344. For example, the curved portion 340 may be cantilevered from the base portion 342 by the connecting portion 344. It should be appreciated that the although the curved portion 340 is shown in the figures as being curved, the curved portion 340 may define alternate geometry for example, such as straight, piecewise, etc.

The flexible member 304E (e.g., the curved portion 340) may define a first abutment surface 341 that is configured to engage a second abutment surface 343 of the elongated portion 302. For example, the second abutment surface 343 of the elongated portion 302 may be configured to abut the first abutment surface 341 of the curved portion 340 when the first force is applied to the actuation portion 176. The curved portion 340 may define the actuation nub 310E. The curved portion 340 may be configured to pivot about a fulcrum 345 defined by the attachment of the connecting portion 344 to the base portion 342, for example, as the elongated portion 302 moves in the longitudinal direction L. The actuation nub 310E may be configured to move in the transverse direction T as the elongated portion 302 moves in the longitudinal direction L. For example, the flexible member 304E (e.g., the curved portion 340, the base portion, and the connecting portion 344) may be configured to transfer longitudinal motion to transverse motion such that the actuation nub 310E can move in the transverse direction T.

The curved portion 340 may be shaped such that the actuation nub 310E is aligned with the switch 360. For example, an actuation surface 347 of the actuation nub 310E may be configured to be substantially parallel to the switch 360 (e.g., in a plane defined by the longitudinal direction L and the radial direction R). The plane may be perpendicular to the first abutment surface 341. The elongated portion 302 may extend from the channel 308 in the second portion 183B of the housing 180 by a distance that is long enough to allow the actuation portion 176 to be appropriately pressed in the longitudinal direction L, such that the actuation member 300E can bias the flexible member 304E to cause the actuation nub 310E to actuate the switch 360. The flexible member 304E may return to its original position upon removal of the first force from the actuation portion 176. It should be appreciated that, the elongated portion 302 may comprise a light pipe portion (e.g., such as the light pipe portion 312 and/or the light pipe portion 312B) that is configured to extend proximate to the light source 355 mounted to the printed circuit board 192.

Figure 38A:
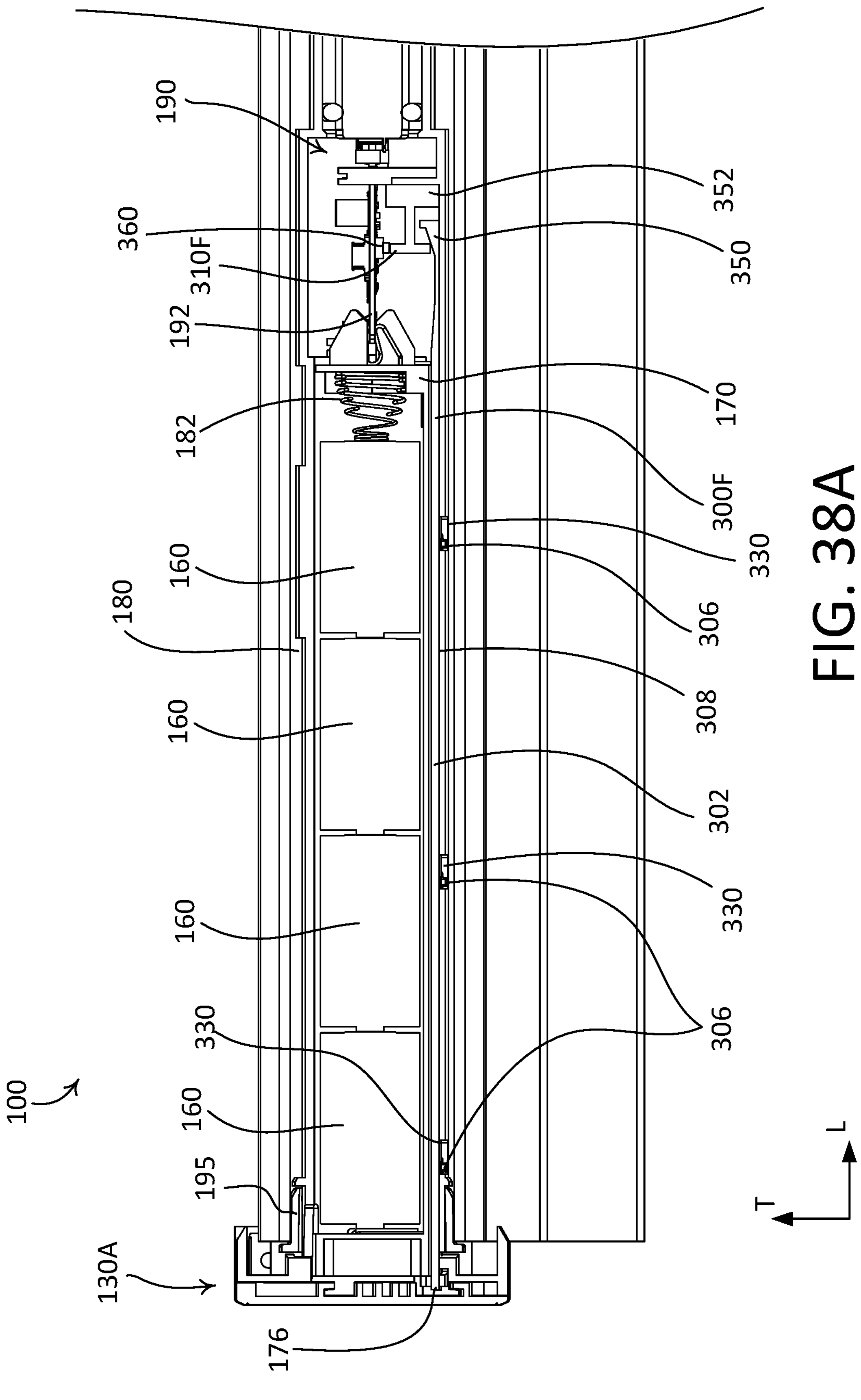
FIG. 38A is a partial front cross-sectional view of the motorized window treatment of FIG. 1 taken through the center of another example actuation member of the motor drive unit.
Figure 38B:
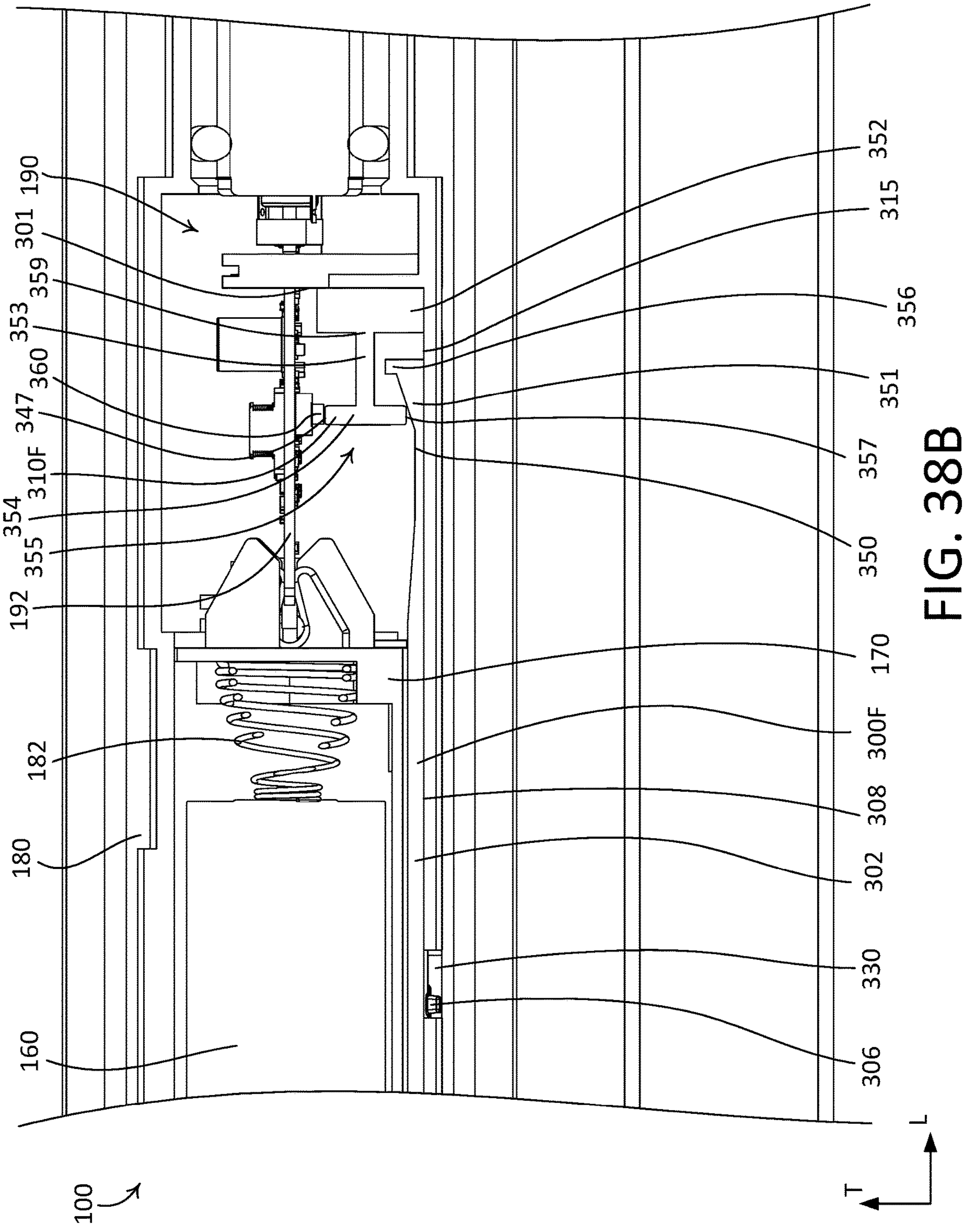
FIG. 38B is an enlarged view of the partial front cross-sectional view of FIG. 38A.

FIG. 38A is a partial front cross-sectional view of the motorized window treatment of FIG. 1 taken through the center of another example actuation member 300F of the motor drive unit. FIG. 38B is an enlarged view of the partial front cross-sectional view of FIG. 38A.

The actuation member 300F may be configured to actuate the switch 360 mounted to the printed circuit board 192 within the housing 180 of the motor drive unit 190. The actuation member 300F may be configured to transfer a first force applied in the longitudinal direction L at the end portion 188 of the motor drive unit 190 into a second force in a transverse direction T within the cavity 181 of the housing 180. For example, the first force may be applied in the longitudinal direction L by pulling the actuation member 176 away from the inner surface 301 of the cavity 181. The transverse direction T may be orthogonal to the longitudinal direction L. The second force may be configured to actuate the switch 360. The first force may be a horizontal force and the second force may be a vertical force. It should be appreciated that the forces are not limited to one horizontal force and one vertical force, instead the forces may be in other directions that are orthogonal to one another. It should also be appreciated that the first force may not be orthogonal to the second force. For example, the first force may be angularly offset from the second force at an angle that is less than or greater than 90 degrees. For example, the actuation member 300F may be configured to bend around an obstacle within the cavity 181.

The actuation member 300F may comprise the elongated portion 302, a wedge portion 350, and a flexible member 355. The wedge portion 350 may define an inclined surface 351 that is configured to abut the flexible member 355. The wedge portion 350 may be configured to bias the flexible member 355 in the transverse direction T in response to the first force in the longitudinal direction L. The flexible member 355 may define a base portion 352 and a head portion 354. For example, the flexible member 355 (e.g., the base portion 332) may be formed as part of the second portion 183B of the housing 180. The head portion 354 may be attached to the base portion 352 via a connecting portion 353. The base portion 352 may be configured to extend from the inner surface 301 of the cavity 181.

The head portion 354 may define a lower surface 357 that is configured to slide along the inclined surface 351. The head portion 354 may define the actuation nub 310F. The flexible member 355 may be configured to flex to actuate the switch 360. As the first force is applied to the actuation portion 176, the inclined surface 351 of the wedge portion 350 may contact the lower surface 357 of the head portion 354 causing the connecting portion 353 to flex (e.g., bend) and the actuation nub 310D to actuate the switch 360. The head portion 354 may be configured to pivot about a fulcrum 359 defined by the attachment of the connecting portion 353 to the base portion 352, for example, as the elongated portion 302 moves in the longitudinal direction L. The actuation nub 310F may be configured to move in the transverse direction T as the elongated portion 302 moves in the longitudinal direction L. For example, the wedge portion 350 of the actuation member 300F and the flexible member 355 may be configured to transfer longitudinal motion to transverse motion such that the actuation nub 310F can move in the transverse direction T. For example, as the wedge portion 350 moves in the longitudinal direction L away the inner surface 301, the wedge portion 350 may apply the second force to the head portion 354 of the flexible member 355 to move the actuation nub 310F in the transverse direction T. The wedge portion 350 may define a stop 356 that is configured to prevent the actuation member 300F from moving too far in the longitudinal direction L and thus prevent the actuation nub 310F from moving too far in the transvers direction T. Additionally or alternatively, the stop 356 may prevent the elongated portion 302 from being pulled out of the channel 308, for example, as the actuation member 176 is pulled.

The flexible member 355 may be shaped such that the actuation nub 310F is aligned with the switch 360. For example, an actuation surface 347 of the actuation nub 310F may be configured to be substantially parallel to the switch 360 (e.g., in a plane defined by the longitudinal direction L and the radial direction R).

The elongated portion 302 may extend from the channel 308 in the second portion 183B of the housing 180 by a distance that is long enough to allow the actuation portion 176 to be appropriately pressed in the longitudinal direction L, such that the wedge portion 350 and the flexible member 355 can bias the actuation nub 310F to actuate the switch 360. The wedge portion 350 and the flexible member 355 may return to their original position upon removal of the first force from the actuation portion 176. It should be appreciated that, the elongated portion 302 may comprise a light pipe portion (e.g., such as the light pipe portion 312 and/or the light pipe portion 312B) that is configured to extend proximate to the light source 355 mounted to the printed circuit board 192.

Figure 39:
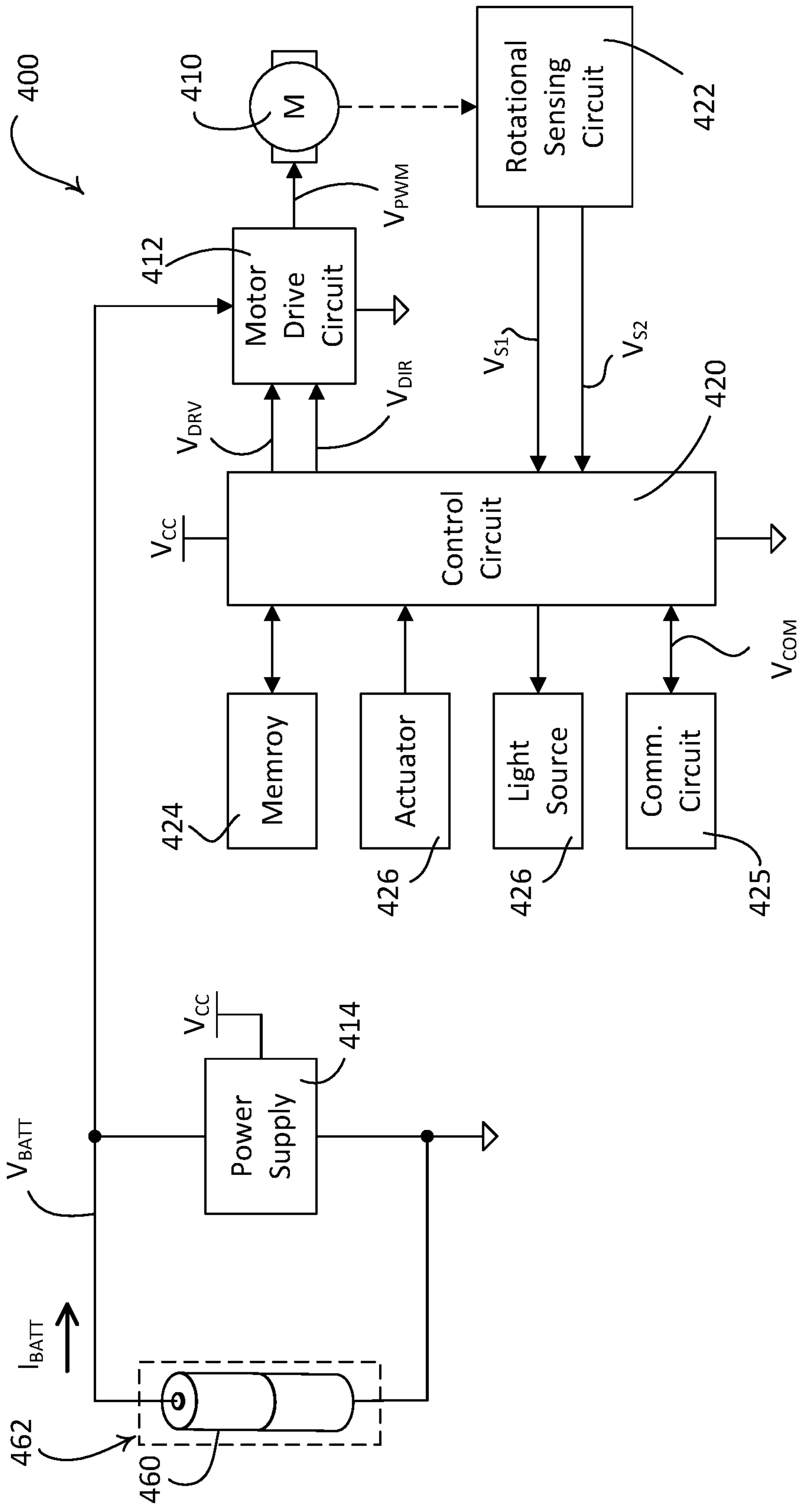
FIG. 39 is a simplified block diagram of a motor drive unit of a motorized window treatment.

FIG. 39 is a simplified block diagram of a motor drive unit 400 of a motorized window treatment (e.g., the motor drive unit 190 of the motorized window treatment 100). The motor drive unit 400 may include a motor 410 (e.g., a direct-current motor) that may be coupled to a roller tube of the motorized window treatment (e.g., the roller tube 110) for rotating the roller tube. Rotation of the roller tube may be configured to raise and lower a covering material (e.g., the flexible material 120). The motor drive unit 400 may comprise a compartment 462 (e.g., which may be an example of the battery holder 170 of the motorized window treatment 100 shown in FIGS. 4-6) that is configured to receive a DC power source. The DC power source may be, for example, one or more batteries 460. In this example, the compartment 462 may be configured to receive one or more batteries 460 (e.g., four "D" batteries), such as the batteries 160 of FIGS. 5 and 6. The batteries 460 may provide a battery voltage $V_{BATT}$ to the motor drive unit 400. In addition, alternate DC power sources, such as a solar cell (e.g., a photovoltaic cell), an ultrasonic energy source, and/or a radio-frequency (RF) energy source, may be coupled in parallel with the one or more batteries 460, or in some examples be used as an alternative to the batteries 460. Further, an external DC power supply may be configured to be coupled in parallel with the one or more batteries 460. The alternate DC power source and/or the external DC power supply may be used to perform the same and/or similar functions as the one or more batteries 460.

The motor drive unit 400 may include a motor drive circuit 412 (e.g., an H-bridge drive circuit) that receives the battery voltage $V_{BATT}$ and may generate a pulse-width modulated (PWM) voltage $V_{PWM}$ for driving the motor 410. While not shown in FIG. 34, the motor drive unit 400 may comprise a power converter circuit (e.g., a boost converter circuit) coupled between the batteries 460 and the motor drive circuit 412 for receiving the battery voltage $V_{BATT}$ and generating a boosted voltage that may be received by the motor drive circuit 412 for driving the motor 412. The motor drive unit 400 may also include a power supply 414 that may receive the battery voltage $V_{BATT}$ and generate a supply voltage $V_{CC}$ for powering the low-voltage circuitry of the motor drive unit.

The motor drive unit 400 may include a control circuit 420 for controlling the operation of the motor 410. The control circuit 420 may include, for example, a microprocessor, a programmable logic device (PLD), a microcontroller, an application specific integrated circuit (ASIC), a field-programmable gate array (FPGA), or any suitable processing device or control circuit. The control circuit 420 may be configured to generate one or more drive signals $V_{DR}$ for controlling the motor drive circuit 412. The one or more drive signals $V_{DR}$ may be configured to control a rotational speed and/or a direction of rotation of the motor 410.

The motor drive unit 400 may include a rotational position sensing circuit 422, such as, for example, a Hall effect sensor (HES) circuit, which may be configured to generate first and second rotational position sensing signals $V_{s1}$, $V_{s2}$. The first and second rotational position sensing signals $V_{s1}$, $V_{s2}$ may indicate the rotational speed and/or the direction of the motor 410 to the control circuit 420. The rotational position sensing circuit 422 may include other suitable position sensors, such as, for example, magnetic, optical, and/or resistive sensors. The control circuit 420 may be configured to determine the rotational position of the motor 410 in response to the first and second rotational position sensing signals $V_{s1}$, $V_{s2}$ generated by the rotational position sensing circuit 422. The control circuit 420 may be configured to determine a present position of the covering material in response to the rotational position of the motor 410. The control circuit 420 may be coupled to a memory 424 (e.g., a non-volatile memory). The present position of the covering material and/or limits for controlling the position of the covering material (e.g., a fully-raised position and/or a fully-lowered position) may be stored in the memory 424. The operation of a motor drive circuit and a rotational position sensing circuit of an example motor drive unit is described in greater detail in commonly-assigned U.S. Pat. No. 5,848,634, issued Dec. 15, 1998, entitled MOTORIZED WINDOW SHADE SYSTEM, and commonly-assigned U.S. Pat. No. 7,839,109, issued Nov. 23, 2010, entitled METHOD OF CONTROLLING A MOTORIZED WINDOW TREATMENT, the entire disclosures of which are hereby incorporated by reference.

The motor drive unit 400 may include a communication circuit 425 that may allow the control circuit 420 to transmit and receive signals, e.g., wired signals and/or wireless signals, such as radio-frequency (RF) signals. The control circuit 420 may be configured to control the motor 410 to control the movement of the covering material in response to a shade movement command received in signals received via the communication circuit 425 from a remote control device. During a configuration procedure (e.g., an association procedure), the motor drive unit 400 may be associated with the remote control device, such that the motor drive unit 400 may be responsive to the messages transmitted by the remote control device (e.g., via wireless signals). For example, the motor drive unit 400 may comprise an actuator 426 (e.g., a mechanical tactile switch such as the switch 360 shown in FIGS. 25A, 25B, 34A, 34B, 35A, 35B, 36A, 36B, 37A, 37B, 38A, and 38B) that may be actuated to cause the control circuit 420 to enter the configuration mode. In addition, the motor drive unit 400 may be configured with one or more operational settings (e.g., preset positions between the raised position and the lowered position) during the configuration procedure. The motor drive unit 400 may include a light source 428 (e.g., such as the light source 355 shown in FIG. 25A, 25B, 34A, 34B) that may be illuminated by the control circuit 420, for example, to provide feedback to the user of the motorized window treatment (e.g., during the configuration mode to indicate that the motor drive unit is in the configuration mode). The light source 428 may comprise one or more light-emitting diodes (LEDs).

What is claimed is:

1. A motorized window treatment comprising:

a roller tube configured to rotate about a longitudinal axis that defines a longitudinal direction;

a flexible material that is attached to the roller tube, the flexible material operable between a raised position and a lowered position via rotation of the roller tube; and a motor drive unit located within the roller tube, the motor drive unit comprising:

a motor configured to rotate the roller tube;

a control circuit configured to control the motor to adjust the flexible material between the raised position and the lowered position;

a battery holder configured to hold one or more batteries for powering the motor and the control circuit;

a printed circuit board to which the control circuit is mounted, the printed circuit board located between the battery holder and the motor;

a switch mounted to the printed circuit board and electrically coupled to the control circuit, such that the control circuit is responsive to actuation of the switch; and an actuation member configured to transfer a first force applied in a first direction at an end portion of the motor drive unit to a second force in a second direction, the second force configured to actuate the switch.

2. The motorized window treatment of claim 1, wherein the actuation member comprises an elongated portion and a flexible member defining an actuation nub that is configured to actuate the switch, the flexible member configured to flex and cause the actuation nub to actuate the switch in response the first force being applied to the elongated portion in the longitudinal direction.

3. The motorized window treatment of claim 2, wherein the actuation nub is configured to move in a transverse direction as the elongated portion moves in the longitudinal direction.

4. The motorized window treatment of claim 3, further comprising a housing in which the motor and the printed circuit board are housed, the housing defining a cavity in which the battery holder is configured to be received, wherein the flexible member is configured to press against an inner surface of the cavity to bias the actuation nub toward the switch.

5. The motorized window treatment of claim 4, wherein the flexible member defines an axle that is configured to be retained by tabs on the inner surface and to rotate such that the actuation nub is able to move in the transverse direction.

6. The motorized window treatment of claim 5, wherein the flexible member is v-shaped with a first portion that defines the axle and a second portion that extends from the elongated portion.

7. The motorized window treatment of claim 2, wherein the elongated portion comprises a light pipe portion that is configured to extend proximate to a light source mounted to the printed circuit board.

8. The motorized window treatment of claim 7, wherein the light pipe portion is curved to transfer light emitted by the light source mounted to the printed circuit board to the end portion of the motor drive unit.

9. The motorized window treatment of claim 8, wherein the elongated portion is translucent.

10. The motorized window treatment of claim 4, wherein the flexible member comprises a plurality of arms that are arranged in a diamond shape.

11. The motorized window treatment of claim 10, wherein the flexible member is configured to flex at the intersection of adjacent arms when the first force is applied at the end portion.

12. The motorized window treatment of claim 11, wherein the actuation nub is located at the intersection of two upper arms of the plurality of arms.

13. The motorized window treatment of claim 12, wherein the flexible member defines a lower surface at the intersection of two lower arms of the plurality of arms, and wherein the lower surface of the flexible member is configured to abut a lower surface of the cavity and the flexible member is configured to abut the inner surface of the cavity when the first force is applied to the end portion.

14. The motorized window treatment of claim 4, wherein the flexible member comprises a cable that is configured to bend and has a stiffness that prevents buckling when actuating the switch, and wherein the actuation member comprises a guide element that defines a channel therethrough that is configured to receive the flexible member, and wherein the channel is curved such that the flexible member bends approximately 90 degrees from the longitudinal direction to the transverse direction.

15. The motorized window treatment of claim 1, wherein the actuation member comprises an elongated portion, a wedge portion, and a flexible member defining an actuation nub that moves in a transverse direction as the elongated portion moves in the longitudinal direction to actuate the switch, and wherein the wedge portion defines an inclined surface that is configured to abut the flexible member.

16. The motorized window treatment of claim 15, wherein the flexible member comprises a base portion and a head portion that is attached to the base portion by a connecting portion, the head portion defining a lower surface that is configured to slide along the inclined surface of the wedge portion, and wherein the wedge portion is configured to bias the flexible member in the transverse direction in response to the first force in the longitudinal direction.

17. The motorized window treatment of claim 16, further comprising a housing in which the motor and the printed circuit board are housed, the housing defining a cavity in which the battery holder is configured to be received, wherein the wedge portion is configured to apply the second force to the head portion to move the actuation nub in the transverse direction toward the switch as the wedge portion moves in the longitudinal direction toward an inner surface of the cavity.

18. The motorized window treatment of claim 16, further comprising a housing in which the motor and the printed circuit board are housed, the housing defining a cavity in which the battery holder is configured to be received, wherein the wedge portion is configured to apply the second force to the head portion to move the actuation nub in the transverse direction toward the switch as the wedge portion moves in the longitudinal direction away from an inner surface of the cavity.

19. The motorized window treatment of claim 4, wherein the flexible member comprises a curved portion defining a first abutment surface, a base portion, and a connecting portion that attaches the curved portion to the base portion, and wherein the curved portion is configured to pivot about a fulcrum defined by the attachment of the connecting portion to the base portion, and wherein the elongated portion defines a second abutment surface that is configured to abut the first abutment surface of the curved portion when the first force is applied to the end portion.

20. The motorized window treatment of claim 19, wherein the curved portion is curved such that the actuation nub is aligned with the switch.

21. The motorized window treatment of claim 19, wherein the actuation nub defines an actuation surface that is substantially parallel to the switch.

22. The motorized window treatment of claim 2, further comprising:

a housing in which the motor and the printed circuit board are housed, the housing defining a cavity in which the battery holder is configured to be received, wherein the housing defines a channel in which the elongated portion of the actuation member is configured to extend from the end portion of the motor drive unit to the printed circuit board adjacent to the battery holder.

23. The motorized window treatment of claim 22, further comprising:

a plurality of feet extending from the elongated portion and configured to secure the actuation member within the cavity, wherein the housing comprises a plurality of recesses defining one or more apertures that extend from the cavity to an exterior surface of the housing, each of the apertures configured to receive a respective one of the plurality of feet.

24. The motorized window treatment of claim 23, wherein the plurality of recesses are configured to enable each of the plurality of feet to translate within a respective recess of the plurality of recesses in the longitudinal direction.

25. The motorized window treatment of claim 23, wherein each of the plurality of recesses defines a length that limits how far the elongated portion can translate within the cavity in the longitudinal direction.

26. The motorized window treatment of claim 22, further comprising mounting brackets configured to support respective first and second ends of the roller tube and mount the motorized window treatment to a structure, the mounting brackets configured such that the roller tube can be operated between an operating position and an extended position, wherein a portion of the motor drive unit is accessible when the motorized window treatment is in the extended position.

27. The motorized window treatment of claim 26, wherein each of the mounting brackets comprises:

a stationary portion configured to be attached to the structure surrounding the window; and a movable portion configured to receive the end portion of the motor drive unit, the movable portion configured to engage the stationary portion and operate the motorized window treatment between the operating position and the extended position, wherein the movable portion is aligned with the stationary portion when the motorized window treatment is in the operating position.

28. The motorized window treatment of claim 27, wherein the housing comprises a snap extending from a snap arm in the longitudinal direction, the snap configured to engage a catch defined by the movable portion of a first mounting bracket of the mounting brackets, the snap configured to be locked in place when the battery holder is installed in the cavity to secure the motor drive unit to the first mounting bracket.

29. The motorized window treatment of claim 2, wherein the elongated portion comprises an actuation portion that is accessible at the end portion of the motor drive unit.

30. The motorized window treatment of claim 1, wherein the first direction is the longitudinal direction and the second direction is orthogonal to the longitudinal direction.

* * * * *